US011541379B2

(12) United States Patent
Bidal et al.

(10) Patent No.: US 11,541,379 B2
(45) Date of Patent: Jan. 3, 2023

(54) BIMETALLIC CU/MN CATALYSTS FOR SELECTIVE CATALYTIC REDUCTION

(71) Applicant: JOHNSON MATTHEY PUBLIC LIMITED COMPANY, London (GB)

(72) Inventors: Yannick Bidal, Royston (GB); Joseph Fedeyko, Wayne, PA (US); Alexander Green, Royston (GB); Matthew Harris, Royston (GB); Jing Lu, Wayne, PA (US); Nicholas McNamara, Wayne, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 16/556,475

(22) Filed: Aug. 30, 2019

(65) Prior Publication Data
US 2020/0070133 A1    Mar. 5, 2020

Related U.S. Application Data

(60) Provisional application No. 62/725,471, filed on Aug. 31, 2018.

(51) Int. Cl.
*B01J 29/78* (2006.01)
*B01J 29/76* (2006.01)
*B01J 29/46* (2006.01)
*B01J 29/48* (2006.01)
*B01J 35/00* (2006.01)
*B01D 53/94* (2006.01)
*F01N 3/20* (2006.01)

(52) U.S. Cl.
CPC ........ *B01J 29/783* (2013.01); *B01D 53/9418* (2013.01); *B01D 53/9468* (2013.01); *B01D 53/9472* (2013.01); *B01J 29/46* (2013.01); *B01J 29/48* (2013.01); *B01J 29/76* (2013.01); *B01J 29/7615* (2013.01); *B01J 29/78* (2013.01); *B01J 29/7815* (2013.01); *B01J 35/0006* (2013.01); *F01N 3/2066* (2013.01); *B01D 2255/2073* (2013.01); *B01D 2255/20738* (2013.01); *B01D 2255/20761* (2013.01); *B01D 2255/502* (2013.01); *B01D 2255/504* (2013.01); *B01D 2255/9022* (2013.01); *B01D 2255/9032* (2013.01); *B01D 2255/9035* (2013.01); *B01J 2229/14* (2013.01); *B01J 2229/183* (2013.01)

(58) Field of Classification Search
CPC ... Y02C 10/20; F01N 3/2066; B01D 53/9418; B01D 53/9472; B01D 53/9468; B01D 2255/9022; B01D 2255/9032; B01D 2255/50; B01D 2255/504; B01D 2255/2073; B01D 2255/20761; B01D 2255/20738; B01D 2255/904; B01D 2255/903; B01D 2255/915; B01D 2255/9155; B01J 2029/062; B01J 2229/10; B01J 2229/14; B01J 2229/18; B01J 2229/186; B01J 2229/42; B01J 37/30; B01J 35/0006; B01J 29/005; B01J 29/42; B01J 29/44; B01J 29/7215; B01J 29/723; B01J 29/7415; B01J 29/743; B01J 29/80; B01J 29/064; B01J 29/068; B01J 29/072; B01J 29/076; B01J 29/78; B01J 29/76; B01J 29/763; B01J 29/7815; B01J 29/783; B01J 29/7615; B01J 29/48; B01J 29/46; B01J 29/044; B01J 29/045
USPC ........ 502/60, 63, 64, 66, 67, 69, 71, 74, 77; 422/177, 180; 423/235, 239.1, 239.2
See application file for complete search history.

(56) References Cited

U.S. PATENT DOCUMENTS

| | | | |
|---|---|---|---|
| 5,219,545 A | 6/1993 | Kagawa et al. | |
| 5,524,432 A | 6/1996 | Hansel | |
| 5,727,385 A * | 3/1998 | Hepburn | F01N 13/009 60/297 |
| 2005/0008556 A1 | 1/2005 | Hwu et al. | |
| 2008/0279741 A1 | 11/2008 | Golden et al. | |
| 2009/0260346 A1* | 10/2009 | Gekas | F01N 3/2066 60/274 |
| 2009/0311146 A1* | 12/2009 | Ohno | C04B 38/0016 422/171 |
| 2012/0111477 A1 | 5/2012 | Haga et al. | |
| 2012/0301381 A1* | 11/2012 | Fedeyko | B01J 29/80 423/213.5 |
| 2013/0136677 A1* | 5/2013 | Chandler | B01J 29/7615 423/213.5 |
| 2013/0336863 A1* | 12/2013 | Soeger | B01J 29/46 423/213.2 |
| 2017/0209857 A1* | 7/2017 | Chandler | B01J 29/763 |
| 2019/0224657 A1 | 7/2019 | Fedeyko et al. | |

FOREIGN PATENT DOCUMENTS

| | | |
|---|---|---|
| CN | 106391104 A | 2/2017 |
| EP | 0415410 A1 | 3/1991 |
| JP | 07299329 A | 11/1995 |
| JP | 07323214 A | 12/1995 |

(Continued)

OTHER PUBLICATIONS

Kim et al., "Mn—Fe/ZSM-5 as a low-temperature SCR catalyst to remove NOx from diesel engine exhaust", Applied Catalysis B: Environmental 126, (2012), pp. 9-21.*

(Continued)

*Primary Examiner* — Elizabeth D Wood

(57) ABSTRACT

A catalyst composition for treating an exhaust gas, the catalyst composition comprising a molecular sieve, the molecular sieve comprising exchanged copper and exchanged manganese.

16 Claims, 42 Drawing Sheets

(56) References Cited

FOREIGN PATENT DOCUMENTS

| WO | 9939809 A1 | 8/1999 |
|---|---|---|
| WO | 2006093802 A2 | 9/2006 |
| WO | 2007079038 A2 | 7/2007 |
| WO | 2013155244 A1 | 10/2013 |

OTHER PUBLICATIONS

Wang et al., "Effects of temerature on NOx removal with Mn—Cu/ZSM-5 catalysts assisted by plasma", Applied Thermal Engineering, 130, (2018), pp. 1224-1232.*

Zhao et al., "Stability of Cu—Mn bimetal catalysts based on different zeolites for NOx removal from diesel engine exhaust", Chinese Journal of Catalysis, 39, (2018), pp. 800-809.*

Jiang et al., "The Influence of Ce or Mn Doping on Cu-Based Catalysts for De-NOx with NH3-SCR", Journal of Chemistry, vol. 2020, Artile ID 1462801, 2020 pp. 1-8.*

Xiao et al., "Solvent-Free Sunthesis of SAPO-34 Zeolite with Tunable SiO2/Al2O3 Ratios for Efficient Catalytic Cracking of 1-Butene"., Catalysis, 11, 2021, pp. 1-14.*

Ye et al., SSZ-13-supported manganese oxide catalysts for low temperature selective catalytic reduction of NOx by NH3., J. Chem. Sci. vol. 129, No. 6, 2017, pp. 765-774.*

Zhang et al., "Improved high-temperature hydrothermal stability of Cu-SSZ-13 by an ammonium hexafluorosilicate treatment"., RSC Advan. 5, 2015, pp. 67841-67848.*

* cited by examiner

Figure 37a
Figure 37b
Figure 38
Figure 38a
Figure 38b
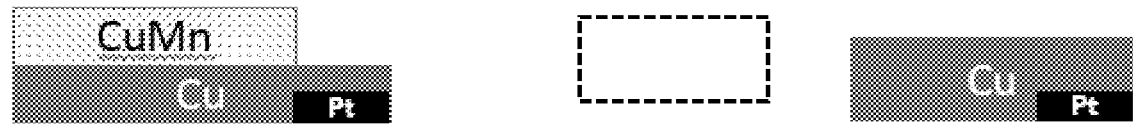

BIMETALLIC CU/MN CATALYSTS FOR SELECTIVE CATALYTIC REDUCTION

BACKGROUND OF THE INVENTION

The present invention relates to a catalyst and method of converting nitrogen oxides in a gas, such as an exhaust gas of a vehicular lean-burn internal combustion engine, to nitrogen by contacting the nitrogen oxides with a nitrogenous reducing agent in the presence of a transition metal-containing molecular sieve catalyst.

Selective catalytic reduction (SCR) of $NO_x$ by nitrogenous compounds, such as ammonia or urea, has been used in many applications, including industrial stationary applications. More recently, $NO_x$ reduction systems based on SCR technology are being developed for a number of vehicular (mobile) applications in Europe, Japan, and the USA, e.g. for treating diesel exhaust gas.

Several chemical reactions occur in an $NH_3$ SCR system, most of which represent desirable reactions that reduce $NO_x$, specifically NO and $NO_2$, to nitrogen. The dominant reaction is represented by reaction (1).

$$4NO + 4NH_3 + O_2 \rightarrow 4N_2 + 6H_2O \quad (1)$$

Competing, non-selective reactions with oxygen can produce secondary emissions or may unproductively consume ammonia. One such non-selective reaction is the complete oxidation of ammonia, shown in reaction (2).

$$4NH_3 + 5O_2 \rightarrow 4NO + 6H_2O \quad (2)$$

Also, side reactions may lead to undesirable products such as $N_2O$, as represented by reaction (3).

$$4NH_3 + 5NO_2 + 3O_2 \rightarrow 4N_2O + 6H_2O \quad (3)$$

Molecular sieves, including aluminosilicate zeolites, may be used as catalysts for SCR of $NO_x$ with $NH_3$. One application is to control $NO_x$ emissions from vehicular diesel engines, with the reductant obtainable from an ammonia precursor such as urea or by injecting ammonia per se. To promote the catalytic activity, transition metals may be incorporated into the aluminosilicate zeolites.

It is desired to prepare a catalyst composition for SCR of NOx with improved NOx conversion and reduced $N_2O$ production.

SUMMARY OF THE INVENTION

According to some aspects of the present invention, a catalyst composition for treating an exhaust gas comprises a molecular sieve, the molecular sieve comprising exchanged copper and exchanged manganese. In some aspects, the molecular sieve is an aluminosilicate molecular sieve. In some aspects, the molecular sieve comprises a zeolite. A suitable zeolite may have a silica to alumina molar ratio (SAR) of, for example, about 5 to about 200; about 10 to about 50; or about 10 to about 30. In some aspects, the molecular sieve comprises a small-pore zeolite. A suitable small-pore zeolite may have a crystal framework type selected from, for example, AEI, CHA, and combinations thereof. In some aspects, the molecular sieve comprises a medium- or large-pore zeolite. A suitable medium- or large-pore zeolite may have a crystal framework type selected from, for example, BEA, MFI, and combinations thereof.

In some aspects, a molecular sieve includes a weight ratio of copper to manganese of about 0.1 to about 50; about 0.2 to about 15; or about 0.3 to about 3. In some aspects, a molecular sieve includes copper and manganese present in a total amount of about 0.1 to about 10 wt %; about 1 to about 7 wt %; or about 2 to about 5 wt %, based on the weight of the molecular sieve. In some aspects, a molecular sieve includes copper present in an amount of about 0.05 to about 7 wt %; about 0.5 to about 5 wt %; or about 1 to about 4 wt %, based on the weight of the molecular sieve. In some aspects, a molecular sieve includes manganese present in an amount of about 0.05 to about 7 wt %; about 0.1 to about 5 wt %; or about 0.5 to about 2.5 wt %, based on the weight of the molecular sieve. In some aspects, a molecular sieve includes a transition metal to aluminum ratio of <1; <0.75; or <0.5.

In some aspects, the catalyst composition is effective to promote a reaction of $NH_3$ with NOx to form nitrogen and water. In certain aspects, the catalyst composition produces about 20% to about 45% less $N_2O$ under standard SCR conditions compared to a Cu-exchanged molecular sieve. In some aspects, the catalyst composition converts about 30% to about 60% more total $NO_x$ under standard SCR conditions than a Mn-exchanged molecular sieve. In some aspects, the catalyst composition produces about 1% to about 15% less $N_2O$ under standard SCR conditions than a physical mixture of a Cu-exchanged molecular sieve and a Mn-exchanged molecular sieve. In some aspects, the catalyst composition converts about 1% to about 25% more total $NO_x$ under standard SCR conditions than a physical mixture of a Cu-exchanged molecular sieve and a Mn-exchanged molecular sieve. In some aspects, the catalyst composition produces about 25% to about 60% less $N_2O$ under fast SCR conditions compared to a Cu-exchanged molecular sieve. In some aspects, the catalyst composition converts about 1% to about 20% more total $NO_x$ under fast SCR conditions compared to a Cu-exchanged molecular sieve. In some aspects, the catalyst composition produces about 20% to about 45% less $N_2O$ under slow SCR conditions compared to a Cu-exchanged molecular sieve. In some aspects, the catalyst composition produces about 35% to about 65% less $N_2O$ under standard SCR conditions after 900° C. aging compared to a Cu-exchanged molecular sieve.

According to some aspects of the present invention, a catalyst article comprises a substrate coated with a catalyst composition comprising a molecular sieve, the molecular sieve comprising exchanged copper and exchanged manganese. In some aspects, a substrate may further include one or more additional catalysts, such as one or more Cu- or Fe-exchanged molecular sieve catalysts. In some aspects, the molecular sieve comprising exchanged copper and exchanged manganese is present upstream of the one or more additional catalyst compositions. In some aspects, the molecular sieve comprising exchanged copper and exchanged manganese is present in a top layer and the one or more additional catalyst compositions are present in a bottom layer. In some aspects, the catalyst article further comprises a catalyst composition comprising a platinum group metal.

According to some aspects of the present invention, a method of treating an exhaust gas containing nitrogen oxides comprises contacting the exhaust gas with a nitrogenous reductant in a presence of a catalyst composition, the catalyst composition comprising a molecular sieve, the molecular sieve comprising exchanged copper and exchanged manganese. In some aspects, the nitrogenous reductant comprises ammonia. In some aspects, the contacting occurs at a temperature of about 150° C. to about 750° C.

BRIEF DESCRIPTION OF THE DRAWINGS

FIGS. 1-40 show catalyst configurations of catalysts and systems of aspects of the present invention. They are described in further detail in the detailed description.

DETAILED DESCRIPTION OF THE INVENTION

Figure 1:

Compositions, methods, and systems of the present invention relate to catalysts for treating exhaust gas. Catalyst compositions of aspects of the present invention include a molecular sieve, wherein the molecular sieve includes exchanged copper and exchanged manganese. As explained herein, catalyst compositions of aspects of the present invention have been found to promote a reaction of NH$_3$ with NOx to form nitrogen and water, i.e., selective catalytic reduction (SCR), with low N$_2$O production. Such catalysts compositions may be useful for treating exhaust gas, for example, from internal combustion engines, including diesel engines.

Catalyst Composition

Catalyst compositions of the present invention include a molecular sieve with exchanged copper and exchanged manganese. In some aspects, the molecular sieve is free of, or essentially free of any additional transition metals. For example, in some aspects, the molecular sieve contains additional transition metals (i.e., further to the exchanged copper and exchanged manganese) in an amount less than about 1 wt %; less than about 0.7 wt %; less than about 0.5 wt %; less than about 0.3 wt %; less than about 0.1 wt %; less than about 0.07 wt %; less than about 0.05 wt %; or less than about 0.01 wt %, based on the weight of the molecular sieve. In some aspects, the molecular sieve may be described as bimetallic, as the molecular sieve includes two transition metals.

Molecular Sieves

Catalyst compositions of aspects of the present invention include a molecular sieve. In some aspects, the molecular sieve comprises, or consists essentially of, a molecular sieve having an aluminosilicate framework (e.g. zeolite) or a silicoaluminophosphate framework (e.g. SAPO). In some aspects, the molecular sieve comprises, or consists essentially of, a molecular sieve having an aluminosilicate framework (e.g. zeolite). In some aspects, preferred zeolites are synthetic zeolites.

When the molecular sieve has an aluminosilicate framework (e.g. the molecular sieve is a zeolite), then typically the molecular sieve has a silica to alumina molar ratio (SAR) of from 5 to 200 (e.g. 10 to 200); 10 to 100 (e.g. 10 to 30 or 20 to 80); 10 to 50; 10 to 30; 12 to 40; 15 to 30; 5 to 20; 5 to 15; 8 to 15; 8 to 13; 10 to 15; 10 to 20; 10 to 40; 10 to 60; 10 to 80; 10 to 100; 10 to 150; <30; <20; <15; or <13. In some aspects, a suitable molecular sieve has a SAR of >200; >600; or >1200. In some aspects, the molecular sieve has a SAR of from about 1500 to about 2100.

Typically, the molecular sieve is microporous. A microporous molecular sieve has pores with a diameter of less than 2 nm (e.g. in accordance with the IUPAC definition of "microporous" [see *Pure & Appl. Chem.*, 66(8), (1994), 1739-1758)]).

The molecular sieve may be a small pore molecular sieve (e.g. a molecular sieve having a maximum ring size of eight tetrahedral atoms), a medium pore molecular sieve (e.g. a molecular sieve having a maximum ring size of ten tetrahedral atoms) or a large pore molecular sieve (e.g. a molecular sieve having a maximum ring size of twelve tetrahedral atoms) or a combination of two or more thereof.

In some aspects, the molecular sieve may be mesoporous. A mesoporous molecular sieve has pores with a diameter between 2 and 50 nm (e.g. in accordance with the IUPAC definition of "microporous").

When the molecular sieve is a small pore molecular sieve, then the small pore molecular sieve may have a framework structure represented by a Framework Type Code (FTC) selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, LTA, KFI, MER, MON, NSI, OWE, PAU, PHI, RHO, RTH, SAT, SAV, SFW, SIV, THO, TSC, UEI, UFI, VNI, YUG and ZON, or a mixture and/or combination and/or an intergrowth of two or more thereof. In some aspects, the small pore molecular sieve has a framework structure represented by a FTC selected from the group consisting of CHA, LEV, AEI, AFX, ERI, LTA, SFW, KFI, DDR and ITE. In some aspects, the small pore molecular sieve has a framework structure represented by a FTC selected from the group consisting of CHA, AEI, and AFX. In some aspects, the small pore molecular sieve has a framework structure represented by a FTC selected from the group consisting of CHA and AEI. The small pore molecular sieve may have a framework structure represented by the FTC CHA. The small pore molecular sieve may have a framework structure represented by the FTC AEI.

When the molecular sieve is a medium pore molecular sieve, then the medium pore molecular sieve may have a framework structure represented by a Framework Type Code (FTC) selected from the group consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI and WEN, or a mixture and/or an intergrowth of two or more thereof. In some aspects, the medium pore molecular sieve has a framework structure represented by a FTC selected from the group consisting of FER, MEL, MFI, and STT. In some aspects, the medium pore molecular sieve has a framework structure represented by a FTC selected from the group consisting of FER and MFI, particularly MFI. When the medium pore molecular sieve is a zeolite and has a framework represented by the FTC FER or MFI, then the zeolite may be ferrierite, silicalite or ZSM-5.

When the molecular sieve is a large pore molecular sieve, then the large pore molecular sieve may have a framework structure represented by a Framework Type Code (FTC) selected from the group consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, and VET, or a mixture and/or an intergrowth of two or more thereof. In some aspects, the large pore molecular sieve has a framework structure represented by a FTC selected from the group consisting of AFI, BEA, MAZ, MOR, and OFF. In some aspects, the large pore molecular sieve has a framework structure represented by a FTC selected from the group consisting of BEA, MOR and FAU. When the large pore molecular sieve is a zeolite and has a framework represented by the FTC BEA, FAU or MOR, then the zeolite may be a beta zeolite, faujasite, zeolite Y, zeolite X or mordenite.

In some aspects, a suitable molecular sieve includes a combination of small and large pore frameworks. In some aspects, a suitable molecular sieve includes ZSM-34 (ERI+ OFF).

Transition Metals

In some aspects, a catalyst composition includes a molecular sieve with copper, manganese, and optionally one or more other metals such as exchanged period 4 transition metals and/or noble metals. Generally, suitable other metals may be selected from the group consisting of cobalt, iron, nickel, vanadium, palladium, platinum, ruthenium and rhenium. In some aspects, the two or more exchanged transition metals comprise copper and manganese. In some aspects, the exchanged transition metals consist essentially of copper and manganese. In some aspects, the exchanged transition metals consist of copper and manganese. In some aspects, the other metals do not include iron. In some aspects, the other metals do not include vanadium. In some aspects, the other metals do not include ruthenium. In some aspects, the other metals do not include nickel.

The transition metal(s) may be present on an extra-framework site on the external surface of the molecular sieve or within a channel, cavity or cage of the molecular sieve.

In some aspects, the transition metal exchanged molecular sieve comprises transition metals in an amount of about 0.10 to about 10% by weight of the transition metal exchanged molecular sieve; or an amount of about 0.2 to about 5% by weight of the transition metal exchanged molecular sieve.

Amounts Cu/Mn

In some aspects, a transition metal exchanged molecular sieve of the present invention comprises exchanged copper and exchanged manganese in a combined amount of about 0.10 to about 10% by weight of the transition metal exchanged molecular sieve; about 0.1 to about 7% by weight of the transition metal exchanged molecular sieve; about 0.2 to about 7% by weight of the transition metal exchanged molecular sieve; about 0.2 to about 5% by weight of the transition metal exchanged molecular sieve; about 0.5 to about 6% by weight of the transition metal exchanged molecular sieve; about 1 to about 7% by weight of the transition metal exchanged molecular sieve; about 1 to about 5% by weight of the transition metal exchanged molecular sieve; about 2 to about 5% by weight of the transition metal exchanged molecular sieve; about 1.5 to about 3% by weight of the transition metal exchanged molecular sieve; about 1.5 to 4% by weight of the transition metal exchanged molecular sieve; or about 2 to about 4% by weight of the transition metal exchanged molecular sieve.

In some aspects, a transition metal exchanged molecular sieve of the present invention comprises exchanged copper in an amount of about 0.05 to about 7% by weight of the transition metal exchanged molecular sieve; about 0.5 to about 5% by weight of the transition metal exchanged molecular sieve; about 0.05 to about 5% by weight of the transition metal exchanged molecular sieve; about 0.1 to about 4% by weight of the transition metal exchanged molecular sieve; about 0.1 to about 3% by weight of the transition metal exchanged molecular sieve; about 0.2 to about 3% by weight of the transition metal exchanged molecular sieve; about 0.5 to about 2.5% by weight of the transition metal exchanged molecular sieve; about 1 to about 4% by weight of the transition metal exchanged molecular sieve; or about 1 to about 2% by weight of the transition metal exchanged molecular sieve.

In some aspects, a transition metal exchanged molecular sieve of the present invention comprises exchanged manganese in an amount of about 0.05 to about 7% by weight of the transition metal exchanged molecular sieve, about 0.05 to about 5% by weight of the transition metal exchanged molecular sieve; about 0.1 to about 5% by weight of the transition metal exchanged molecular sieve; about 0.1 to about 4% by weight of the transition metal exchanged molecular sieve; about 0.1 to about 3% by weight of the transition metal exchanged molecular sieve; about 0.2 to about 3% by weight of the transition metal exchanged molecular sieve; about 0.5 to about 2.5% by weight of the transition metal exchanged molecular sieve; or about 1 to about 2% by weight of the transition metal exchanged molecular sieve.

Ratios Cu/Mn

In some aspects, a transition metal exchanged molecular sieve of the present invention comprises exchanged copper and exchanged manganese in a weight ratio of about 1:1. In some aspects, a transition metal exchanged molecular sieve of the present invention comprises exchanged copper and exchanged manganese in a weight ratio of about 0.1 to about 50; about 0.2 to about 15; or about 0.33 to about 3. In some aspects, in addition to utilizing the above-mentioned copper and manganese ratios, the exchange capacity of the molecular sieve in terms of metal ion to exchange site ratio should be <1; <0.75; or <0.5. In some aspects, a transition exchanged molecular sieve has a transition metal to aluminum ratio of <1; <0.75; or <0.5.

Catalysts of the present invention can be prepared by any suitable means known in the art, including, for example, one pot, prefixing, and spray drying.

Substrate

A catalyst article of the present invention may include a substrate and a catalyst composition. The substrate may be a flow-through substrate or a filtering substrate. The substrate may comprise the catalyst composition (i.e. the catalyst article is obtained by extrusion) or the catalyst composition may be disposed or supported on the substrate (i.e. the catalyst composition is applied onto the substrate by a washcoating method). The catalyst composition may coat the substrate entirely or partially, as desired. In some aspects, a catalyst article includes a Cu/Mn bimetallic molecular sieve extruded article which is coated with one or more additional catalysts. In some aspects, the extruded catalyst is coated with one or more additional SCR catalysts, which could include, for example, a Cu/Mn bimetallic molecular sieve.

In some aspects, the catalyst article may comprise the catalyst composition in a total concentration of about 0.5 to about 4.0 g in$^{-3}$; about 1.0 to about 3.0 g in$^{-3}$; or about 1.2 to about 2.5 g/in$^3$.

When the catalyst article has a filtering substrate, then it is a selective catalytic reduction filter catalyst. The selective catalytic reduction filter comprises a filtering substrate and the catalyst composition. References to use of SCR catalysts throughout this application are understood to include use of selective catalytic reduction filter catalysts as well, where applicable.

The flow-through or filter substrate is a substrate that is capable of containing catalyst/adsorber components. The substrate is preferably a ceramic substrate or a metallic substrate. The ceramic substrate may include any suitable refractory material, e.g., alumina, silica, titania, ceria, zirconia, magnesia, zeolites, silicon nitride, silicon carbide, zirconium silicates, magnesium silicates, aluminosilicates, metallo aluminosilicates (such as cordierite and spudomene), or a mixture or mixed oxide of any two or more thereof. Cordierite, a magnesium aluminosilicate, and silicon carbide are particularly preferred.

The metallic substrates may be made of any suitable metal, and in particular heat-resistant metals and metal alloys such as titanium and stainless steel as well as ferritic alloys containing iron, nickel, chromium, and/or aluminum in addition to other trace metals.

The flow-through substrate is preferably a flow-through monolith having a honeycomb structure with many small, parallel thin-walled channels running axially through the substrate and extending throughout from an inlet or an outlet of the substrate. The channel cross-section of the substrate may be any shape, but is preferably square, sinusoidal, triangular, rectangular, hexagonal, trapezoidal, circular, or oval. The flow-through substrate may also be high porosity which allows the catalyst to penetrate into the substrate walls.

The filter substrate is preferably a wall-flow monolith filter. The channels of a wall-flow filter are alternately blocked, which allow the exhaust gas stream to enter a channel from the inlet, then flow through the channel walls, and exit the filter from a different channel leading to the outlet. Particulates in the exhaust gas stream are thus trapped in the filter.

The catalyst composition may be added to the flow-through or filter substrate by any known means, such as a washcoat procedure.

When the catalyst article is selective catalytic reduction filter, then the filtering substrate may preferably be a wall flow filter substrate monolith. The wall flow filter substrate monolith (e.g. of the SCR-DPF) typically has a cell density of 60 to 400 cells per square inch (cpsi). It is preferred that the wall flow filter substrate monolith has a cell density of 100 to 350 cpsi, more preferably 200 to 300 cpsi.

The wall flow filter substrate monolith may have a wall thickness (e.g. average internal wall thickness) of 0.20 to 0.50 mm, preferably 0.25 to 0.35 mm (e.g. about 0.30 mm).

Generally, the uncoated wall flow filter substrate monolith has a porosity of from 50 to 80%, preferably 55 to 75%, and more preferably 60 to 70%.

The uncoated wall flow filter substrate monolith typically has a mean pore size of at least 5 μm. It is preferred that the mean pore size is from 10 to 40 μm, such as 15 to 35 μm, more preferably 20 to 30 μm.

The wall flow filter substrate may have a symmetric cell design or an asymmetric cell design.

In general for a selective catalytic reduction filter, the catalyst composition is disposed within the wall of the wall-flow filter substrate monolith. Additionally, the catalyst composition may be disposed on the walls of the inlet channels and/or on the walls of the outlet channels.

Catalyst compositions of aspects of the present invention may be coated on a suitable monolith substrate. Washcoat compositions containing the catalyst compositions of the present invention for coating onto the monolith substrate or for manufacturing extruded type substrate monoliths can comprise a binder selected from the group consisting of alumina, silica, (non zeolite) silica-alumina, naturally occurring clays, $TiO_2$, $ZrO_2$, and $SnO_2$. In general, catalytic articles comprising the catalyst composition in a desired loading level may be prepared by washcoating, extrusion, or other methods known in the art.

Methods and Systems

Methods of the present invention relate to treating exhaust gas containing nitrogen oxides, by contacting the exhaust gas with a reductant, such as a nitrogenous reductant or hydrocarbon reductant, in the presence of a catalyst composition as described herein. As such, catalyst compositions of the present invention may function as selective catalytic reduction catalysts.

In some aspects, the nitrogen oxides are reduced with the reducing agent at a temperature of at least 100° C. In some aspects, the catalysts as described herein are effective at reducing nitrogen oxides with the reducing agent over a wide temperature range (e.g., from about 150° C. to 750° C.) in addition to being hydrothermally stable at temperatures above 900° C. The latter characteristics may be particularly useful for treating exhaust gases from heavy and light duty diesel engines, particularly engines comprising exhaust systems comprising (optionally catalyzed) diesel particulate filters which are regenerated actively, e.g. by injecting hydrocarbon into the exhaust system upstream of the filter, wherein the zeolite catalyst for use in the present invention is located downstream of the filter.

In a particular aspect, the catalysts as described herein are effective at reducing nitrogen oxides with the reducing agent in a temperature range of from 175 to 550° C. In another aspect, the temperature range is from 175 to 400° C. in some aspects, the temperature range is from 275 to 500° C., or 250 to 550° C. When $N_2O$ is present in the gas stream, the temperature range may be wider, such as 150 to 650° C.; 175 to 625° C.; 200 to 600° C.; or 225 to 575° C.

In some aspects, the nitrogen oxides reduction is carried out in the presence of oxygen. In some aspects, the nitrogen oxides reduction is carried out in the absence of oxygen.

The nitrogenous reductant can be ammonia per se or the source of nitrogenous reductant can be hydrazine or any suitable ammonia precursor, such as urea $((NH_2)_2CO)$, ammonium carbonate, ammonium carbamate, ammonium hydrogen carbonate or ammonium formate. The reductant can be injected into the exhaust gas stream from an external source, such as reservoir or tank, supplied in-situ by a Nitrogen Storage Catalyst or NOx Adsorber Catalyst, so a combination of both. The reductant should be introduced into the exhaust gas upstream of the SCR catalyst.

The method can be performed on a gas derived from a combustion process, such as from an internal combustion engine (whether mobile or stationary), a gas turbine and coal or oil-fired power plants. The method may also be used to treat gas from industrial processes such as refining, from refinery heaters and boilers, furnaces, the chemical processing industry, coke ovens, municipal waste plants and incinerators, coffee roasting plants etc.

In a particular aspect, the method is used for treating exhaust gas from a vehicular lean burn internal combustion engine, such as a diesel engine, a lean-burn gasoline engine or an engine powered by liquid petroleum gas or natural gas.

In some aspects, the invention provides an exhaust system for a vehicular lean burn internal combustion engine, which system comprising a conduit for carrying a flowing exhaust gas, a source of nitrogenous reductant, a catalyst composition comprising exchanged copper and exchanged manganese disposed in a flow path of the exhaust gas, and means for metering nitrogenous reductant into a flowing exhaust gas upstream of the catalyst composition.

A system can include means, when in use, for controlling the metering means so that nitrogenous reductant is metered into the flowing exhaust gas only when it is determined that the catalyst composition is capable of catalyzing $NO_x$ reduction at or above a desired efficiency, such as at a temperature of above 100° C., above 150° C., or above 175° C. The determination by the control means can be assisted by one or more suitable sensor inputs indicative of a condition of the engine selected from the group consisting of: exhaust gas temperature, catalyst bed temperature, accelerator position, mass flow of exhaust gas in the system, manifold vacuum, ignition timing, engine speed, lambda value of the exhaust gas, the quantity of fuel injected in the engine, the position of the exhaust gas recirculation (EGR) valve and thereby the amount of EGR and boost pressure.

In some aspects, metering is controlled in response to the quantity of nitrogen oxides in the exhaust gas determined either directly (using a suitable $NO_x$ sensor) or indirectly, such as using pre-correlated look-up tables or maps—stored in the control means13 correlating any one or more of the abovementioned inputs indicative of a condition of the engine with predicted $NO_x$ content of the exhaust gas.

The control means may comprise a pre-programmed processor such as an electronic control unit (ECU).

The metering of the nitrogenous reductant may be arranged such that 60% to 200% of theoretical ammonia is present in exhaust gas entering the SCR catalyst calculated at 1:1 $NH_3/NO$ and 4:3 $NH_3/NO_2$.

In some aspects, an oxidation catalyst for oxidizing nitrogen monoxide in the exhaust gas to nitrogen dioxide can be located upstream of a point of metering the nitrogenous reductant into the exhaust gas. In some aspects, the oxidation catalyst is adapted to yield a gas stream entering the SCR catalyst composition having a ratio of NO to $NO_2$ of from about 4:1 to about 1:3 by volume, e.g. at an exhaust gas temperature at oxidation catalyst inlet of 200° C. to 450° C.; or 250° C. to 450° C. This concept is disclosed in S. Kasaoka et al. "Effect of Inlet $NO/NO_2$ Molar Ratio and Contribution of Oxygen in the Catalytic Reduction of Nitrogen Oxides with Ammonia", Nippon Kagaku Kaishi, 1978, No. 6, pp. 874-881 and WO 99/39809.

The oxidation catalyst can include at least one platinum group metal (or some combination of these), such as platinum, palladium or rhodium, coated on a flow-through monolith substrate. In one aspect, the at least one platinum group metal is platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

In some aspects, a suitable filter substrate is located between the oxidation catalyst and the zeolite catalyst. Filter substrates can be selected from any of those mentioned above, e.g. wall flow filters. Where the filter is catalyzed, e.g. with an oxidation catalyst of the kind discussed above, preferably the point of metering nitrogenous reductant is located between the filter and the zeolite catalyst. Alternatively, if the filter is uncatalyzed, the means for metering nitrogenous reductant can be located between the oxidation catalyst and the filter. It will be appreciated that this arrangement is disclosed in WO 99/39809.

In some aspects, the catalyst composition for use in the present invention is coated on a filter located downstream of the oxidation catalyst. Where the filter includes the catalyst composition for use in the present invention, the point of metering the nitrogenous reductant is preferably located between the oxidation catalyst and the filter.

In some aspects, a system configuration includes a NOx adsorber catalyst followed by a selective catalytic reduction filter, which may include, for example, a Cu/Mn bimetallic molecular sieve. In some aspects, a system configuration includes a first SCR followed by a second SCR. In some aspects, a system configuration includes a selective catalytic reduction filter followed by an SCR. In some aspects, a catalyst configuration includes an SCR followed by an ammonia oxidation catalyst. Where suitable, such catalysts may be included as different coatings on the same substrate. In some aspects, the SCR catalyst may include a Cu/Mn bimetallic molecular sieve.

In some aspects, there is provided a vehicular lean-burn engine comprising an exhaust system according to the present invention.

In some aspects, the vehicular lean burn internal combustion engine can be a diesel engine, a lean-burn gasoline engine or an engine powered by liquid petroleum gas or natural gas.

Zoning and Configurations

In some aspects, catalyst compositions including a molecular sieve with exchanged copper and exchanged manganese (Cu/Mn bimetallic molecular sieve) may be combined with one or more additional catalyst compositions. Such combinations may involve zoned and/or layered configurations on one or multiple substrates.

In some aspects, a Cu/Mn bimetallic molecular sieve may be combined with additional catalyst compositions formulated as SCR catalyst and/or oxidation catalysts such as ammonia oxidation catalysts. In some aspects, a Cu/Mn bimetallic molecular sieve may be combined with one or more additional SCR catalyst(s). In some aspects, a Cu/Mn bimetallic molecular sieve and the additional SCR catalyst(s) may be located on the same substrate. In some aspects, a Cu/Mn bimetallic molecular sieve and the additional SCR catalyst(s) may be located on different substrates. In some aspects, a catalyst configuration may include a Cu/Mn bimetallic molecular sieve with one or more additional SCR catalyst(s) on the same substrate and one or more additional SCR catalyst(s) on a separate substrate.

In some aspects, a catalyst configuration may include a Cu/Mn bimetallic molecular sieve with an additional catalyst composition, such as an SCR catalyst, located downstream. As used herein, the terms upstream and downstream are understood to indicate a location of the catalysts relative to each other in relation to the flow of exhaust gas. Similarly, inlet and outlet ends are understood to indicate the end of the catalyst substrate relative to the flow of exhaust gas. In some aspects, a Cu/Mn bimetallic molecular sieve is present in a first zone with an addition catalyst composition, such as an SCR catalyst, located in a second zone, where the first zone is upstream of the second zone. In some aspects, the first zone and the second zone are located on the same substrate. In some aspects, the first zone and the second zone are located on separate substrates.

In some aspects, a catalyst configuration may include a Cu/Mn bimetallic molecular sieve in a first upstream zone, with an additional catalyst such as an SCR catalyst located downstream in a second zone, on a separate substrate. For example, FIG. 1 shows a catalyst configuration having a Cu/Mn bimetallic molecular sieve on an upstream substrate with a Cu molecular sieve on a separate downstream substrate.

Figure 2:

In some aspects, a catalyst configuration may include a Cu/Mn bimetallic molecular sieve on an upstream portion of a substrate, with an additional catalyst such as an SCR catalyst located on a downstream portion of the same substrate. In some aspects, these catalyst compositions located on the upstream and downstream portions of the substrate may partially overlap. For example, FIG. 2 shows a catalyst configuration having a Cu/Mn bimetallic molecular sieve on an upstream portion of a substrate with a Cu molecular sieve on a downstream portion of the same substrate. As shown in FIG. 2, the upstream and downstream catalyst compositions are partially overlapping—the Cu molecular sieve was applied from the downstream end of the substrate covering less than 100% of the length of the substrate, and the Cu/Mn bimetallic molecular sieve was applied from the upstream end of the substrate covering less than 100% of the length of the substrate.

Figure 3A:
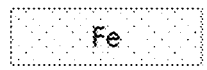
Figure 3A:
Figure 3B:
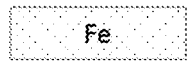
Figure 3B:
Figure 3B:

In some aspects, a catalyst configuration may include an additional catalyst such as an SCR catalyst located upstream, with a Cu/Mn bimetallic molecular sieve located downstream, on a separate substrate. In some aspects, the catalyst configuration may include a further catalyst located between the upstream additional catalyst and the downstream Cu/Mn bimetallic molecular sieve. For example, FIG. 3a shows a catalyst configuration having a Fe molecular sieve on an upstream substrate and a Cu/Mn bimetallic molecular sieve on a separate downstream substrate. FIG. 3b shows a catalyst configuration having a Fe molecular sieve on an upstream substrate and a Cu/Mn bimetallic molecular sieve on a separate downstream substrate, with an additional catalyst located between the two.

Figure 4:

In some aspects, a catalyst configuration may include an additional catalyst such as an SCR catalyst on an upstream portion of a substrate, with a Cu/Mn bimetallic molecular sieve located on a downstream portion of the same substrate. In some aspects, these catalyst compositions located on the upstream and downstream portions of the substrate may partially overlap. For example, FIG. 4 shows a catalyst configuration having a Fe molecular sieve on an upstream portion of a substrate with a Cu/Mn bimetallic molecular sieve on a downstream portion of the same substrate. As shown in FIG. 4, the upstream and downstream catalyst compositions are partially overlapping—the Cu/Mn bimetallic molecular sieve was applied from the downstream end of the substrate covering less than 100% of the length of the substrate, and the Fe molecular sieve was applied from the upstream end of the substrate covering less than 100% of the length of the substrate.

Figure 5A:
Figure 5B:

In some aspects, a catalyst configuration includes a first substrate with an additional catalyst such as an SCR catalyst on an upstream portion of the substrate, with a Cu/Mn bimetallic molecular sieve located on a downstream portion of the same substrate, followed by a second substrate having a further catalyst such as an SCR catalyst. In some aspects, these catalyst compositions located on the upstream and downstream portions of the first substrate may partially overlap. For example, FIG. 5a shows a catalyst configuration having a first substrate with a Fe molecular sieve on an upstream portion of the substrate and a Cu/Mn bimetallic molecular sieve on a downstream portion of the same substrate, followed by a separate substrate having a Cu molecular sieve, located downstream from the first substrate. As shown in FIG. 5, the upstream and downstream catalyst compositions on the first substrate are partially overlapping—the Cu/Mn bimetallic molecular sieve was applied from the downstream end of the substrate covering less than 100% of the length of the substrate, and the Fe molecular sieve was applied from the upstream end of the substrate covering less than 100% of the length of the substrate. FIG. 5b shows the same configuration as FIG. 5a, but includes an additional catalyst located between the first substrate and the downstream substrate.

Figure 6A:
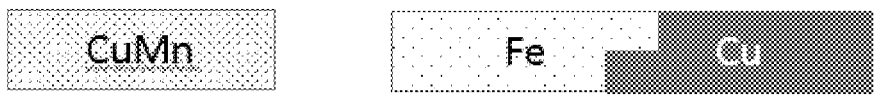
Figure 6B:

In some aspects, a catalyst configuration includes a first substrate with a Cu/Mn bimetallic molecular sieve, followed by a second substrate having one or more additional catalysts such as SCR catalysts. In some aspects, the second substrate includes an upstream catalyst located on an upstream portion of the second substrate and a downstream catalyst located on the downstream portion of the second substrate. In some aspects, these catalyst compositions located on the upstream and downstream portions of the second substrate may partially overlap. FIG. 6a shows a catalyst configuration having a first, upstream, substrate with a Cu/Mn bimetallic substrate, followed by a second substrate having a Fe molecular sieve on an upstream portion of the second substrate and a Cu molecular sieve on a downstream portion of the second substrate. As shown in FIG. 6, the upstream and downstream catalyst compositions on the second substrate are partially overlapping—the Cu molecular sieve was applied from the downstream end of the substrate covering less than 100% of the length of the substrate, and the Fe molecular sieve was applied from the upstream end of the substrate covering less than 100% of the length of the substrate. FIG. 6b shows a catalyst configuration having a first, upstream, substrate with a Cu/Mn bimetallic substrate, with a separate downstream substrate having a Fe molecular sieve on an upstream portion of the substrate and a Cu molecular sieve on a downstream portion of the substrate, with an additional catalyst located between the first substrate and the downstream substrate.

In some aspects, any of the aforementioned catalyst configurations may further include a catalyst composition including platinum-group metal ("PGM catalyst") applied in a bottom layer on one or more of the substrates in the configuration, from the outlet end of the substrate toward the inlet end, covering less than the entire length of the substrate. The catalyst composition including a platinum-group metal may comprise, for example, Pt.alumina, or a Pt.zeolite+Cu.zeolite blend.

Figure 7:

For example, in some aspects, a catalyst configuration may include a Cu/Mn bimetallic molecular sieve in a first upstream zone, with an additional catalyst such as an SCR catalyst located downstream in a second zone, on a separate substrate, wherein the separate substrate includes a platinum-group metal applied in a bottom layer from the outlet end of the substrate toward the inlet end of the substrate. For example, FIG. 7 shows a catalyst configuration having a Cu/Mn bimetallic molecular sieve on an upstream substrate with a Cu molecular sieve on a separate downstream substrate, wherein the separate substrate includes a PGM catalyst applied in a bottom layer from the outlet end of the downstream substrate toward the inlet end, covering less than the entire length of the substrate.

Figure 8:

In some aspects, a catalyst configuration may include a Cu/Mn bimetallic molecular sieve on an upstream portion of a substrate, with an additional catalyst such as an SCR catalyst located on a downstream portion of the same substrate, and a PGM catalyst applied in a bottom layer from the outlet end of the substrate toward the inlet end of the substrate, covering less than the entire length of the substrate. In some aspects, these catalyst compositions located on the upstream and downstream portions of the substrate may partially overlap. For example, FIG. 8 shows a catalyst configuration having a Cu/Mn bimetallic molecular sieve on an upstream portion of a substrate with a Cu molecular sieve on a downstream portion of the same substrate, and a PGM catalyst in a bottom layer, extending from the outlet end of the substrate toward the inlet end of the substrate, covering less than the entire length of the substrate. As shown in FIG. 8, the upstream and downstream catalyst compositions are partially overlapping—the Cu molecular sieve was applied from the downstream end of the substrate covering less than 100% of the length of the substrate, and the Cu/Mn bimetallic molecular sieve was applied from the upstream end of the substrate covering less than 100% of the length of the substrate.

Figure 9A:
Figure 9B:

In some aspects, a catalyst configuration may include an additional catalyst such as an SCR catalyst located upstream, with a Cu/Mn bimetallic molecular sieve located downstream, on a separate substrate, with a PGM catalyst applied in a bottom layer of either or both substrate(s), extending from the outlet end toward the inlet end and covering less than the entire length of the substrate. In some aspects, the catalyst configuration may include a further catalyst located between the upstream additional catalyst and the downstream Cu/Mn bimetallic molecular sieve. For example, FIG. 9a shows a catalyst configuration having a Fe molecular sieve on an upstream substrate and a Cu/Mn bimetallic molecular sieve on a separate downstream substrate, with a PGM catalyst applied in a bottom layer extending from the outlet end of the downstream substrate toward the inlet end and covering less than the entire length of the substrate. FIG. 9b shows a catalyst configuration having a Fe molecular sieve on an upstream substrate and a Cu/Mn bimetallic molecular sieve on a separate downstream substrate, with an additional catalyst located between the two, and with a PGM catalyst applied in a bottom layer on the upstream substrate, extending from the outlet end of the substrate toward the inlet end of the substrate and covering less than the entire length of the substrate, and with a PGM catalyst applied in a bottom layer on the downstream substrate, extending from the outlet end of the substrate toward the inlet end of the substrate and covering less than the entire length of the substrate.

Figure 10:

In some aspects, a catalyst configuration may include an additional catalyst such as an SCR catalyst on an upstream portion of a substrate, with a Cu/Mn bimetallic molecular sieve located on a downstream portion of the same substrate, with a PGM catalyst applied in a bottom layer, extending from the outlet end of the substrate toward the inlet end and covering less than the entire length of the substrate. In some aspects, these catalyst compositions located on the upstream and downstream portions of the substrate may partially overlap. For example, FIG. 10 shows a catalyst configuration having a Fe molecular sieve on an upstream portion of a substrate with a Cu/Mn bimetallic molecular sieve on a downstream portion of the same substrate, with a PGM catalyst applied in a bottom layer, extending from the outlet end of the substrate toward the inlet end and covering less than the entire length of the substrate. As shown in FIG. 10, the upstream and downstream catalyst compositions are partially overlapping—the Cu/Mn bimetallic molecular sieve was applied from the downstream end of the substrate covering less than 100% of the length of the substrate, and the Fe molecular sieve was applied from the upstream end of the substrate covering less than 100% of the length of the substrate.

Figure 11A:
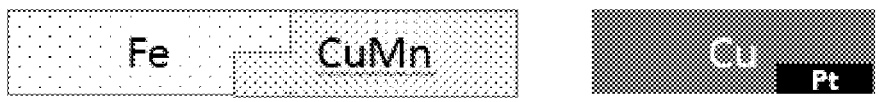
Figure 11B:

In some aspects, a catalyst configuration includes a first substrate with an additional catalyst such as an SCR catalyst on an upstream portion of the substrate, with a Cu/Mn bimetallic molecular sieve located on a downstream portion of the same substrate, followed by a second substrate having a further catalyst such as an SCR catalyst, with a PGM catalyst applied in a bottom layer extending from the outlet end of either or both substrate(s) toward the inlet end, covering less than the entire length of the substrate. In some aspects, these catalyst compositions located on the upstream and downstream portions of the first substrate may partially overlap. For example, FIG. 11a shows a catalyst configuration having a first substrate with a Fe molecular sieve on an upstream portion of the substrate and a Cu/Mn bimetallic molecular sieve on a downstream portion of the same substrate, followed by a separate substrate having a Cu molecular sieve and a bottom layer including a PGM catalyst extending from the outlet end of the substrate toward the inlet end and covering less than the entire length of the substrate, the substrate located downstream from the first substrate. As shown in FIG. 11, the upstream and downstream catalyst compositions on the first substrate are partially overlapping—the Cu/Mn bimetallic molecular sieve was applied from the downstream end of the substrate covering less than 100% of the length of the substrate, and the Fe molecular sieve was applied from the upstream end of the substrate covering less than 100% of the length of the substrate. FIG. 11b shows the same configuration as FIG. 11a, but includes an additional catalyst located between the first substrate and the downstream substrate, and also includes a PGM catalyst applied in a bottom layer extending from the outlet end of the upstream substrate towards the inlet end, covering less than the entire length of the substrate.

Figure 12A:
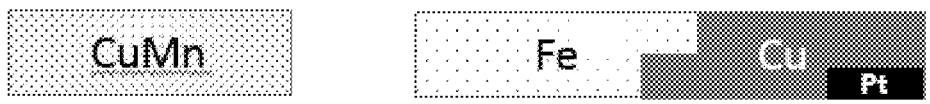
Figure 12B:

In some aspects, a catalyst configuration includes a first substrate with a Cu/Mn bimetallic molecular sieve, followed by a second substrate having one or more additional catalysts such as SCR catalysts. In some aspects, the second substrate includes an upstream catalyst located on an upstream portion of the second substrate and a downstream catalyst located on the downstream portion of the second substrate, with a PGM catalyst applied in a bottom layer on either or both substrate(s), extending from the outlet end of the substrate toward the inlet end and covering less than the entire length of the substrate. In some aspects, these catalyst compositions located on the upstream and downstream portions of the second substrate may partially overlap. FIG. 12a shows a catalyst configuration having a first, upstream, substrate with a Cu/Mn bimetallic substrate, followed by a second substrate having a Fe molecular sieve on an upstream portion of the second substrate and a Cu molecular sieve on a downstream portion of the second substrate, with a PGM catalyst applied in a bottom layer extending from the outlet end of the second substrate toward the inlet end, covering less than the entire length of the substrate. As shown in FIG. 12, the upstream and downstream catalyst compositions on the second substrate are partially overlapping—the Cu molecular sieve was applied from the downstream end of the substrate covering less than 100% of the length of the substrate, and the Fe molecular sieve was applied from the upstream end of the substrate covering less than 100% of the length of the substrate. FIG. 12b shows a catalyst configuration having a first, upstream, substrate with a Cu/Mn bimetallic substrate, with a separate downstream substrate having a Fe molecular sieve on an upstream portion of the substrate and a Cu molecular sieve on a downstream portion of the substrate, with a PGM catalyst applied in a bottom layer on each of the upstream and downstream substrates extending from the outlet end of each substrate toward the inlet end and covering less than the entire length of the substrate, with an additional catalyst located between the first substrate and the downstream substrate.

Figure 13:
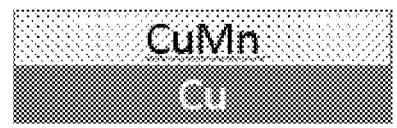

In some aspects, a catalyst configuration includes a layered configuration, with a Cu/Mn bimetallic molecular sieve in a top layer, and an additional catalyst such as an SCR catalyst in a bottom layer. In some aspects, both the top and bottom layer extend the entire length of the substrate. For example, FIG. 13 shows a catalyst configuration having a Cu/Mn bimetallic molecular sieve in a top layer, extending the entire length of the substrate, and a Cu molecular sieve in a bottom layer, extending the entire length of the substrate.

Figure 14:

In some aspects, a catalyst configuration includes a layered configuration, with a top layer including a catalyst such as an SCR catalyst and a bottom layer including a Cu/Mn bimetallic molecular sieve in an upstream portion of the bottom layer and another catalyst such as an SCR catalyst in a downstream portion of the bottom layer. For example, FIG. 14 shows a catalyst configuration with a top layer including an Fe molecular sieve and a bottom layer including a Cu/Mn bimetallic molecular sieve in an upstream portion, extending from the inlet end toward the outlet end of the substrate and covering less than the entire length, and a Cu molecular sieve also in the bottom layer, extending from the outlet end toward the inlet end of the substrate, covering less than the entire length of the substrate. As shown in FIG. 14, the upstream and downstream catalyst compositions of the bottom layer may be partially overlapping.

Figure 15:

In some aspects, a catalyst configuration may include a bottom layer having a catalyst such as an SCR catalyst, and a top layer with a catalyst such as an SCR catalyst in an upstream portion of the top layer and a Cu/Mn bimetallic molecular sieve in the downstream portion of the top layer. For example, FIG. 15 shows a catalyst configuration with a bottom layer including a Cu molecular sieve and a top layer including an Fe molecular sieve in an upstream portion, extending from the inlet end toward the outlet end of the substrate and covering less than the entire length, and a Cu/Mn bimetallic molecular sieve also in the top layer, in a downstream portion of the substrate, extending from the outlet end toward the inlet end of the substrate, covering less than the entire length of the substrate. As shown in FIG. 15, the upstream and downstream catalyst compositions of the top layer may be partially overlapping.

Figure 16:

In some aspects, a catalyst configuration includes a layered configuration, with a top layer including a Cu/Mn bimetallic molecular sieve and a bottom layer including a catalyst such as an SCR catalyst in an upstream portion of the bottom layer and another catalyst such as an SCR catalyst in a downstream portion of the bottom layer. For example, FIG. 16 shows a catalyst configuration with a top layer including a Cu/Mn bimetallic molecular sieve and a bottom layer including an Fe molecular sieve in an upstream portion, extending from the inlet end toward the outlet end of the substrate and covering less than the entire length, and a Cu molecular sieve also in the bottom layer, extending from the outlet end toward the inlet end of the substrate, covering less than the entire length of the substrate. As shown in FIG. 16, the upstream and downstream catalyst compositions of the bottom layer may be partially overlapping.

Figure 17:
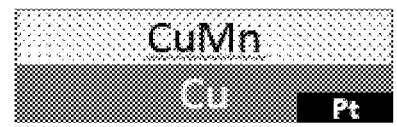

In some aspects, a catalyst configuration includes a layered configuration, with a PGM catalyst applied in a bottom layer, extending from the outlet end of the substrate toward the inlet end and covering less than the entire length of the substrate, a next layer with an additional catalyst such as an SCR catalyst covering the entire length of the substrate and covering the PGM catalyst, and a Cu/Mn bimetallic molecular sieve in a top layer. For example, FIG. 17 shows a catalyst configuration having a PGM catalyst applied in a bottom layer, extending from the outlet end of the substrate toward the inlet end and covering less than the entire length of the substrate, a Cu molecular sieve, extending the entire length of the substrate and covering the PGM catalyst, and a Cu/Mn bimetallic molecular sieve in a top layer, extending the entire length of the substrate and covering the Cu molecular sieve.

Figure 18:
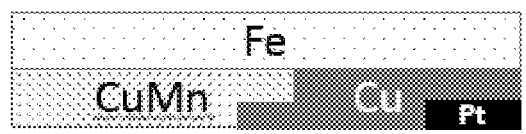

In some aspects, a catalyst configuration includes a layered configuration, with a PGM catalyst applied in a bottom layer, extending from the outlet end of the substrate toward the inlet end and covering less than the entire length of the substrate, a layer including a Cu/Mn bimetallic molecular sieve in an upstream portion of that layer and another catalyst such as an SCR catalyst in a downstream portion of that layer and covering the PGM catalyst, and with a top layer including a catalyst such as an SCR catalyst. For example, FIG. 18 shows a catalyst configuration with a PGM catalyst applied in a bottom layer, extending from the outlet end of the substrate toward the inlet end and covering less than the entire length of the substrate, a next layer including a Cu/Mn bimetallic molecular sieve in an upstream portion, extending from the inlet end toward the outlet end of the substrate and covering less than the entire length, and a Cu molecular sieve also in that layer, extending from the outlet end toward the inlet end of the substrate, covering the PGM catalyst and covering less than the entire length of the substrate, and a top layer including an Fe molecular sieve. As shown in FIG. 18, the Cu/Mn bimetallic molecular sieve and Cu molecular sieve catalysts may be partially overlapping.

Figure 19:

In some aspects, a catalyst configuration may include a PGM catalyst applied in a bottom layer, extending from the outlet end of the substrate toward the inlet end and covering less than the entire length of the substrate, a next layer having a catalyst such as an SCR catalyst extending the entire length of the substrate and covering the PGM catalyst, and a top layer with a catalyst such as an SCR catalyst in an upstream portion of the top layer and a Cu/Mn bimetallic molecular sieve in the downstream portion of the top layer. For example, FIG. 19 shows a catalyst configuration with a PGM catalyst applied in a bottom layer, extending from the outlet end of the substrate toward the inlet end and covering less than the entire length of the substrate, a next layer including a Cu molecular sieve which extends the entire length of the substrate and covers the PGM catalyst, and a top layer including an Fe molecular sieve in an upstream portion, extending from the inlet end toward the outlet end of the substrate and covering less than the entire length, and a Cu/Mn bimetallic molecular sieve also in the top layer, in a downstream portion of the substrate, extending from the outlet end toward the inlet end of the substrate, covering less than the entire length of the substrate. As shown in FIG. 19, the upstream and downstream catalyst compositions of the top layer may be partially overlapping.

Figure 20:
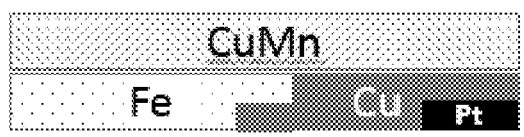

In some aspects, a catalyst configuration includes a layered configuration, with a PGM catalyst applied in a bottom layer, extending from the outlet end of the substrate toward the inlet end and covering less than the entire length of the substrate, a layer including a catalyst such as an SCR catalyst in an upstream portion of that layer and another catalyst such as an SCR catalyst in a downstream portion of that layer and covering the PGM catalyst, and with a top layer including a Cu/Mn bimetallic molecular sieve. For example, FIG. 20 shows a catalyst configuration with a PGM catalyst applied in a bottom layer, extending from the outlet end of the substrate toward the inlet end and covering less than the entire length of the substrate, a next layer including an Fe molecular sieve in an upstream portion, extending from the inlet end toward the outlet end of the substrate and covering less than the entire length, and a Cu molecular sieve also in that layer, extending from the outlet end toward the inlet end of the substrate, covering the PGM catalyst and covering less than the entire length of the substrate, and a top layer including Cu/Mn bimetallic molecular sieve which extends the full length of the substrate. As shown in FIG. 20, the Cu/Mn bimetallic molecular sieve and Cu molecular sieve catalysts may be partially overlapping.

Figure 21:

In some aspects, a catalyst configuration includes a layered configuration, with a Cu/Mn bimetallic molecular sieve in a top layer extending from the inlet end toward the outlet end of the substrate and covering less than the entire length of the substrate, and an additional catalyst such as an SCR catalyst in a bottom layer. In some aspects, both the top and bottom layer extend the entire length of the substrate. For example, FIG. 21 shows a catalyst configuration having a Cu/Mn bimetallic molecular sieve in a top layer, extending from the inlet end toward the outlet end of the substrate and covering less than the entire length of the substrate, and a Cu molecular sieve in a bottom layer, extending the entire length of the substrate.

Figure 22:
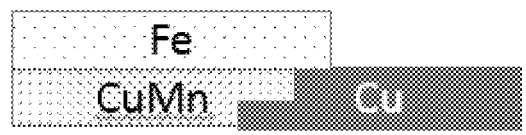

In some aspects, a catalyst configuration includes a layered configuration, with a top layer including a catalyst such as an SCR catalyst extending from the inlet end toward the outlet end of the substrate and covering less than the entire length of the substrate, and a bottom layer including a Cu/Mn bimetallic molecular sieve in an upstream portion of the bottom layer and another catalyst such as an SCR catalyst in a downstream portion of the bottom layer. For example, FIG. 22 shows a catalyst configuration with a top layer including an Fe molecular sieve extending from the inlet end toward the outlet end of the substrate and covering less than the entire length of the substrate, and a bottom layer including a Cu/Mn bimetallic molecular sieve in an upstream portion, extending from the inlet end toward the outlet end of the substrate and covering less than the entire length, and a Cu molecular sieve also in the bottom layer, extending from the outlet end toward the inlet end of the substrate, covering less than the entire length of the substrate. As shown in FIG. 22, the upstream and downstream catalyst compositions of the bottom layer may be partially overlapping.

Figure 23:

In some aspects, a catalyst configuration includes a layered configuration, with a top layer including a Cu/Mn bimetallic molecular sieve extending from the inlet end toward the outlet end of the substrate and covering less than the entire length of the substrate, and a bottom layer including a catalyst such as an SCR catalyst in an upstream portion of the bottom layer and another catalyst such as an SCR catalyst in a downstream portion of the bottom layer. For example, FIG. 23 shows a catalyst configuration with a top layer including a Cu/Mn bimetallic molecular sieve extending from the inlet end toward the outlet end of the substrate and covering less than the entire length of the substrate, and a bottom layer including an Fe molecular sieve in an upstream portion, extending from the inlet end toward the outlet end of the substrate and covering less than the entire length, and a Cu molecular sieve also in the bottom layer, extending from the outlet end toward the inlet end of the substrate, covering less than the entire length of the substrate. As shown in FIG. 23, the upstream and downstream catalyst compositions of the bottom layer may be partially overlapping.

Figure 24:

In some aspects, a catalyst configuration includes a layered configuration, with a PGM catalyst applied in a bottom layer, extending from the outlet end of the substrate toward the inlet end and covering less than the entire length of the substrate, a next layer with an additional catalyst such as an SCR catalyst covering the entire length of the substrate and covering the PGM catalyst, and a Cu/Mn bimetallic molecular sieve in a top layer extending from the inlet end toward the outlet end of the substrate and covering less than the entire length of the substrate. For example, FIG. 24 shows a catalyst configuration having a PGM catalyst applied in a bottom layer, extending from the outlet end of the substrate toward the inlet end and covering less than the entire length of the substrate, a Cu molecular sieve, extending the entire length of the substrate and covering the PGM catalyst, and a Cu/Mn bimetallic molecular sieve in a top layer, extending from the inlet end toward the outlet end of the substrate and covering less than the entire length of the substrate.

Figure 25:
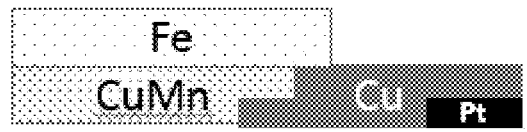

In some aspects, a catalyst configuration includes a layered configuration, with a PGM catalyst applied in a bottom layer, extending from the outlet end of the substrate toward the inlet end and covering less than the entire length of the substrate, a layer including a Cu/Mn bimetallic molecular sieve in an upstream portion of that layer and another catalyst such as an SCR catalyst in a downstream portion of that layer and covering the PGM catalyst, and with a top layer including a catalyst such as an SCR catalyst extending from the inlet end toward the outlet end of the substrate and covering less than the entire length of the substrate. For example, FIG. 25 shows a catalyst configuration with a PGM catalyst applied in a bottom layer, extending from the outlet end of the substrate toward the inlet end and covering less than the entire length of the substrate, a next layer including a Cu/Mn bimetallic molecular sieve in an upstream portion, extending from the inlet end toward the outlet end of the substrate and covering less than the entire length, and a Cu molecular sieve also in that layer, extending from the outlet end toward the inlet end of the substrate, covering the PGM catalyst and covering less than the entire length of the substrate, and a top layer including an Fe molecular sieve extending from the inlet end toward the outlet end of the substrate and covering less than the entire length of the substrate. As shown in FIG. 25, the Cu/Mn bimetallic molecular sieve and Cu molecular sieve catalysts may be partially overlapping.

Figure 26:
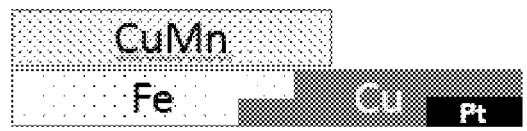

In some aspects, a catalyst configuration includes a layered configuration, with a PGM catalyst applied in a bottom layer, extending from the outlet end of the substrate toward the inlet end and covering less than the entire length of the substrate, a layer including a catalyst such as an SCR catalyst in an upstream portion of that layer and another catalyst such as an SCR catalyst in a downstream portion of that layer and covering the PGM catalyst, and with a top layer including a Cu/Mn bimetallic molecular sieve extending from the inlet end toward the outlet end of the substrate and covering less than the entire length of the substrate. For example, FIG. 26 shows a catalyst configuration with a PGM catalyst applied in a bottom layer, extending from the outlet end of the substrate toward the inlet end and covering less than the entire length of the substrate, a next layer including an Fe molecular sieve in an upstream portion, extending from the inlet end toward the outlet end of the substrate and covering less than the entire length, and a Cu molecular sieve also in that layer, extending from the outlet end toward the inlet end of the substrate, covering the PGM catalyst and covering less than the entire length of the substrate, and a top layer including Cu/Mn bimetallic molecular sieve extending from the inlet end toward the outlet end of the substrate and covering less than the entire length of the substrate. As shown in FIG. 26, the Cu/Mn bimetallic molecular sieve and Cu molecular sieve catalysts may be partially overlapping.

Figure 27A:
Figure 27B:
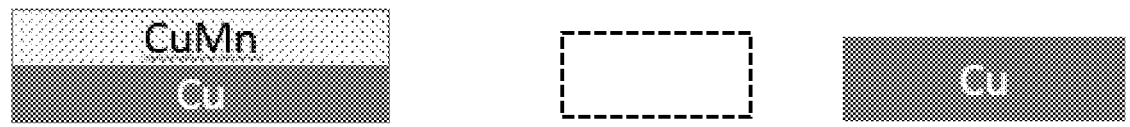

In some aspects, a catalyst configuration includes a layered configuration and multiple substrates, with first upstream substrate having a Cu/Mn bimetallic molecular sieve in a top layer, and an additional catalyst such as an SCR catalyst in a bottom layer, and a separate downstream substrate having an additional catalyst such as an SCR catalyst. In some aspects, a catalyst configuration includes an additional catalyst between the first upstream substrate and the downstream substrate. For example, FIG. 27a shows a catalyst configuration with a first upstream substrate having Cu/Mn bimetallic molecular sieve in a top layer, extending the entire length of the substrate, and a Cu molecular sieve in a bottom layer, extending the entire length of the substrate and a downstream substrate including a Cu molecular sieve. FIG. 27b shows the catalyst configuration of FIG. 27a, further including an additional catalyst between the first upstream substrate and the downstream substrate.

Figure 28A:
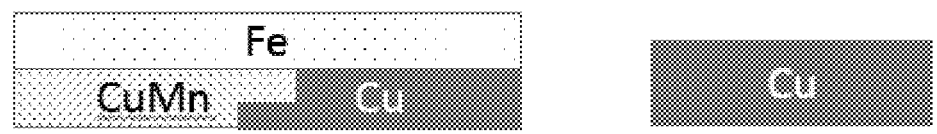
Figure 28B:
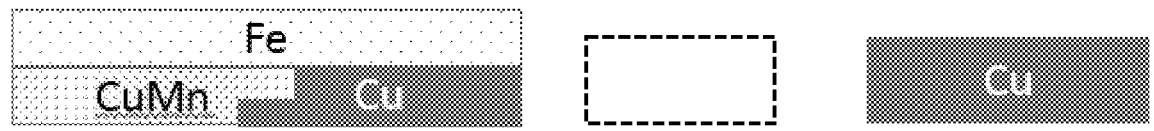

In some aspects, a catalyst configuration includes a layered configuration and multiple substrates, with a first upstream substrate having a top layer including a catalyst such as an SCR catalyst and a bottom layer including a Cu/Mn bimetallic molecular sieve in an upstream portion of the bottom layer and another catalyst such as an SCR catalyst in a downstream portion of the bottom layer, and a separate downstream substrate having an additional catalyst such as an SCR catalyst. In some aspects, a catalyst configuration includes an additional catalyst between the first upstream substrate and the downstream substrate. For example, FIG. 28a shows a catalyst configuration with a first upstream substrate having a top layer including an Fe molecular sieve and a bottom layer including a Cu/Mn bimetallic molecular sieve in an upstream portion, extending from the inlet end toward the outlet end of the substrate and covering less than the entire length, and a Cu molecular sieve also in the bottom layer, extending from the outlet end toward the inlet end of the substrate, covering less than the entire length of the substrate, and a downstream substrate including a Cu molecular sieve. As shown in FIG. 28, the upstream and downstream catalyst compositions of the bottom layer may be partially overlapping. FIG. 28b shows the catalyst configuration of FIG. 28a, further including an additional catalyst between the first upstream substrate and the downstream substrate.

Figure 29A:
Figure 29B:
Figure 30A:
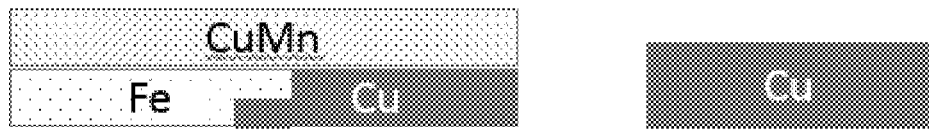
Figure 30B:
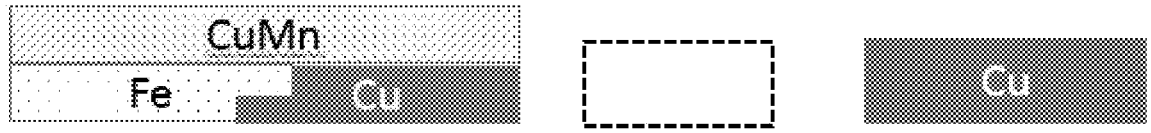

In some aspects, a catalyst configuration may include a first upstream substrate with a bottom layer having a catalyst such as an SCR catalyst, and a top layer with a catalyst such as an SCR catalyst in an upstream portion of the top layer and a Cu/Mn bimetallic molecular sieve in the downstream portion of the top layer, and a separate downstream substrate having an additional catalyst such as an SCR catalyst. In some aspects, a catalyst configuration includes an additional catalyst between the first upstream substrate and the downstream substrate. For example, FIG. 29a shows a catalyst configuration with first upstream substrate having a bottom layer including a Cu molecular sieve and a top layer including an Fe molecular sieve in an upstream portion, extending from the inlet end toward the outlet end of the substrate and covering less than the entire length, and a Cu/Mn bimetallic molecular sieve also in the top layer, in a downstream portion of the substrate, extending from the outlet end toward the inlet end of the substrate, covering less than the entire length of the substrate, and a downstream substrate including a Cu molecular sieve. FIG. 29b shows the catalyst configuration of FIG. 29a, further including an additional catalyst between the first upstream substrate and the downstream substrate In some aspects, a catalyst configuration includes a layered configuration with multiple substrates, with a first upstream substrate having a top layer including a Cu/Mn bimetallic molecular sieve and a bottom layer including a catalyst such as an SCR catalyst in an upstream portion of the bottom layer and another catalyst such as an SCR catalyst in a downstream portion of the bottom layer, and a separate downstream substrate having an additional catalyst such as an SCR catalyst. In some aspects, a catalyst configuration includes an additional catalyst between the first upstream substrate and the downstream substrate. For example, FIG. 30a shows a catalyst configuration with first upstream substrate having a top layer including a Cu/Mn bimetallic molecular sieve and a bottom layer including an Fe molecular sieve in an upstream portion, extending from the inlet end toward the outlet end of the substrate and covering less than the entire length, and a Cu molecular sieve also in the bottom layer, extending from the outlet end toward the inlet end of the substrate, covering less than the entire length of the substrate, and a downstream substrate including a Cu molecular sieve. FIG. 30b shows the catalyst configuration of FIG. 30a, further including an additional catalyst between the first upstream substrate and the downstream substrate.

Figure 31A:
Figure 31B:
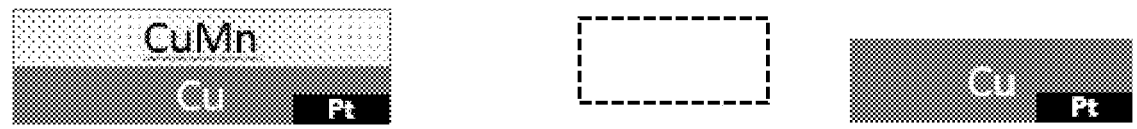

In some aspects, a catalyst configuration includes a layered configuration and multiple substrates, with first upstream substrate having a Cu/Mn bimetallic molecular sieve in a top layer, and an additional catalyst such as an SCR catalyst in a bottom layer, and a separate downstream substrate having an additional catalyst such as an SCR catalyst, and further having a PGM catalyst applied in a bottom layer extending from the outlet end toward the inlet end of one or both substrate(s), extending less than the entire length of the substrate. In some aspects, a catalyst configuration includes an additional catalyst between the first upstream substrate and the downstream substrate. For example, FIG. 31a shows a catalyst configuration with a first upstream substrate having Cu/Mn bimetallic molecular sieve in a top layer, extending the entire length of the substrate, and a Cu molecular sieve in a bottom layer, extending the entire length of the substrate, and a downstream substrate including PGM catalyst applied in a bottom layer extending from the outlet end toward the inlet end of the substrate, extending less than the entire length of the substrate, and a top layer including a Cu molecular sieve covering the PGM catalyst and the entire length of the substrate. FIG. 31b shows a first upstream substrate including a catalyst configuration having a PGM catalyst applied in a bottom layer, extending from the outlet end of the substrate toward the inlet end and covering less than the entire length of the substrate, a Cu molecular sieve, extending the entire length of the substrate and covering the PGM catalyst, and a Cu/Mn bimetallic molecular sieve in a top layer, extending the entire length of the substrate and covering the Cu molecular sieve, and a downstream substrate including PGM catalyst applied in a bottom layer extending from the outlet end toward the inlet end of the substrate, extending less than the entire length of the substrate, and a top layer including a Cu molecular sieve covering the PGM catalyst and the entire length of the substrate, further including an additional catalyst between the first upstream substrate and the downstream substrate.

Figure 32A:
Figure 32B:
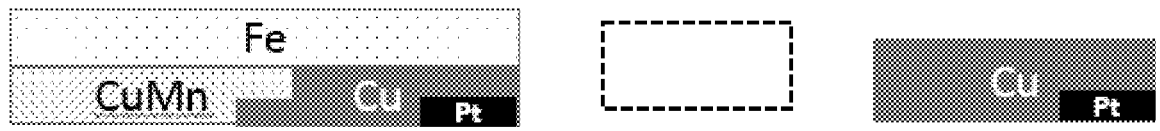

In some aspects, a catalyst configuration includes a layered configuration and multiple substrates, with a first upstream substrate having a top layer including a catalyst such as an SCR catalyst and a bottom layer including a Cu/Mn bimetallic molecular sieve in an upstream portion of the bottom layer and another catalyst such as an SCR catalyst in a downstream portion of the bottom layer, and a separate downstream substrate having an additional catalyst such as an SCR catalyst, and further having a PGM catalyst applied in a bottom layer extending from the outlet end toward the inlet end of one or both substrate(s), extending less than the entire length of the substrate. In some aspects, a catalyst configuration includes an additional catalyst between the first upstream substrate and the downstream substrate. For example, FIG. 32a shows a catalyst configuration with a first upstream substrate having a top layer including an Fe molecular sieve and a bottom layer including a Cu/Mn bimetallic molecular sieve in an upstream portion, extending from the inlet end toward the outlet end of the substrate and covering less than the entire length, and a Cu molecular sieve also in the bottom layer, extending from the outlet end toward the inlet end of the substrate, covering less than the entire length of the substrate, and a downstream substrate including PGM catalyst applied in a bottom layer extending from the outlet end toward the inlet end of the substrate, extending less than the entire length of the substrate, and a top layer including a Cu molecular sieve covering the PGM catalyst and the entire length of the substrate. FIG. 32b shows a first upstream substrate including a PGM catalyst applied in a bottom layer, extending from the outlet end of the substrate toward the inlet end and covering less than the entire length of the substrate, a next layer including a Cu/Mn bimetallic molecular sieve in an upstream portion, extending from the inlet end toward the outlet end of the substrate and covering less than the entire length, and a Cu molecular sieve also in that layer, extending from the outlet end toward the inlet end of the substrate, covering the PGM catalyst and covering less than the entire length of the substrate, and a top layer including an Fe molecular sieve, and a downstream substrate including PGM catalyst applied in a bottom layer extending from the outlet end toward the inlet end of the substrate, extending less than the entire length of the substrate, and a top layer including a Cu molecular sieve covering the PGM catalyst and the entire length of the substrate, further including an additional catalyst between the first upstream substrate and the downstream substrate.

Figure 33A:
Figure 33B:

In some aspects, a catalyst configuration may include a first upstream substrate with a bottom layer having a catalyst such as an SCR catalyst, and a top layer with a catalyst such as an SCR catalyst in an upstream portion of the top layer and a Cu/Mn bimetallic molecular sieve in the downstream portion of the top layer, and a separate downstream substrate having an additional catalyst such as an SCR catalyst, and further having a PGM catalyst applied in a bottom layer extending from the outlet end toward the inlet end of one or both substrate(s), extending less than the entire length of the substrate. In some aspects, a catalyst configuration includes an additional catalyst between the first upstream substrate and the downstream substrate. For example, FIG. 33a shows a catalyst configuration with first upstream substrate having a bottom layer including a Cu molecular sieve and a top layer including an Fe molecular sieve in an upstream portion, extending from the inlet end toward the outlet end of the substrate and covering less than the entire length, and a Cu/Mn bimetallic molecular sieve also in the top layer, in a downstream portion of the substrate, extending from the outlet end toward the inlet end of the substrate, covering less than the entire length of the substrate, and a downstream substrate including PGM catalyst applied in a bottom layer extending from the outlet end toward the inlet end of the substrate, extending less than the entire length of the substrate, and a top layer including a Cu molecular sieve covering the PGM catalyst and the entire length of the substrate. FIG. 33b shows a first upstream substrate including a PGM catalyst applied in a bottom layer, extending from the outlet end of the substrate toward the inlet end and covering less than the entire length of the substrate, a next layer including a Cu molecular sieve which extends the entire length of the substrate and covers the PGM catalyst, and a top layer including an Fe molecular sieve in an upstream portion, extending from the inlet end toward the outlet end of the substrate and covering less than the entire length, and a Cu/Mn bimetallic molecular sieve also in the top layer, in a downstream portion of the substrate, extending from the outlet end toward the inlet end of the substrate, covering less than the entire length of the substrate, and a downstream substrate including PGM catalyst applied in a bottom layer extending from the outlet end toward the inlet end of the substrate, extending less than the entire length of the substrate, and a top layer including a Cu molecular sieve covering the PGM catalyst and the entire length of the substrate, further including an additional catalyst between the first upstream substrate and the downstream substrate.

Figure 34A:
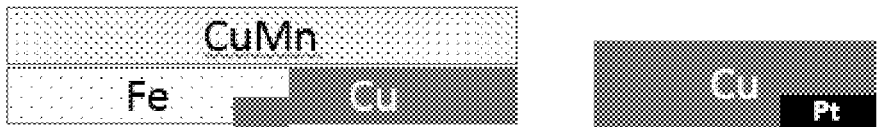
Figure 34B:

In some aspects, a catalyst configuration includes a layered configuration with multiple substrates, with a first upstream substrate having a top layer including a Cu/Mn bimetallic molecular sieve and a bottom layer including a catalyst such as an SCR catalyst in an upstream portion of the bottom layer and another catalyst such as an SCR catalyst in a downstream portion of the bottom layer, and a separate downstream substrate having an additional catalyst such as an SCR catalyst, and further having a PGM catalyst applied in a bottom layer extending from the outlet end toward the inlet end of one or both substrate(s), extending less than the entire length of the substrate. In some aspects, a catalyst configuration includes an additional catalyst between the first upstream substrate and the downstream substrate. For example, FIG. 34a shows a catalyst configuration with first upstream substrate having a top layer including a Cu/Mn bimetallic molecular sieve and a bottom layer including an Fe molecular sieve in an upstream portion, extending from the inlet end toward the outlet end of the substrate and covering less than the entire length, and a Cu molecular sieve also in the bottom layer, extending from the outlet end toward the inlet end of the substrate, covering less than the entire length of the substrate, and a downstream substrate including PGM catalyst applied in a bottom layer extending from the outlet end toward the inlet end of the substrate, extending less than the entire length of the substrate, and a top layer including a Cu molecular sieve covering the PGM catalyst and the entire length of the substrate. FIG. 34b shows a catalyst configuration having a first upstream substrate with a PGM catalyst applied in a bottom layer, extending from the outlet end of the substrate toward the inlet end and covering less than the entire length of the substrate, a next layer including an Fe molecular sieve in an upstream portion, extending from the inlet end toward the outlet end of the substrate and covering less than the entire length, and a Cu molecular sieve also in that layer, extending from the outlet end toward the inlet end of the substrate, covering the PGM catalyst and covering less than the entire length of the substrate, and a top layer including Cu/Mn bimetallic molecular sieve which extends the full length of the substrate, and a downstream substrate including PGM catalyst applied in a bottom layer extending from the outlet end toward the inlet end of the substrate, extending less than the entire length of the substrate, and a top layer including a Cu molecular sieve covering the PGM catalyst and the entire length of the substrate, further including an additional catalyst between the first upstream substrate and the downstream substrate.

Figure 35A:
Figure 35B:

In some aspects, a catalyst configuration includes a layered configuration and multiple substrates, with first upstream substrate having a Cu/Mn bimetallic molecular sieve in a top layer extending from the inlet end of the substrate toward the outlet end and covering less than the entire length of the substrate, and an additional catalyst such as an SCR catalyst in a bottom layer, and a separate downstream substrate having an additional catalyst such as an SCR catalyst. In some aspects, a catalyst configuration includes an additional catalyst between the first upstream substrate and the downstream substrate. For example, FIG. 35a shows a catalyst configuration with a first upstream substrate having Cu/Mn bimetallic molecular sieve in a top layer, extending from the inlet end of the substrate toward the outlet end and covering less than the entire length of the substrate, and a Cu molecular sieve in a bottom layer, extending the entire length of the substrate and a downstream substrate including a Cu molecular sieve. FIG. 35b shows the catalyst configuration of FIG. 35a, further including an additional catalyst between the first upstream substrate and the downstream substrate.

Figure 36A:
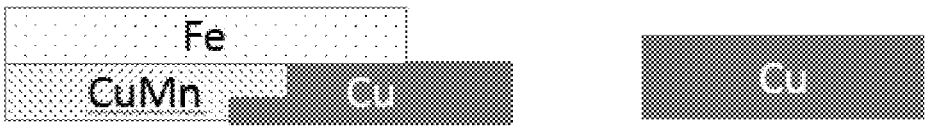
Figure 36B:
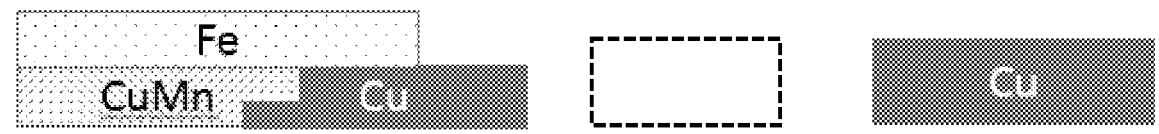

In some aspects, a catalyst configuration includes a layered configuration and multiple substrates, with a first upstream substrate having a top layer including a catalyst such as an SCR catalyst, extending from the inlet end of the substrate toward the outlet end and covering less than the entire length of the substrate, and a bottom layer including a Cu/Mn bimetallic molecular sieve in an upstream portion of the bottom layer and another catalyst such as an SCR catalyst in a downstream portion of the bottom layer, and a separate downstream substrate having an additional catalyst such as an SCR catalyst. In some aspects, a catalyst configuration includes an additional catalyst between the first upstream substrate and the downstream substrate. For example, FIG. 36a shows a catalyst configuration with a first upstream substrate having a top layer including an Fe molecular sieve, extending from the inlet end of the substrate toward the outlet end and covering less than the entire length of the substrate, and a bottom layer including a Cu/Mn bimetallic molecular sieve in an upstream portion, extending from the inlet end toward the outlet end of the substrate and covering less than the entire length, and a Cu molecular sieve also in the bottom layer, extending from the outlet end toward the inlet end of the substrate, covering less than the entire length of the substrate, and a downstream substrate including a Cu molecular sieve. As shown in FIG. 36, the upstream and downstream catalyst compositions of the bottom layer may be partially overlapping. FIG. 36b shows the catalyst configuration of FIG. 36a, further including an additional catalyst between the first upstream substrate and the downstream substrate.

In some aspects, a catalyst configuration includes a layered configuration with multiple substrates, with a first upstream substrate having a top layer including a Cu/Mn bimetallic molecular sieve, extending from the inlet end of the substrate toward the outlet end and covering less than the entire length of the substrate, and a bottom layer including a catalyst such as an SCR catalyst in an upstream portion of the bottom layer and another catalyst such as an SCR catalyst in a downstream portion of the bottom layer, and a separate downstream substrate having an additional catalyst such as an SCR catalyst. In some aspects, a catalyst configuration includes an additional catalyst between the first upstream substrate and the downstream substrate. For example, FIG. 37a shows a catalyst configuration with first upstream substrate having a top layer including a Cu/Mn bimetallic molecular sieve, extending from the inlet end of the substrate toward the outlet end and covering less than the entire length of the substrate, and a bottom layer including an Fe molecular sieve in an upstream portion, extending from the inlet end toward the outlet end of the substrate and covering less than the entire length, and a Cu molecular sieve also in the bottom layer, extending from the outlet end toward the inlet end of the substrate, covering less than the entire length of the substrate, and a downstream substrate including a Cu molecular sieve. FIG. 37b shows the catalyst configuration of FIG. 37a, further including an additional catalyst between the first upstream substrate and the downstream substrate.

In some aspects, a catalyst configuration includes a layered configuration and multiple substrates, with first upstream substrate having a Cu/Mn bimetallic molecular sieve in a top layer, extending from the inlet end of the substrate toward the outlet end and covering less than the entire length of the substrate, and an additional catalyst such as an SCR catalyst in a bottom layer, and a separate downstream substrate having an additional catalyst such as an SCR catalyst, and further having a PGM catalyst applied in a bottom layer extending from the outlet end toward the inlet end of one or both substrate(s), extending less than the entire length of the substrate. In some aspects, a catalyst configuration includes an additional catalyst between the first upstream substrate and the downstream substrate. For example, FIG. 38a shows a catalyst configuration with a first upstream substrate having Cu/Mn bimetallic molecular sieve in a top layer, extending from the inlet end of the substrate toward the outlet end and covering less than the entire length of the substrate, and a Cu molecular sieve in a bottom layer, extending the entire length of the substrate, and a downstream substrate including PGM catalyst applied in a bottom layer extending from the outlet end toward the inlet end of the substrate, extending less than the entire length of the substrate, and a top layer including a Cu molecular sieve covering the PGM catalyst and the entire length of the substrate. FIG. 38b shows a first upstream substrate including a catalyst configuration having a PGM catalyst applied in a bottom layer, extending from the outlet end of the substrate toward the inlet end and covering less than the entire length of the substrate, a Cu molecular sieve, extending the entire length of the substrate and covering the PGM catalyst, and a Cu/Mn bimetallic molecular sieve in a top layer, extending from the inlet end of the substrate toward the outlet end and covering less than the entire length of the substrate, and a downstream substrate including PGM catalyst applied in a bottom layer extending from the outlet end toward the inlet end of the substrate, extending less than the entire length of the substrate, and a top layer including a Cu molecular sieve covering the PGM catalyst and the entire length of the substrate, further including an additional catalyst between the first upstream substrate and the downstream substrate.

Figure 39A:
Figure 39B:

In some aspects, a catalyst configuration includes a layered configuration and multiple substrates, with a first upstream substrate having a top layer including a catalyst such as an SCR catalyst, extending from the inlet end of the substrate toward the outlet end and covering less than the entire length of the substrate, and a bottom layer including a Cu/Mn bimetallic molecular sieve in an upstream portion of the bottom layer and another catalyst such as an SCR catalyst in a downstream portion of the bottom layer, and a separate downstream substrate having an additional catalyst such as an SCR catalyst, and further having a PGM catalyst applied in a bottom layer extending from the outlet end toward the inlet end of one or both substrate(s), extending less than the entire length of the substrate. In some aspects, a catalyst configuration includes an additional catalyst between the first upstream substrate and the downstream substrate. For example, FIG. 39a shows a catalyst configuration with a first upstream substrate having a top layer including an Fe molecular sieve, extending from the inlet end of the substrate toward the outlet end and covering less than the entire length of the substrate, and a bottom layer including a Cu/Mn bimetallic molecular sieve in an upstream portion, extending from the inlet end toward the outlet end of the substrate and covering less than the entire length, and a Cu molecular sieve also in the bottom layer, extending from the outlet end toward the inlet end of the substrate, covering less than the entire length of the substrate, and a downstream substrate including PGM catalyst applied in a bottom layer extending from the outlet end toward the inlet end of the substrate, extending less than the entire length of the substrate, and a top layer including a Cu molecular sieve covering the PGM catalyst and the entire length of the substrate. FIG. 39b shows a first upstream substrate including a PGM catalyst applied in a bottom layer, extending from the outlet end of the substrate toward the inlet end and covering less than the entire length of the substrate, a next layer including a Cu/Mn bimetallic molecular sieve in an upstream portion, extending from the inlet end toward the outlet end of the substrate and covering less than the entire length, and a Cu molecular sieve also in that layer, extending from the outlet end toward the inlet end of the substrate, covering the PGM catalyst and covering less than the entire length of the substrate, and a top layer including an Fe molecular sieve, extending from the inlet end of the substrate toward the outlet end and covering less than the entire length of the substrate, and a downstream substrate including PGM catalyst applied in a bottom layer extending from the outlet end toward the inlet end of the substrate, extending less than the entire length of the substrate, and a top layer including a Cu molecular sieve covering the PGM catalyst and the entire length of the substrate, further including an additional catalyst between the first upstream substrate and the downstream substrate.

Figure 40A:
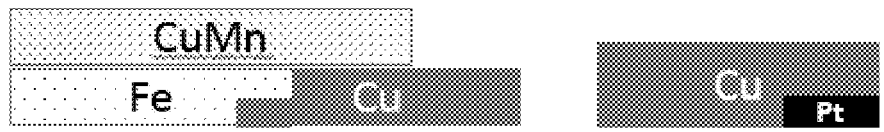
Figure 40B:
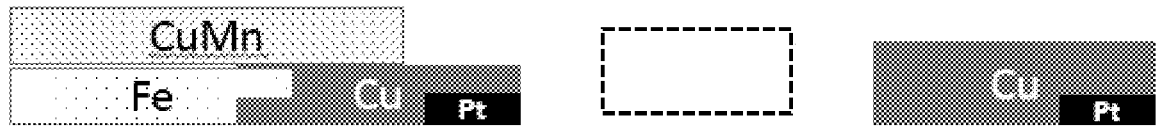

In some aspects, a catalyst configuration includes a layered configuration with multiple substrates, with a first upstream substrate having a top layer including a Cu/Mn bimetallic molecular sieve, extending from the inlet end of the substrate toward the outlet end and covering less than the entire length of the substrate, and a bottom layer including a catalyst such as an SCR catalyst in an upstream portion of the bottom layer and another catalyst such as an SCR catalyst in a downstream portion of the bottom layer, and a separate downstream substrate having an additional catalyst such as an SCR catalyst, and further having a PGM catalyst applied in a bottom layer extending from the outlet end toward the inlet end of one or both substrate(s), extending less than the entire length of the substrate. In some aspects, a catalyst configuration includes an additional catalyst between the first upstream substrate and the downstream substrate. For example, FIG. 40a shows a catalyst configuration with first upstream substrate having a top layer including a Cu/Mn bimetallic molecular sieve, extending from the inlet end of the substrate toward the outlet end and covering less than the entire length of the substrate, and a bottom layer including an Fe molecular sieve in an upstream portion, extending from the inlet end toward the outlet end of the substrate and covering less than the entire length, and a Cu molecular sieve also in the bottom layer, extending from the outlet end toward the inlet end of the substrate, covering less than the entire length of the substrate, and a downstream substrate including PGM catalyst applied in a bottom layer extending from the outlet end toward the inlet end of the substrate, extending less than the entire length of the substrate, and a top layer including a Cu molecular sieve covering the PGM catalyst and the entire length of the substrate. FIG. 40b shows a catalyst configuration having a first upstream substrate with a PGM catalyst applied in a bottom layer, extending from the outlet end of the substrate toward the inlet end and covering less than the entire length of the substrate, a next layer including an Fe molecular sieve in an upstream portion, extending from the inlet end toward the outlet end of the substrate and covering less than the entire length, and a Cu molecular sieve also in that layer, extending from the outlet end toward the inlet end of the substrate, covering the PGM catalyst and covering less than the entire length of the substrate, and a top layer including Cu/Mn bimetallic molecular sieve, extending from the inlet end of the substrate toward the outlet end and covering less than the entire length of the substrate, and a downstream substrate including PGM catalyst applied in a bottom layer extending from the outlet end toward the inlet end of the substrate, extending less than the entire length of the substrate, and a top layer including a Cu molecular sieve covering the PGM catalyst and the entire length of the substrate, further including an additional catalyst between the first upstream substrate and the downstream substrate.

Benefits

It has surprisingly been discovered that catalyst compositions of aspects of the present invention, comprising a molecular sieve with exchanged copper and exchanged manganese, have distinct advantages for the selective catalytic reduction process. Such catalyst compositions have been found to promote a reaction of $NH_3$ with NOx to form nitrogen and water, i.e., selective catalytic reduction (SCR), with low $N_2O$ production. Additionally, such catalyst compositions have been found to enhance light-off and lower $N_2O$ selectivity, and are stable to 900° C. aging while still retaining good $NO_x$ conversion and $N_2O$ selectivity; aging, for example, includes 5 hours at 4.5% $H_2O$. For example, a bimetallic Cu/Mn molecular sieve was found to exhibit similar or improved activity and improved selectivity compared to a monometallic Cu molecular sieve, a monometallic Mn molecular sieve, and physically mixed Cu molecular sieve/Mn molecular sieve under typical SCR conditions. It is understood that such comparisons refer to molecular sieves containing the same or substantially the same total amount of transition metals. Such results may support a theory of balancing active sites in order to balance fundamental reaction steps to optimize performance.

In the below discussion, $N_2O$ selectivity is defined as the moles $N_2O$ formed divided by the moles of $NO_x$ (NOx defined as NO and $NO_2$) converted, average $N_2O$ selectivity is defined as the $N_2O$ selectivity averaged across the tested temperature range of 150° C.-500° C., average $N_2O$ production is defined as the amount of $N_2O$ produced averaged across the tested temperature range of 150° C.-500° C., and total $NO_x$ conversion is defined as the average % $NO_x$ converted across the tested temperature range of 150° C.-500° C.

Standard SCR

It has been found that catalyst compositions of the present invention produce significantly less $N_2O$ and similar or higher $NO_x$ conversion when compared to monometallic molecular sieves, such as Cu-exchanged molecular sieves under standard SCR conditions. Standard SCR conditions may comprise, for example, 500 ppm $NH_3$, 500 ppm NO, 0 ppm $NO_2$, 14% $O_2$, 4.6% $H_2O$, 5.0% $CO_2$, and a balance of $N_2$ at a space velocity of 90 K $h^{-1}$.

In some aspects, a catalyst composition of the present invention produces about 33% less $N_2O$ and similar total $NO_x$ conversion under standard SCR conditions compared to a Cu-exchanged molecular sieve. In some aspects, a catalyst composition of the present invention produces about 20% to about 45%; about 25% to about 40%; or about 30% to about 35% less $N_2O$ under standard SCR conditions compared to a Cu-exchanged molecular sieve.

In some aspects, a catalyst composition of the present invention produces about 65% less $N_2O$ and converts about 45% more total $NO_x$ under standard SCR conditions than a Mn-exchanged molecular sieve. In some aspects, a catalyst composition of the present invention produces about 50% to about 80%; about 55% to about 75%; or about 60% to about 70% less $N_2O$ under standard SCR conditions than a Mn-exchanged molecular sieve. In some aspects, a catalyst composition of the present invention converts about 30% to about 60%; about 35% to about 55%; or about 40% to about 50% more total $NO_x$ under standard SCR conditions than a Mn-exchanged molecular sieve.

In some aspects, a catalyst composition of the present invention produces about 4% less $N_2O$ and converts about 12% more total $NO_x$ under standard SCR conditions than a physical mixture of a Cu-exchanged molecular sieve and a Mn-exchanged molecular sieve. In some aspects, a catalyst composition of the present invention produces about 1% to about 15%; about 1% to about 10%; or about 2% to about 7% less $N_2O$ under standard SCR conditions than a physical mixture of a Cu-exchanged molecular sieve and a Mn-exchanged molecular sieve. In some aspects, a catalyst composition of the present invention converts about 1% to about 25%; about 5% to about 20%; or about 10% to about 15% more total $NO_x$ under standard SCR conditions than a physical mixture of a Cu-exchanged molecular sieve and a Mn-exchanged molecular sieve.

Fast SCR

It has been found that catalyst compositions of the present invention produce significantly less $N_2O$ and similar or higher $NO_x$ conversion when compared to monometallic molecular sieves, such as Cu-exchanged molecular sieves under fast SCR conditions. Fast SCR conditions may comprise, for example, 500 ppm $NH_3$, 250 ppm NO, 250 ppm $NO_2$, 14% $O_2$, 4.6% $H_2O$, 5.0% $CO_2$, and a balance of $N_2$ at a space velocity of 90 K $h^{-1}$. Unlike Cu+Mn at "standard" conditions, which gives better $N_2O$ performance but slightly less NOx conversion, the Cu+Mn gives better NOx conversion performance and better $N_2O$ performance when $NO_2$ is present—which may be more like real-world conditions. In some aspects, a catalyst composition of the present invention produces about 42% less $N_2O$ and converts about 5% more total $NO_x$ under fast SCR conditions compared to a Cu-exchanged molecular sieve. In some aspects, a catalyst composition of the present invention produces about 25% to about 60%; about 30% to about 50%; or about 35% to about 45% less $N_2O$ under fast SCR conditions compared to a Cu-exchanged molecular sieve. In some aspects, a catalyst composition of the present invention converts about 1% to about 20%; about 1% to about 15%; or about 1% to about 10% more total $NO_x$ under fast SCR conditions compared to a Cu-exchanged molecular sieve.

Slow SCR

It has been found that catalyst compositions of the present invention produce significantly less $N_2O$ and similar or higher $NO_x$ conversion when compared to monometallic molecular sieves, such as Cu-exchanged molecular sieves under slow SCR conditions. Slow SCR conditions may comprise, for example, 500 ppm $NH_3$, 175 ppm NO, 325 ppm $NO_2$, 14% $O_2$, 4.6% $H_2O$, 5.0% $CO_2$, and a balance of $N_2$ at a space velocity of 90 K $h^{-1}$. In some aspects, a catalyst composition of the present invention produces about 33% less $N_2O$ and similar total $NO_x$ conversion under slow SCR conditions compared to a Cu-exchanged molecular sieve. In some aspects, a catalyst composition of the present invention produces about 20% to about 45%; about 25% to about 40%; or about 30% to about 35% less $N_2O$ under slow SCR conditions compared to a Cu-exchanged molecular sieve.

Aging

It has been found that catalyst compositions of the present invention may be stable to harsh 900° C. aging while still retaining good $NO_x$ conversion and $N_2O$ selectivity. After hydrothermal aging at 900° C. while under standard SCR conditions, it has been found that catalyst compositions of the present invention produce significantly less $N_2O$ and similar $NO_x$ conversion when compared to monometallic molecular sieves, such as Cu-exchanged molecular sieves. In some aspects, a catalyst composition of the present invention produces about 48% less $N_2O$ and similar total $NO_x$ conversion under standard SCR conditions after 900° C. aging compared to a Cu-exchanged molecular sieve. In some aspects, a catalyst composition of the present invention produces about 35% to about 65%; about 40% to about 60%; or about 45% to about 55% less $N_2O$ under standard SCR conditions after 900° C. aging compared to a Cu-exchanged molecular sieve.

EXAMPLES

Example 1—Standard SCR

Molecular sieves were impregnated with metals using the required amount of manganese (II) acetate and/or copper (II) acetate dissolved in de-mineralized water. The metal-impregnated samples were dried overnight at 80° C. and then calcined in air at 550° C. for 4 hours. Catalysts were prepared having the following formulations:

AEI zeolite with 1.5 wt % exchanged Cu and 1.5 wt % exchanged Mn (1.5Cu-1.5Mn.AEI)

AEI zeolite with 2 wt % exchanged Cu and 2 wt % exchanged Mn (2Cu-2Mn.AEI)

AEI zeolite with 3 wt % exchanged Cu (3Cu.AEI)

Pelletized samples of the powder catalysts were then tested for $NO_x$ conversion and $N_2O$ production in the following conditions: 500 ppm $NH_3$, 500 ppm NO, 0 ppm $NO_2$, 14% $O_2$, 4.6% $H_2O$, 5.0% $CO_2$, and a balance of $N_2$ at a space velocity of 90 K $h^{-1}$. The samples were heated from room temperature to 150° C. under the above-mentioned gas mixture except for $NH_3$. At 150° C., $NH_3$ was added into the gas mixture and the samples were held under these conditions for 30 min. The temperature was then increased (ramped) from 150 to 500° C. at 5° C. $min^{-1}$.

Figure 41:
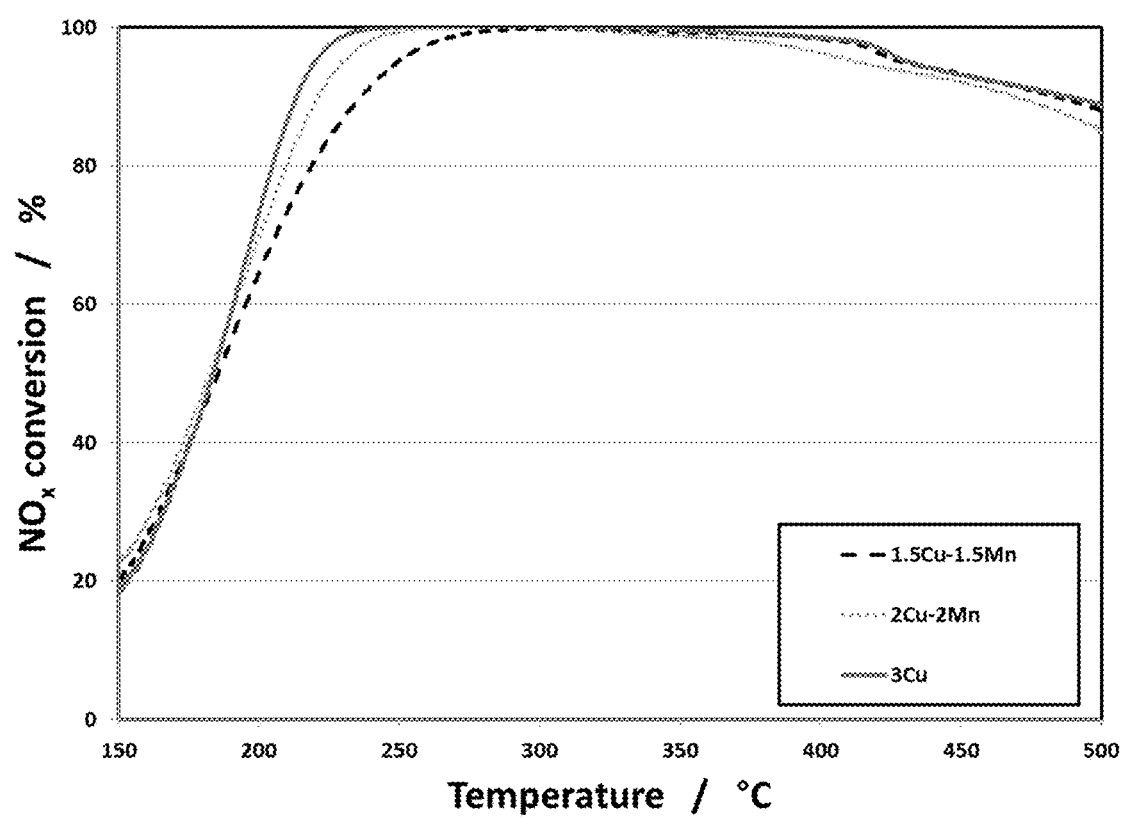
FIG. 41 shows NOx conversion under standard SCR conditions for fresh catalysts including Cu—Mn.AEI and Cu.AEI.
Figure 42:
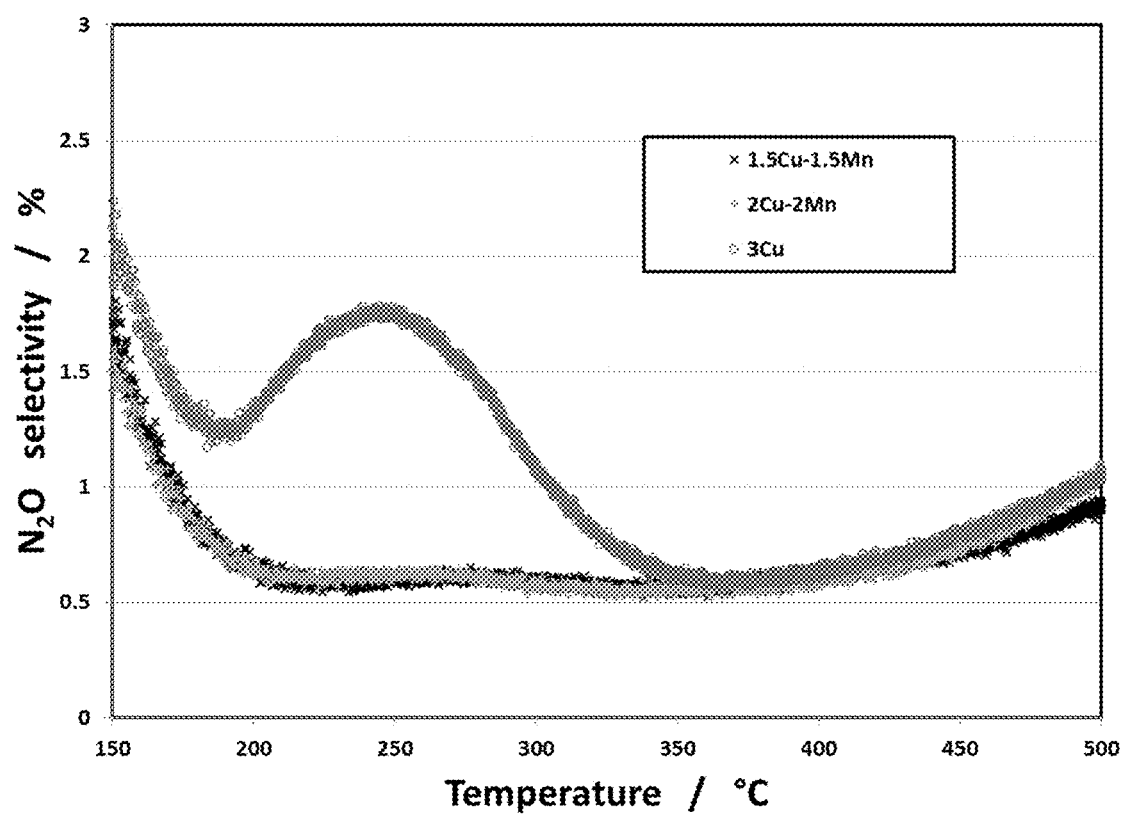
FIG. 42 shows N$_2$O selectivity under standard SCR conditions for fresh catalysts including Cu—Mn.AEI and Cu.AEI.

Results are shown in FIGS. 41 and 42. Under standard SCR conditions, it has been found that the Cu—Mn.AEI molecular sieves and a 3 wt % Cu-exchanged molecular sieve all achieved similar total $NO_x$ conversions at 86% and 88%, respectively. However, the Cu—Mn.AEI catalysts exhibited an average $N_2O$ selectivity of 0.7% while a 3 wt % Cu-exchanged molecular sieve exhibited an average $N_2O$ selectivity of 1.1%. Thus, a catalyst of the present invention resulted in a significant reduction in $N_2O$ relative to a typical Cu-exchanged molecular sieve.

The catalysts were also aged at 900° C. for 5 hours in 4.5% water in air. Samples of the powdered catalyst were pelletized and then heated at a rate of 10° C. $min^{-1}$ to 250° C. in air only. The samples were then heated at a rate of 10° C. $min^{-1}$ in 4.5% $H_2O$ in air to 900° C. After being held at a temperature of 900° C. for 5 hours, the samples were cooled in the steam/air mixture until the temperature was <250° C. The samples were then cooled from 250° C. to room temperature in an air only flow. Pelletized samples of the aged powder catalysts were then tested for $NO_x$ conversion and $N_2O$ production in the following conditions: 500 ppm $NH_3$, 500 ppm NO, 0 ppm $NO_2$, 14% $O_2$, 4.6% $H_2O$, 5.0% $CO_2$, and a balance of $N_2$ at a space velocity of 90 K $h^{-1}$.

Figure 43:
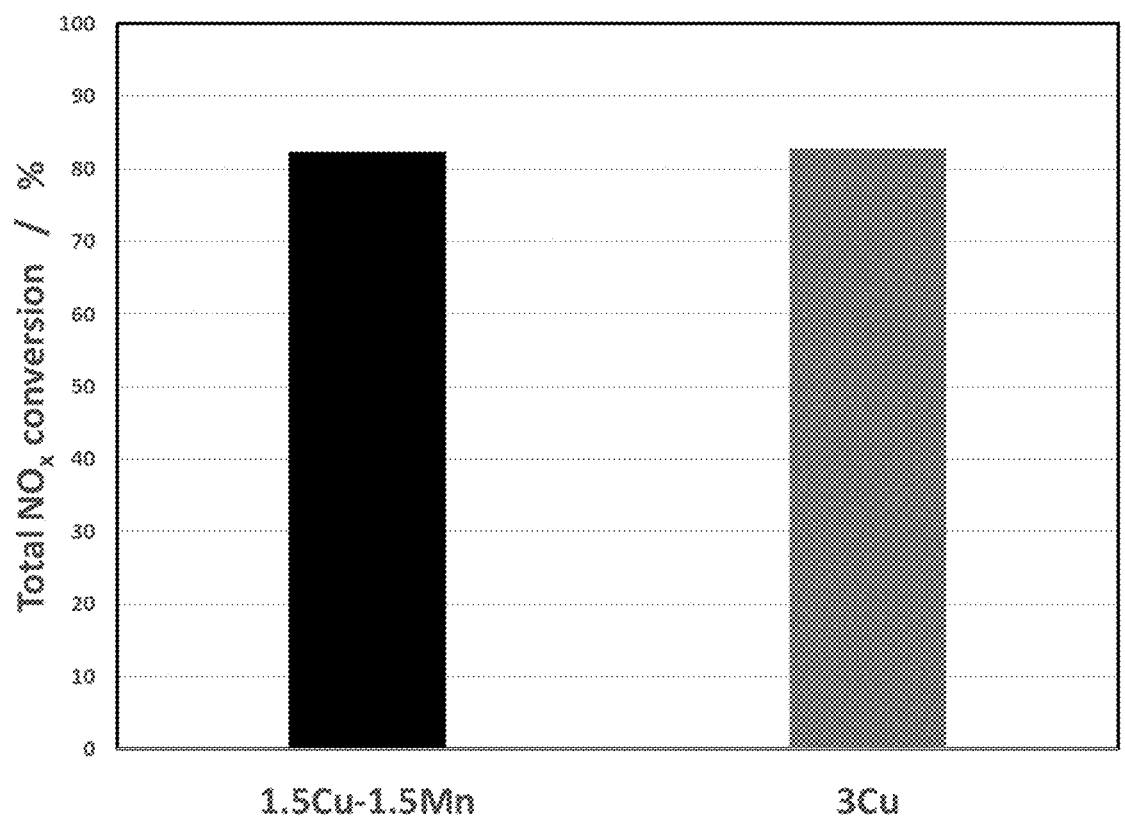
FIG. 43 shows NOx conversion under standard SCR conditions for aged catalysts including Cu—Mn.AEI and Cu.AEI.
Figure 44:
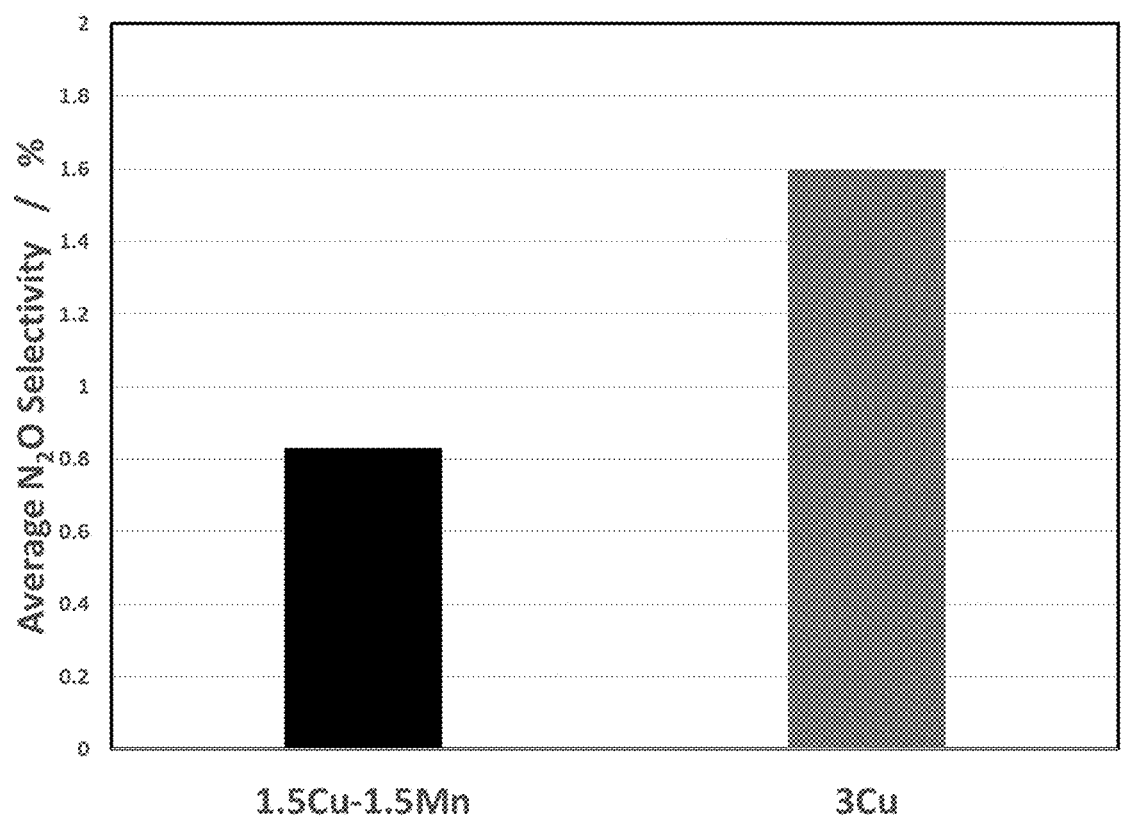
FIG. 44 shows N$_2$O selectivity under standard SCR conditions for aged catalysts including Cu—Mn.AEI and Cu.AEI.

Results are shown in FIGS. 43 and 44. Under standard SCR conditions, it has been found that 1.5Cu-1.5Mn.AEI and a 3Cu.AEI both achieved similar total $NO_x$ conversions at 82% and 83%, respectively. However, Cu—Mn.AEI exhibited an average $N_2O$ selectivity of 0.8% while a 3 wt % Cu-exchanged molecular sieve exhibited an average $N_2O$ selectivity of 1.6%. These results indicate the catalyst of the present invention is hydrothermally stable and maintains significant benefits over a monometallic molecular sieve after harsh hydrothermal aging.

Example 2—Fast SCR

Molecular sieves were impregnated with metals using the required amount of manganese (II) acetate and/or copper (II) acetate dissolved in de-mineralized water. The metal-impregnated samples were dried overnight at 80° C. and then calcined in air at 550° C. for 4 hours. Catalysts were prepared having the following formulations:

AEI zeolite with 1.5 wt % exchanged Cu and 1.5 wt % exchanged Mn, 1.5Cu-1.5Mn.AEI AEI zeolite with 3 wt % exchanged Cu, 3Cu.AEI Pelletized samples of the powder catalysts were then tested for $NO_x$ conversion and $N_2O$ production in the following conditions: 500 ppm $NH_3$, 250 ppm NO, 250 ppm $NO_2$, 14% $O_2$, 4.6% $H_2O$, 5.0% $CO_2$, and a balance of $N_2$ at a space velocity of 90 K $h^{-1}$. The samples were heated from room temperature to 150° C. under the above-mentioned gas mixture except for $NH_3$. At 150° C., $NH_3$ was added into the gas mixture and the samples were held under these conditions for 30 min. The temperature was then increased (ramped) from 150 to 500° C. at 5° C. $min^{-1}$.

Figure 45:
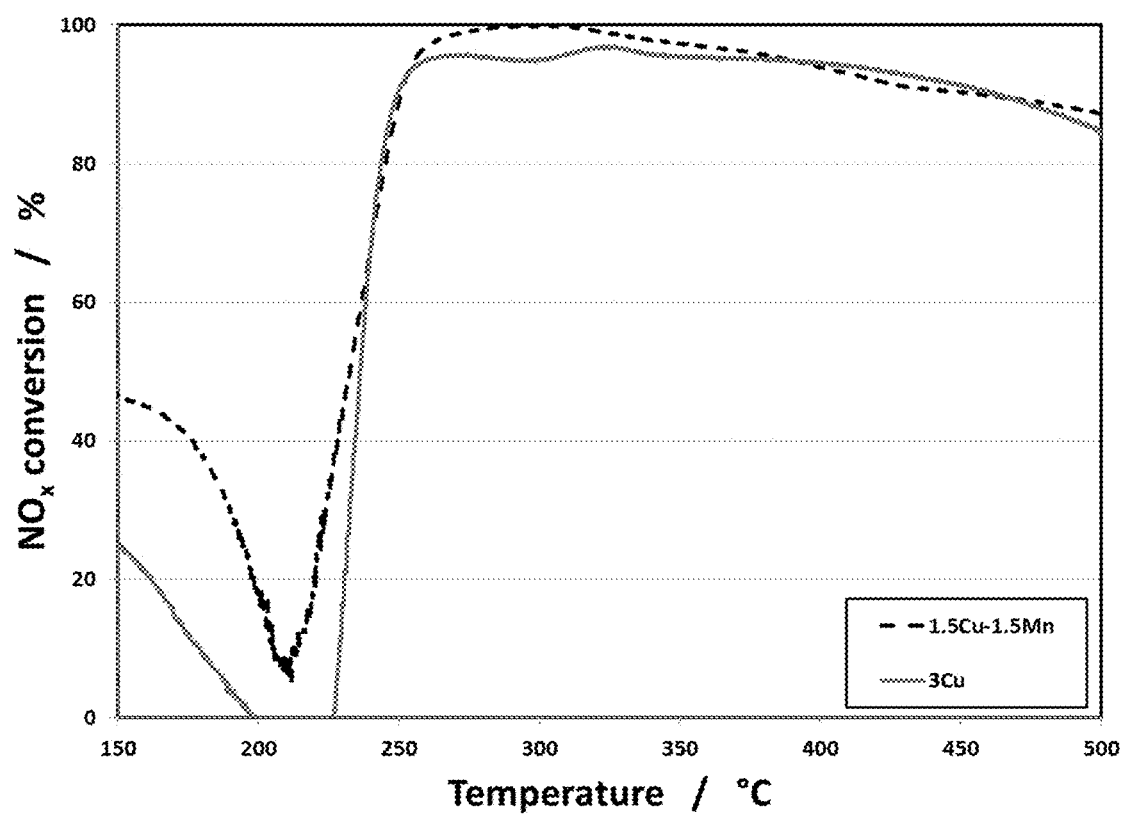
FIG. 45 shows NOx conversion under fast SCR conditions for catalysts including Cu—Mn.AEI and Cu.AEI.
Figure 46:
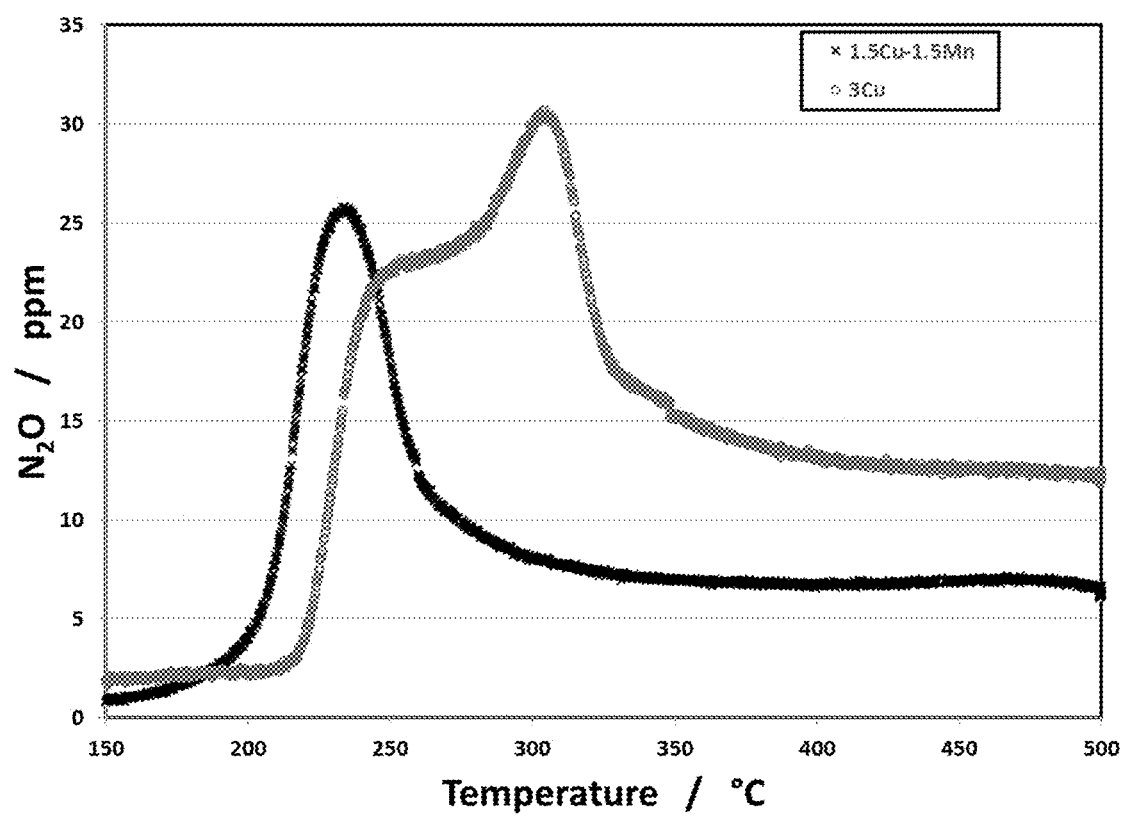
FIG. 46 shows N$_2$O ppm under fast SCR conditions for catalysts including Cu—Mn.AEI and Cu.AEI.

Results are shown in FIGS. 45 and 46. Under fast SCR conditions, it has been found that Cu—Mn.AEI exhibited an average $N_2O$ production of 8.4 ppm and a total $NO_x$ conversion of 82% while a 3 wt % Cu-exchanged molecular sieve exhibited an average $N_2O$ production of 14.5 and a total $NO_x$ conversion of 77%. Thus, the bimetallic catalyst achieved a significantly lower average $N_2O$ production and a higher total $NO_x$ conversion than the monometallic Cu-exchanged molecular sieve.

Example 3—Slow SCR

Molecular sieves were impregnated with metals using the required amount of manganese (II) acetate and/or copper (II) acetate dissolved in de-mineralized water. The metal-impregnated samples were dried overnight at 80° C. and then calcined in air at 550° C. for 4 hours. Catalysts were prepared having the following formulations:

AEI zeolite with 1.5 wt % exchanged Cu and 1.5 wt % exchanged Mn, 1.5Cu-1.5Mn.AEI AEI zeolite with 3 wt % exchanged Cu, 3Cu.AEI Pelletized samples of the powder catalysts were then tested for $NO_x$ conversion and $N_2O$ production in the following conditions: 500 ppm $NH_3$, 175 ppm NO, 325 ppm $NO_2$, 14% $O_2$, 4.6% $H_2O$, 5.0% $CO_2$, and a balance of $N_2$ at a space velocity of 90 K $h^{-1}$. The samples were heated from room temperature to 150° C. under the above-mentioned gas mixture except for $NH_3$. At 150° C., $NH_3$ was added into the gas mixture and the samples were held under these conditions for 30 min. The temperature was then increased (ramped) from 150 to 500° C. at 5° C. $min^{-1}$.

Figure 47:
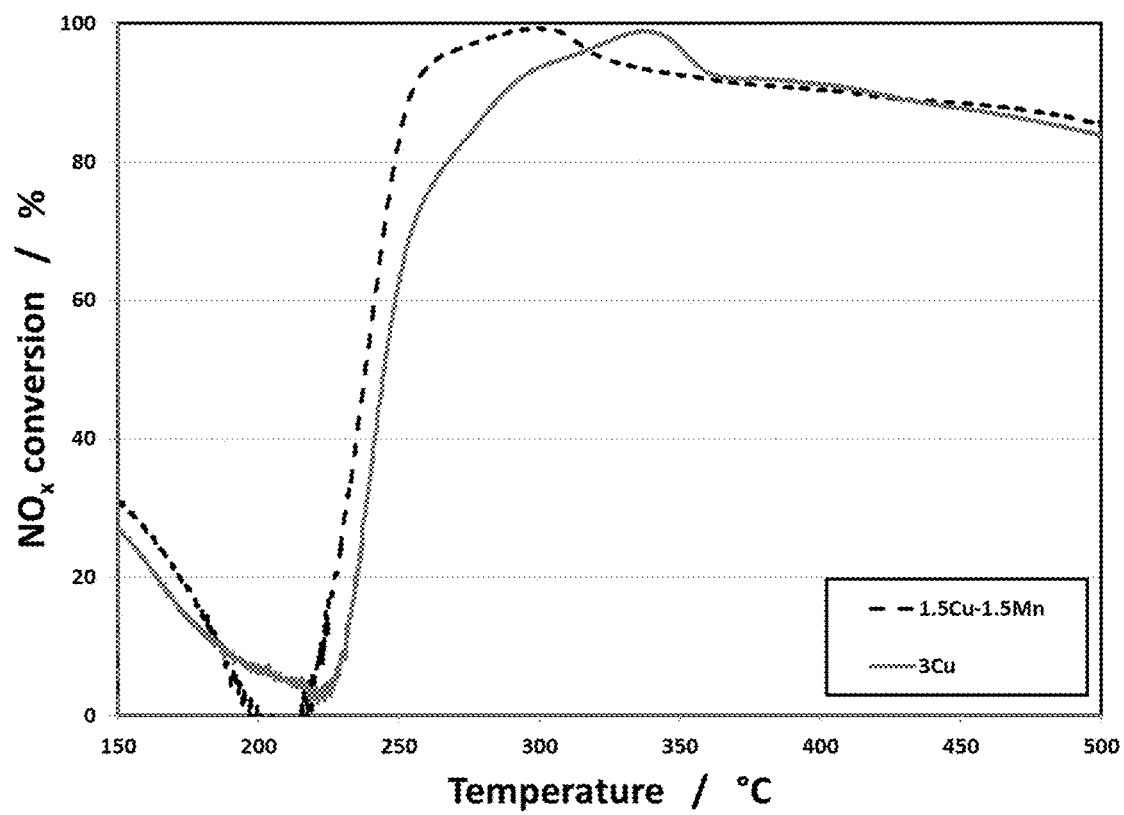
FIG. 47 shows NOx conversion under slow SCR conditions for catalysts including Cu—Mn.AEI and Cu.AEI.
Figure 48:
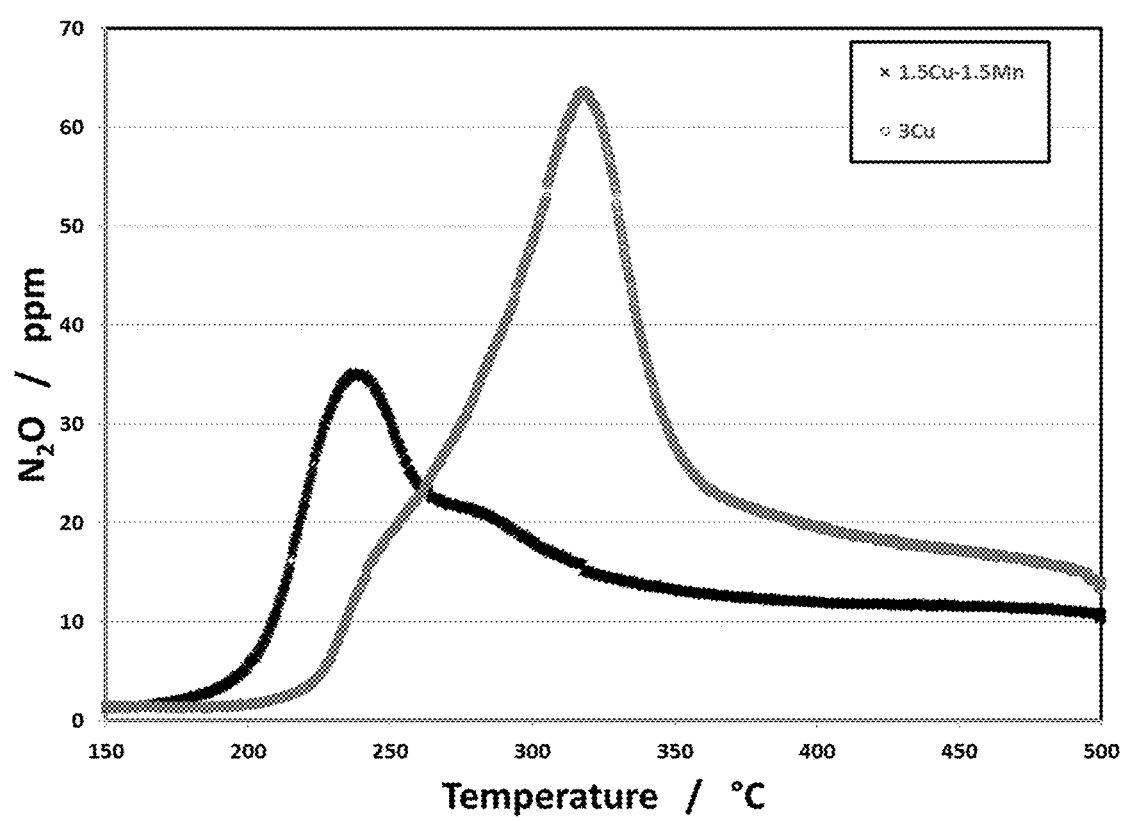
FIG. 48 shows N$_2$O ppm under slow SCR conditions for catalysts including Cu—Mn.AEI and Cu.AEI.

Results are shown in FIGS. 47 and 48. Under slow SCR conditions, it has been found that Cu—Mn.AEI exhibited an average $N_2O$ production of 14.4 ppm and a total $NO_x$ conversion of 76% while a 3 wt % Cu-exchanged molecular sieve exhibited an average $N_2O$ production of 21.4 and a total $NO_x$ conversion of 74%. Thus, the bimetallic catalyst achieved a significantly lower average $N_2O$ production and a similar total $NO_x$ conversion relative to the monometallic Cu-exchanged molecular sieve.

Example 4—Control Tests

Molecular sieves were impregnated with metals using the required amount of manganese (II) acetate and/or copper (II) acetate dissolved in de-mineralized water. The metal-impregnated samples were dried overnight at 80° C. and then calcined in air at 550° C. for 4 hours. Catalysts were prepared having the following formulations:
  AEI zeolite with 1.5 wt % exchanged Cu and 1.5 wt % exchanged Mn, 1.5Cu-1.5Mn.AEI
  AEI zeolite with 1.5 wt % exchanged Mn, 1.5Mn.AEI
  AEI zeolite with 1.5 wt % exchanged Cu, 1.5Cu.AEI
  A physical mixture of AEI zeolite with 1.5 wt % exchanged Cu and AEI zeolite with 1.5 wt % exchanged Mn, physical mix Pelletized samples of the powder catalysts were then tested for $NO_x$ conversion and $N_2O$ production in the following conditions: 500 ppm $NH_3$, 500 ppm NO, 0 ppm $NO_2$, 14% $O_2$, 4.6% $H_2O$, 5.0% $CO_2$, and a balance of $N_2$ at a space velocity of 90 K $h^{-1}$. The samples were heated from room temperature to 150° C. under the above-mentioned gas mixture except for $NH_3$. At 150° C., $NH_3$ was added into the gas mixture and the samples were held under these conditions for 30 min. The temperature was then increased (ramped) from 150 to 500° C. at 5° C. $min^{-1}$.

Figure 49:
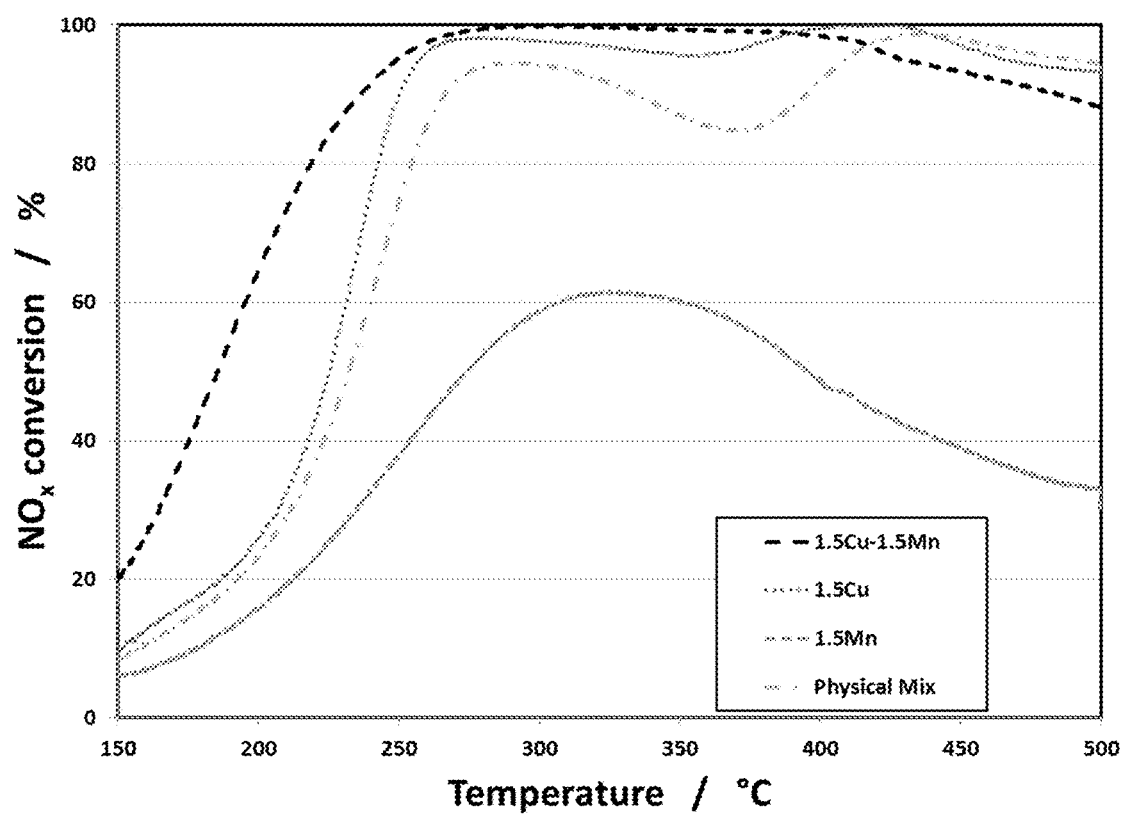
FIG. 49 shows NOx conversion under standard SCR conditions for various bimetallic and monometallic catalysts.
Figure 50:
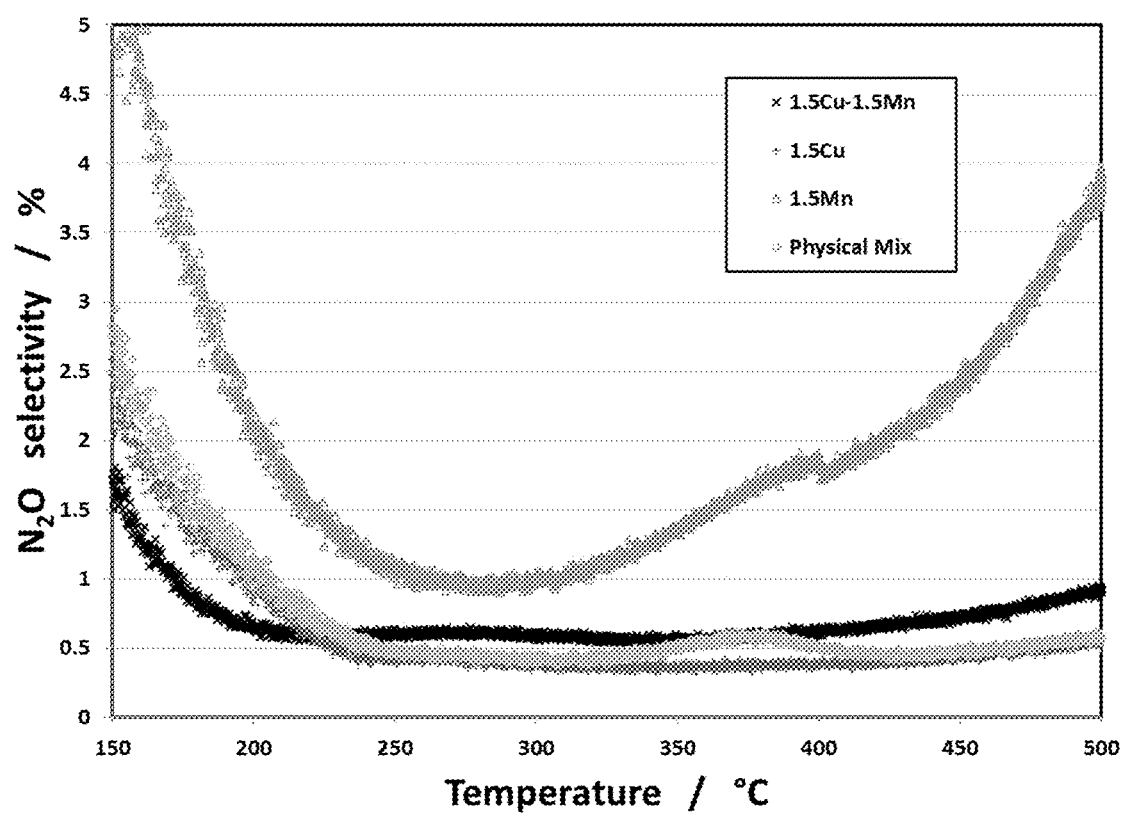
FIG. 50 shows N$_2$O selectivity under standard SCR conditions for various bimetallic and monometallic catalysts.

Results are shown in FIGS. 49 and 50. Under standard SCR conditions, it has been found that Cu—Mn.AEI achieved an average $N_2O$ selectivity of 0.7% and a total $NO_x$ conversions of 86%. A 1.5 wt % Cu-exchanged molecular sieve attained an average $N_2O$ selectivity of 0.6%, but could only achieve a total $NO_x$ conversion of 79%. Therefore, a bimetallic Cu—Mn molecular sieve exhibited significantly higher $NO_x$ conversion than the monometallic Cu-exchanged molecular sieve. And a Mn-exchanged molecular sieve exhibited an average $N_2O$ selectivity of 2.1% and a total $NO_x$ conversion of 41%. Thus, a Cu/Mn-exchanged catalyst resulted in significantly enhanced selectivity and activity over an equivalently Mn-loaded monometallic molecular sieve. Furthermore, a physical mixture of 1.5 wt % Cu-exchanged molecular sieve and 1.5 wt % Mn-exchanged molecular sieve exhibited an average $N_2O$ selectivity of 0.8% and a total $NO_x$ conversion of 74%, once more demonstrating the catalyst of the present invention exhibited significant selectivity and activity benefits over monometallic analogues. The results show a clear enhancement in $NO_x$ conversion when utilizing a bimetallic Cu/Mn exchanged molecular sieve compared to separate and mixed monometallic molecular sieves.

Example 5—Mn Loading

Molecular sieves were impregnated with metals using the required amount of manganese (II) acetate and/or copper (II) acetate dissolved in de-mineralized water. The metal-impregnated samples were dried overnight at 80° C. and then calcined in air at 550° C. for 4 hours. Catalysts were prepared having the following formulations:
  AEI zeolite with 3 wt % exchanged Cu, 3Cu.AEI
  AEI zeolite with 1.5 wt % exchanged Cu, 1.5Cu.AEI
  AEI zeolite with 1.5 wt % exchanged Cu and 0.1 wt % exchanged Mn, 1.5Cu-0.1Mn.AEI
  AEI zeolite with 1.5 wt % exchanged Cu and 0.25 wt % exchanged Mn, 1.5Cu-0.25Mn.AEI
  AEI zeolite with 1.5 wt % exchanged Cu and 0.5 wt % exchanged Mn, 1.5Cu-0.5Mn.AEI
  AEI zeolite with 1.5 wt % exchanged Cu and 1.5 wt % exchanged Mn, 1.5Cu-1.5Mn.AEI
  AEI zeolite with 1.5 wt % exchanged Cu and 2.5 wt % exchanged Mn, 1.5Cu-2.5Mn.AEI Pelletized samples of the powder catalysts were then tested for $NO_x$ conversion and $N_2O$ production in the following conditions: 500 ppm $NH_3$, 500 ppm NO, 0 ppm $NO_2$, 14% $O_2$, 4.6% $H_2O$, 5.0% $CO_2$, and a balance of $N_2$ at a space velocity of 90 K $h^{-1}$. The samples were heated from room temperature to 150° C. under the above-mentioned gas mixture except for $NH_3$. At 150° C., $NH_3$ was added into the gas mixture and the samples were held under these conditions for 30 min. The temperature was then increased (ramped) from 150 to 500° C. at 5° C. $min^{-1}$.

Figure 51:
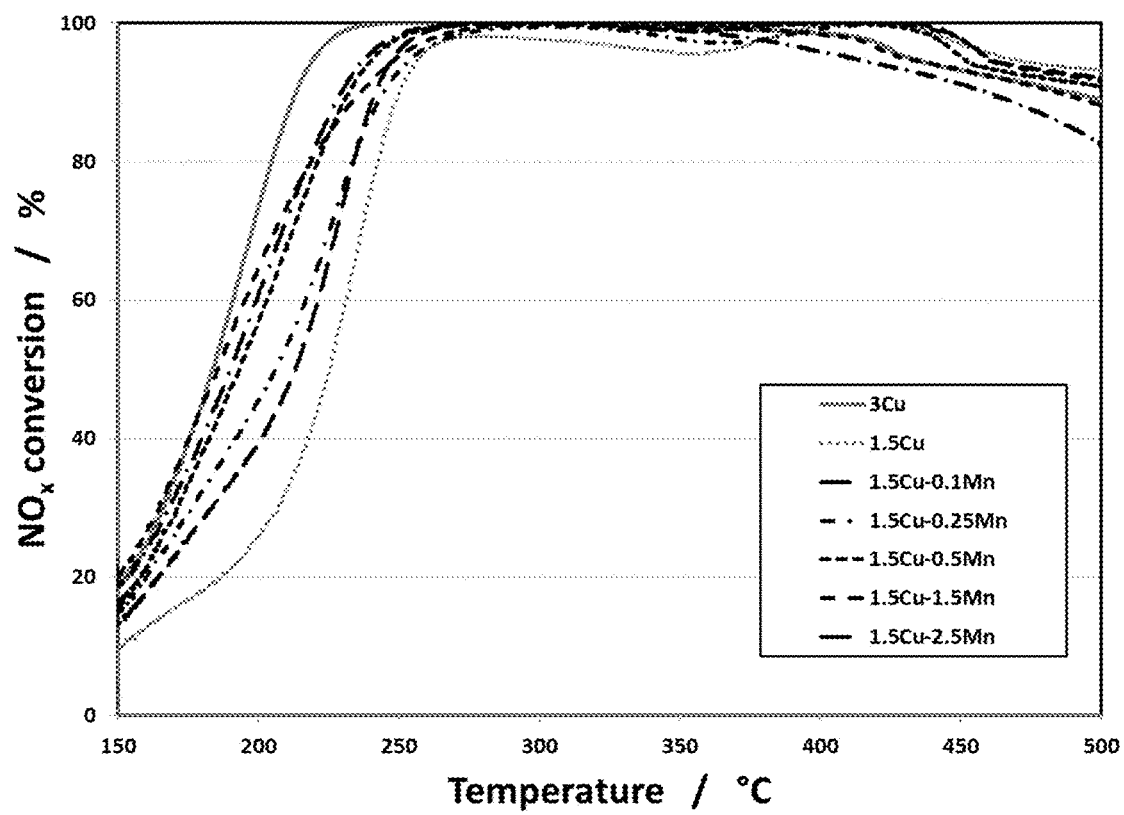
FIG. 51 shows NOx conversion under standard SCR conditions for catalysts with varying Mn loading.
Figure 52:
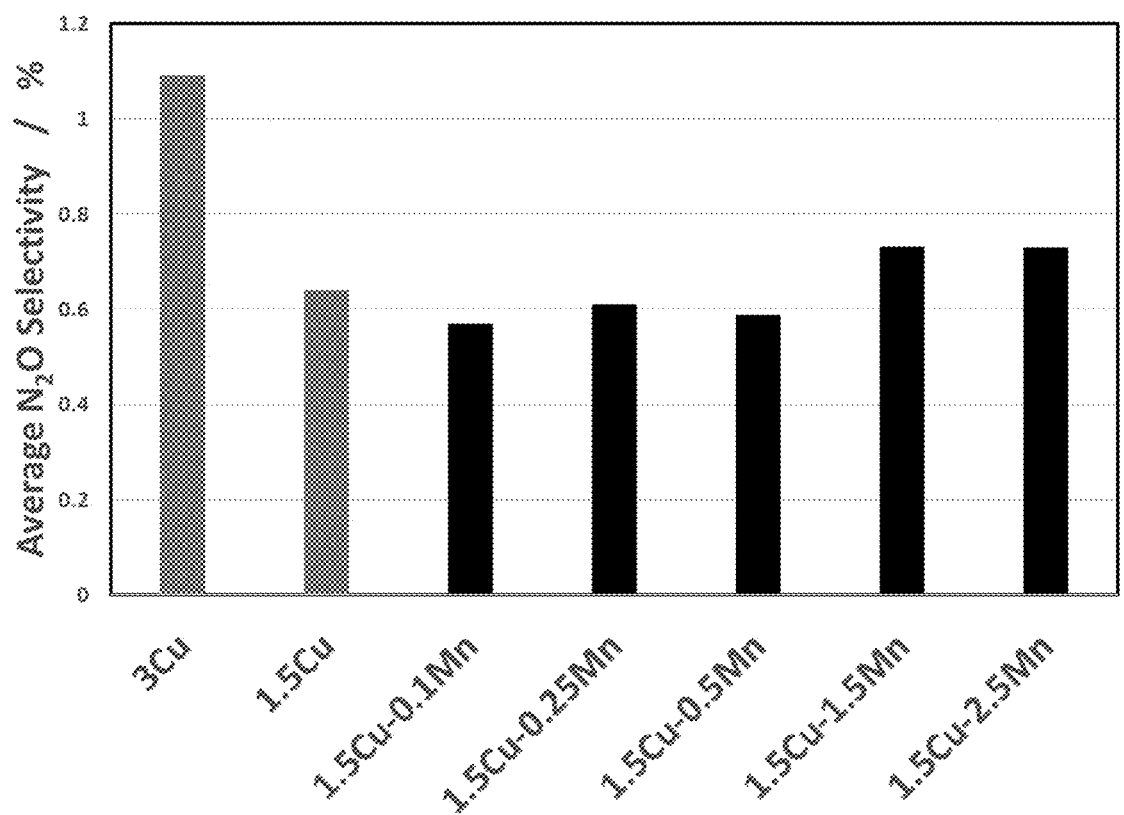
FIG. 52 shows N$_2$O selectivity under standard SCR conditions for catalysts with varying Mn loading.

Results are shown in FIGS. 51 and 52. The addition of 0.1 wt % Mn (Cu:Mn=15) resulted in a significantly enhanced light-off temperature as compared to a monometallic 1.5 wt % Cu molecular sieve. Further addition of Mn up 1.5 wt % (Cu:Mn=1) resulted in further improvement in the light-off temperature without significantly increasing $N_2O$ selectivity. The results show that at constant Cu loading, adding Mn to a 1.5 wt % Cu catalyst dramatically improves the $NO_x$ conversion of Cu—SCR catalysts without significantly altering the $N_2O$ selectivity.

Pelletized samples of the powder catalysts were then tested for $NO_x$ conversion and $N_2O$ production in the following conditions: 500 ppm $NH_3$, 175 ppm NO, 325 ppm $NO_2$, 14% $O_2$, 4.6% $H_2O$, 5.0% $CO_2$, and a balance of $N_2$ at a space velocity of 90 K $h^{-1}$. The samples were heated from room temperature to 150° C. under the above-mentioned gas mixture except for $NH_3$. At 150° C., $NH_3$ was added into the gas mixture and the samples were held under these conditions for 30 min. The temperature was then increased (ramped) from 150 to 500° C. at 5° C. $min^{-1}$.

Figure 53:
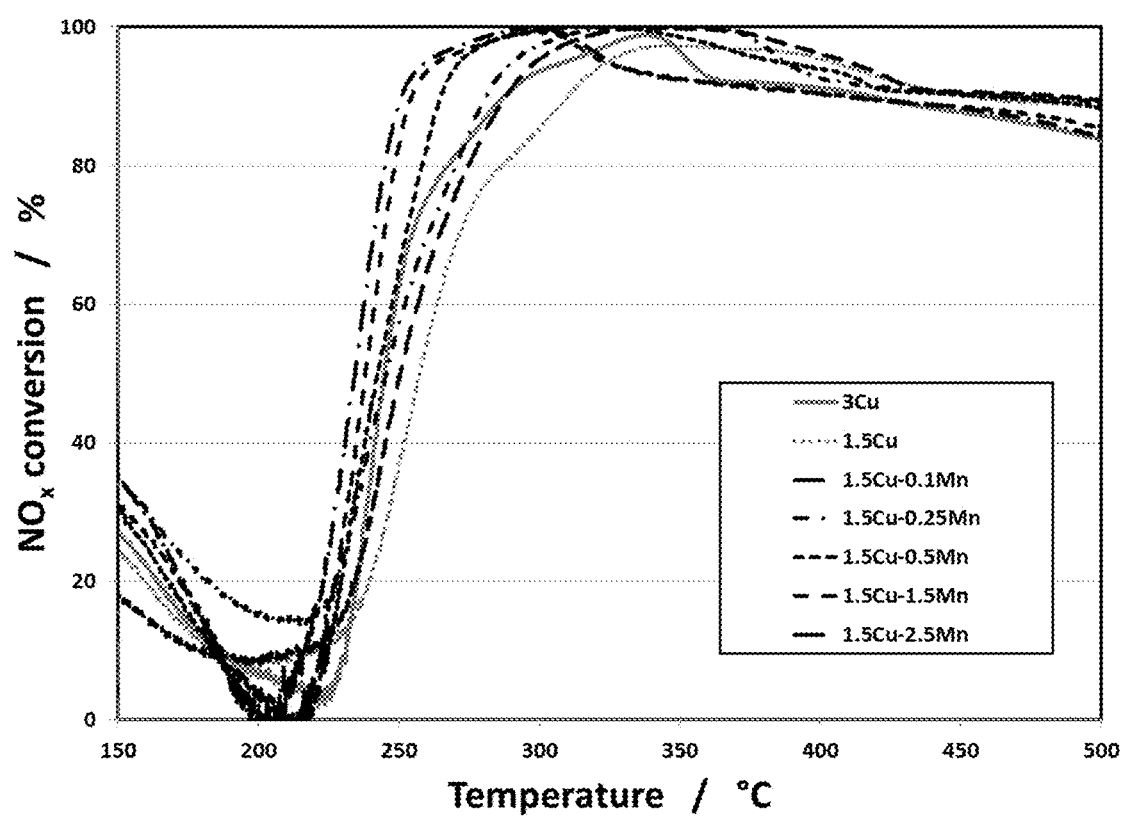
FIG. 53 shows NOx conversion under slow SCR conditions for catalysts with varying Mn loading.
Figure 54:
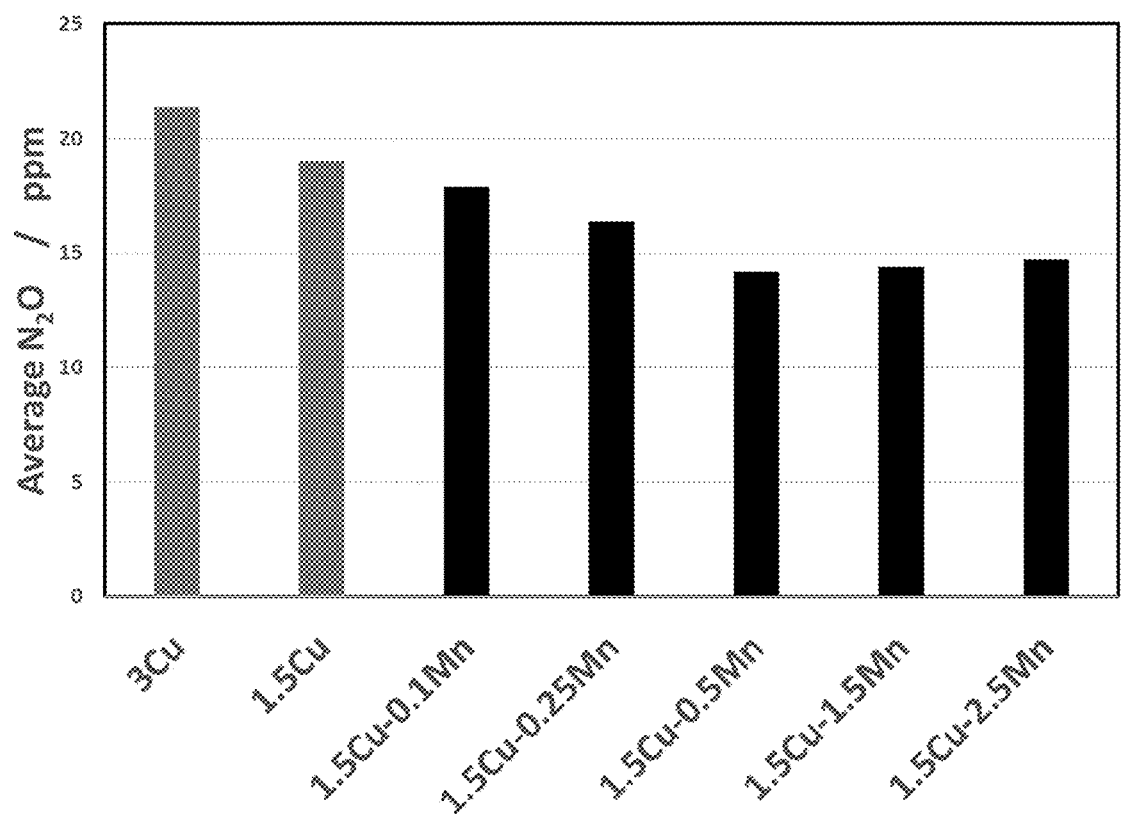
FIG. 54 shows N$_2$O ppm under slow SCR conditions for catalysts with varying Mn loading.

Results are shown in FIGS. 53 and 54. At a constant Cu loading of 1.5 wt %, the addition of 0.1 wt % Mn (Cu:Mn=15) resulted in a reduction of $N_2O$ production without significant alteration of light-off temperature as compared to a monometallic 1.5 wt % Cu molecular sieve. Further addition of 0.5 wt % Mn (Cu:Mn=3), 1.0 wt % Mn (Cu:Mn=1.5), and 1.5 wt % Mn (Cu:Mn=1) resulted in increasingly improved $NO_x$ light-off temperature and lower $N_2O$ production values. However, all aspects of Cu—Mn.AEI produced less $N_2O$ than the monometallic Cu.AEI analogues. Thus, the activity and selectivity of Cu—Mn can be tuned for specific applications by varying the Cu-to-Mn ratio and total metal content.

Example 6—Cu Loading

Molecular sieves were impregnated with metals using the required amount of manganese (II) acetate and/or copper (II) acetate dissolved in de-mineralized water. The metal-impregnated samples were dried overnight at 80° C. and then calcined in air at 550° C. for 4 hours. Catalysts were prepared having the following formulations:
  AEI zeolite with 3 wt % exchanged Cu, 3Cu.AEI
  AEI zeolite with 1.5 wt % exchanged Mn, 1.5Mn.AEI AEI zeolite with 1.5 wt % exchanged Mn and 0.5 wt % exchanged Cu, 0.5Cu-1.5Mn.AEI AEI zeolite with 1.5 wt % exchanged Mn and 1.0 wt % exchanged Cu, 1Cu-1.5Mn.AEI AEI zeolite with 1.5 wt % exchanged Mn and 1.5 wt % exchanged Cu, 1.5Cu-1.5Mn.AEI AEI zeolite with 1.5 wt % exchanged Mn and 2.0 wt % exchanged Cu, 1.5Cu-2Mn.AEI AEI zeolite with 1.5 wt % exchanged Mn and 2.5 wt % exchanged Cu, 1.5Cu-2.5Mn.AEI AEI zeolite with 1.5 wt % exchanged Mn and 3 wt % exchanged Cu, 3Cu-1.5Mn.AEI Pelletized samples of the powder catalysts were then tested for $NO_x$ conversion and $N_2O$ production in the following conditions: 500 ppm $NH_3$, 500 ppm NO, 0 ppm $NO_2$, 14% $O_2$, 4.6% $H_2O$, 5.0% $CO_2$, and a balance of $N_2$ at a space velocity of 90 K $h^{-1}$. The samples were heated from room temperature to 150° C. under the above-mentioned gas mixture except for $NH_3$. At 150° C., $NH_3$ was added into the gas mixture and the samples were held under these conditions for 30 min. The temperature was then increased (ramped) from 150 to 500° C. at 5° C. $min^{-1}$.

Figure 55:
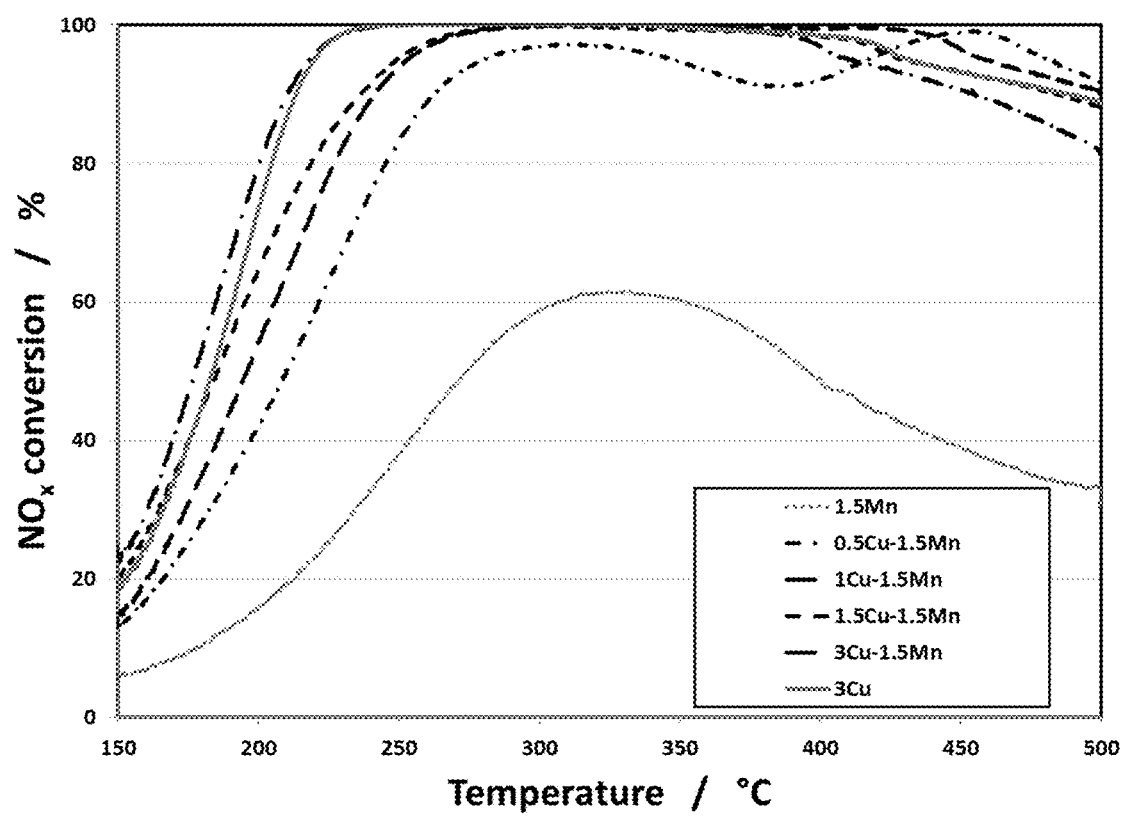
FIG. 55 shows NOx conversion under standard SCR conditions for catalysts with varying Cu loading.
Figure 56:
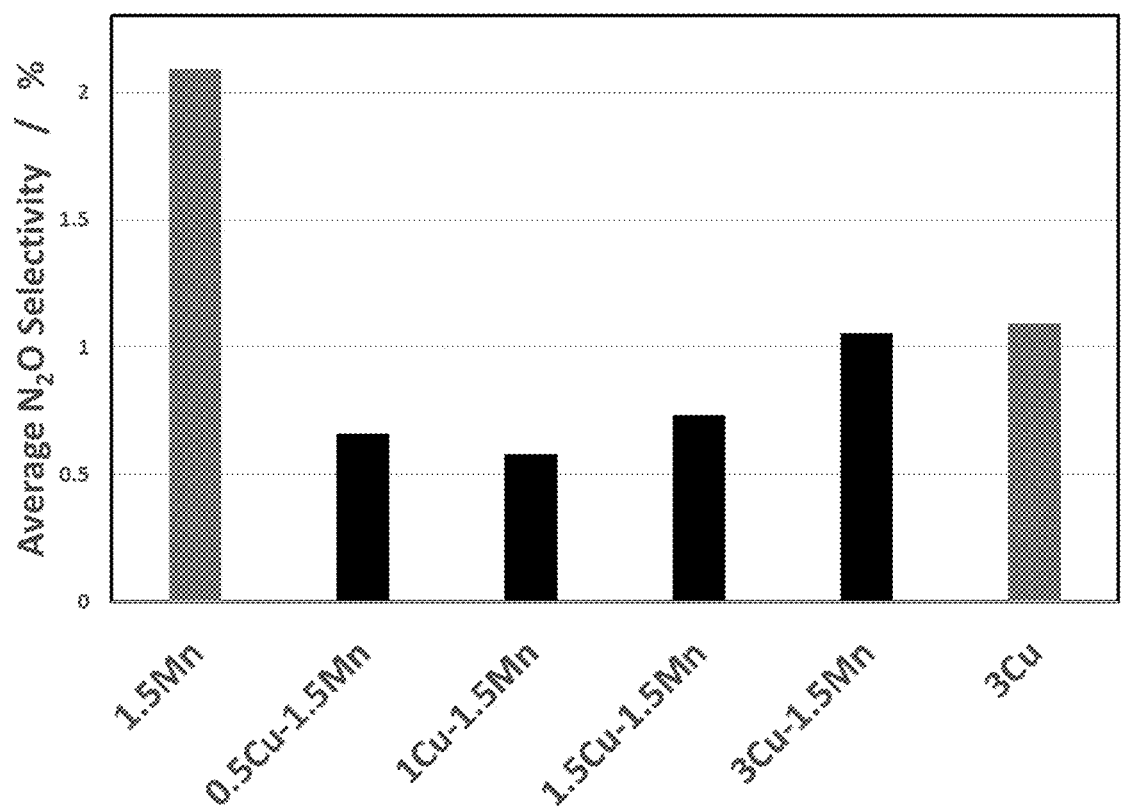
FIG. 56 shows N$_2$O selectivity under standard SCR conditions for catalysts with varying Cu loading.

Results are shown in FIGS. 55 and 56. At a constant Mn loading of 1.5 wt %, addition of just 0.5 wt % Cu (Cu: Mn=0.33) resulted in dramatically improved $NO_x$ conversion and significantly reduced $N_2O$ selectivity as compared to a monometallic 1.5 wt % Mn catalyst. As Cu content is sequentially increased to 1 wt % (Cu:Mn=0.67), 1.5 wt % (Cu:Mn=1), and 3.0 (Cu:Mn=2) wt %, the $NO_x$ conversion is sequentially increased at the cost of higher $N_2O$ selectivity. Moreover, 1Cu-1.5Mn.AEI and 1.5Cu-1.5Mn.AEI catalysts exhibited significantly reduced $N_2O$ selectivity as compared to monometallic Cu or Mn molecular sieves. However, if ratio of Cu:Mn is increased too high as exhibited in the case of Cu:Mn, most of the $N_2O$ benefit is lost. The results show that at constant Mn loading of 1.5 wt %, increasing the Cu content leads to improved $NO_x$ conversion. However, as Cu content is increased higher than Mn content, selectivity to $N_2O$ increases.

Example 7—Small Pore Zeolites

Figure 57:
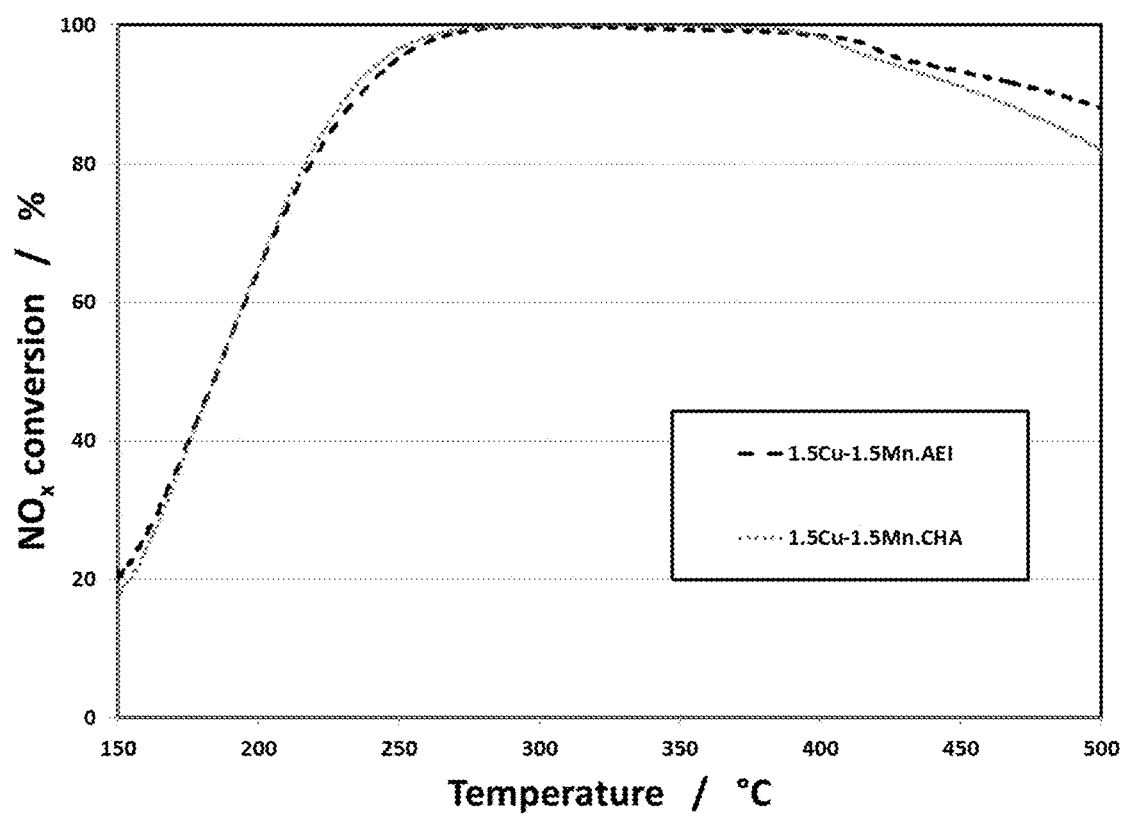
FIG. 57 shows NOx conversion under standard SCR conditions for catalysts with different small-pore zeolites.
Figure 58:
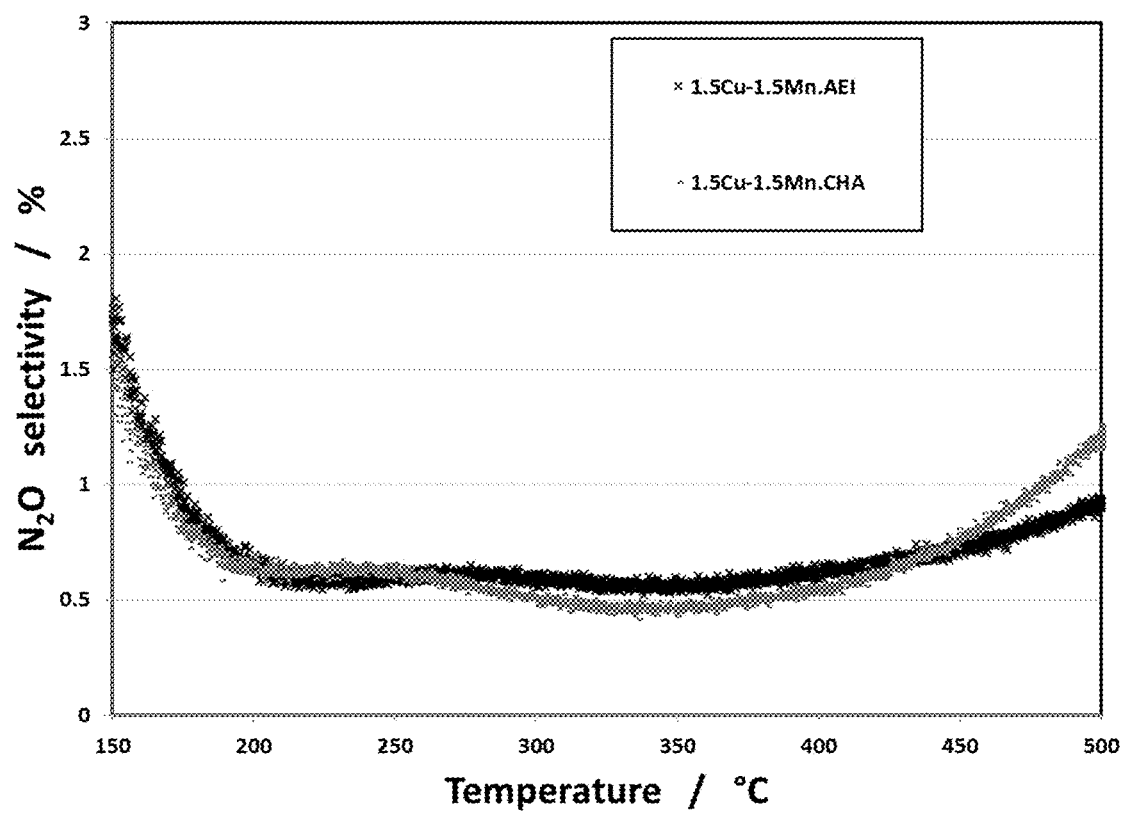
FIG. 58 shows N$_2$O selectivity under standard SCR conditions for catalysts with different small-pore zeolites.

Molecular sieves were impregnated with metals using the required amount of manganese (II) acetate and/or copper (II) acetate dissolved in de-mineralized water. The metal-impregnated samples were dried overnight at 80° C. and then calcined in air at 550° C. for 4 hours. Catalysts were prepared having the following formulations:

AEI zeolite with 1.5 wt % exchanged Mn and 1.5 wt % exchanged Cu, 1.5Cu-1.5Mn.AEI CHA zeolite with 1.5 wt % exchanged Mn and 1.5 wt % exchanged Cu, 1.5Cu-1.5Mn.CHA Standard SCR: Pelletized samples of the powder catalysts were then tested for $NO_x$ conversion and $N_2O$ production in the following conditions: 500 ppm $NH_3$, 500 ppm NO, 0 ppm $NO_2$, 14% $O_2$, 4.6% $H_2O$, 5.0% $CO_2$, and a balance of $N_2$ at a space velocity of 90 K $h^{-1}$. The samples were heated from room temperature to 150° C. under the above-mentioned gas mixture except for $NH_3$. At 150° C., $NH_3$ was added into the gas mixture and the samples were held under these conditions for 30 min. The temperature was then increased (ramped) from 150 to 500° C. at 5° C. $min^{-1}$. Results are shown in FIGS. 57 and 58. The results show that Cu—Mn.CHA performs similarly to Cu—Mn.AEI, indicating that this strategy is viable for small-pore zeolites.

Figure 59:
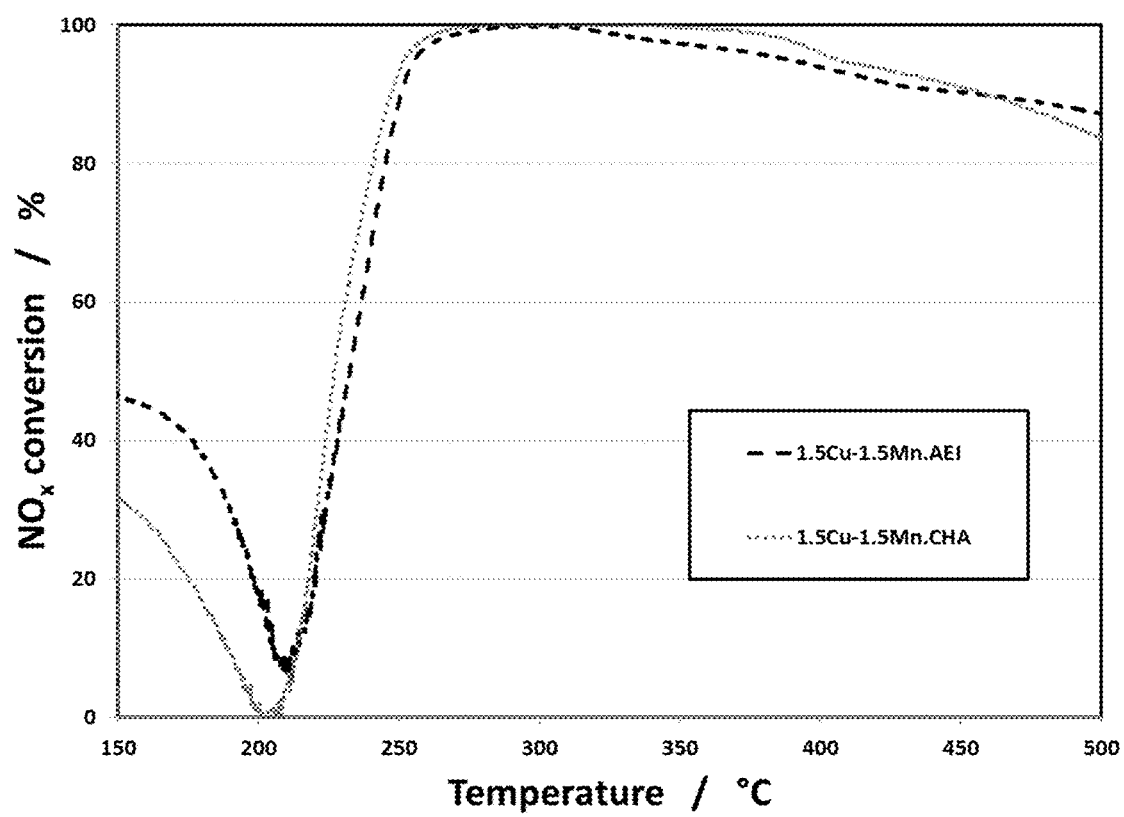
FIG. 59 shows NOx conversion under fast SCR conditions for catalysts with different small-pore zeolites.
Figure 60:
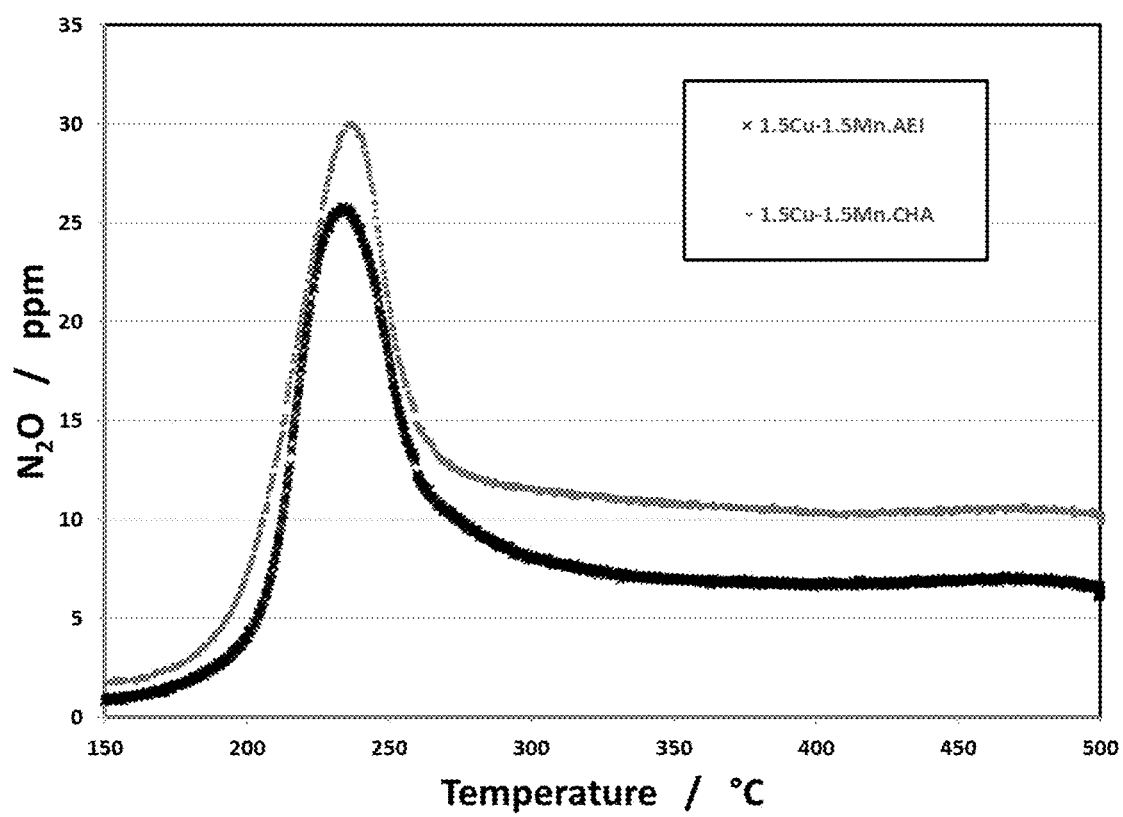
FIG. 60 shows N$_2$O ppm under fast SCR conditions for catalysts with different small-pore zeolites.

Fast SCR: Pelletized samples of the powder catalysts were then tested for $NO_x$ conversion and $N_2O$ production in the following conditions: 500 ppm $NH_3$, 250 ppm NO, 250 ppm $NO_2$, 14% $O_2$, 4.6% $H_2O$, 5.0% $CO_2$, and a balance of $N_2$ at a space velocity of 90 K $h^{-1}$. The samples were heated from room temperature to 150° C. under the above-mentioned gas mixture except for $NH_3$. At 150° C., $NH_3$ was added into the gas mixture and the samples were held under these conditions for 30 min. The temperature was then increased (ramped) from 150 to 500° C. at 5° C. $min^{-1}$. Results are shown in FIGS. 59 and 60. The results show that Cu—Mn.CHA and Cu—Mn.AEI both achieve similar total $NO_x$ conversions at 82%. However, Cu—Mn.AEI produces less average $N_2O$ at 8.4 ppm than Cu—Mn.CHA which produces an average $N_2O$ of 11.8 ppm.

Figure 61:
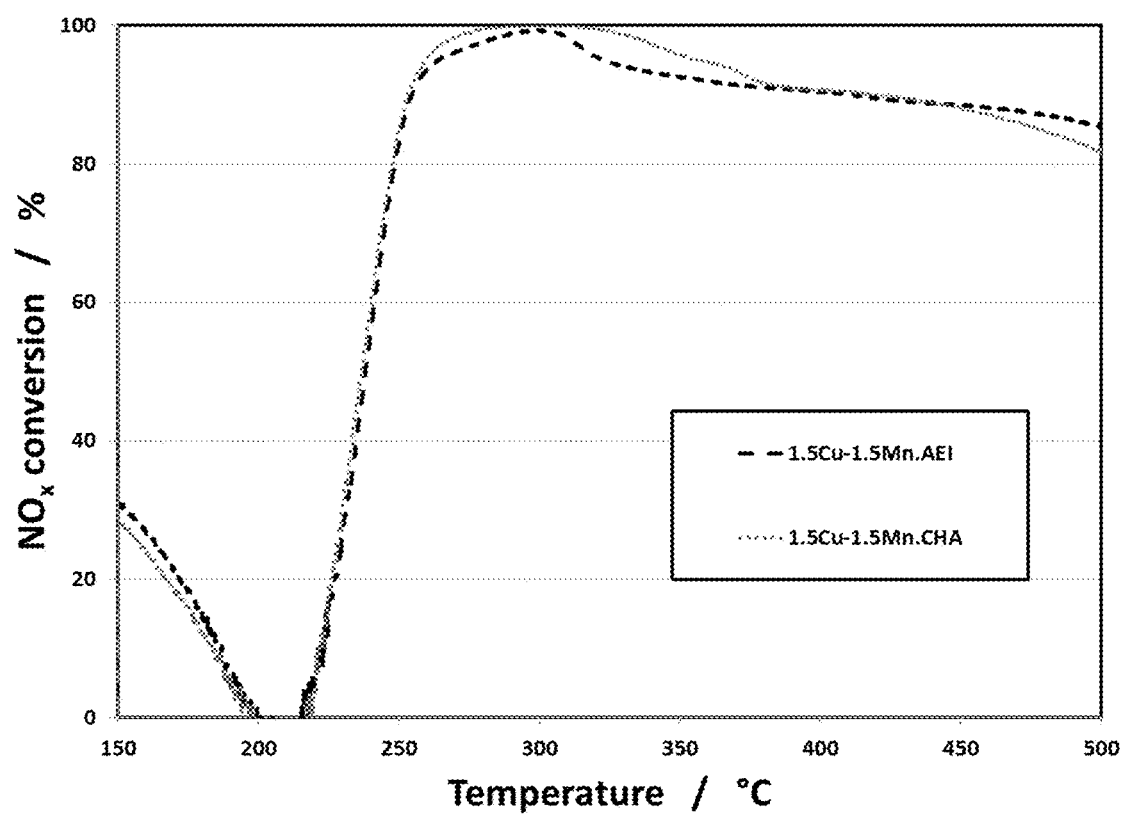
FIG. 61 shows NOx conversion under slow SCR conditions for catalysts with different small-pore zeolites.
Figure 62:
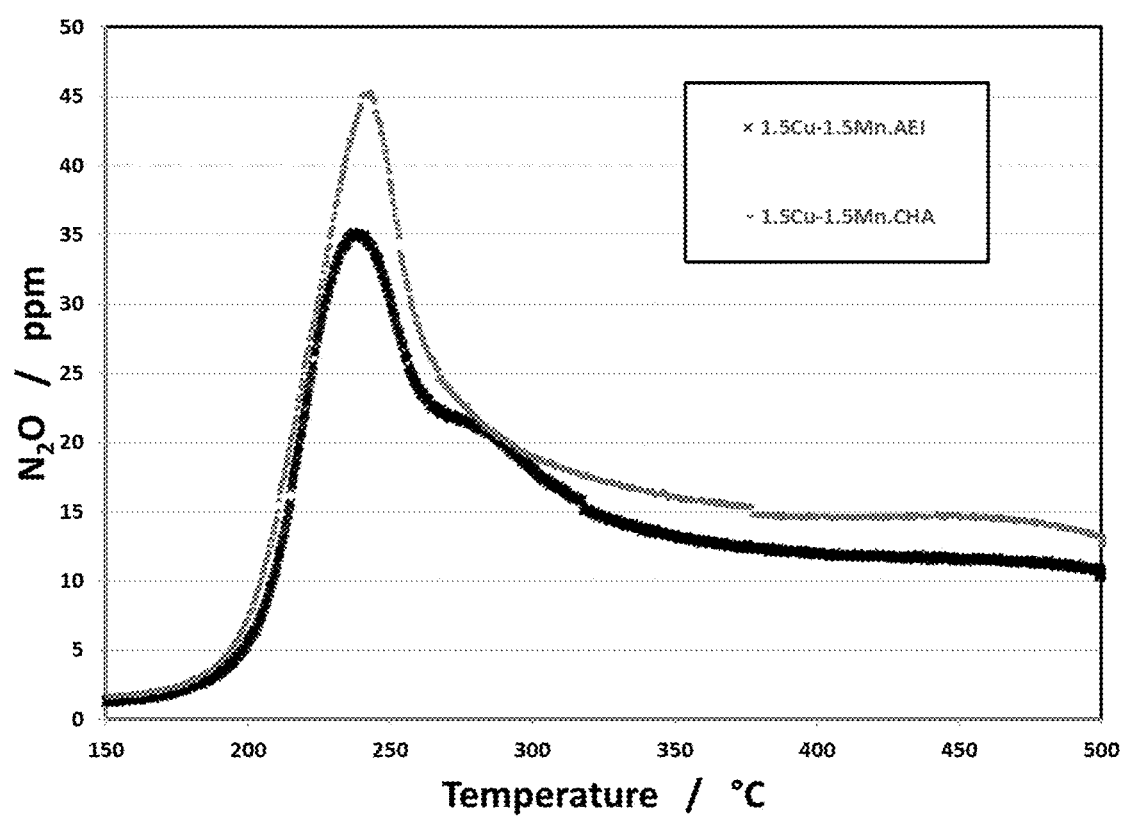
FIG. 62 shows N$_2$O ppm under slow SCR conditions for catalysts with different small-pore zeolites.

Slow SCR: Pelletized samples of the powder catalysts were then tested for $NO_x$ conversion and $N_2O$ production in the following conditions: 500 ppm $NH_3$, 175 ppm NO, 325 ppm $NO_2$, 14% $O_2$, 4.6% $H_2O$, 5.0% $CO_2$, and a balance of $N_2$ at a space velocity of 90 K $h^{-1}$. The samples were heated from room temperature to 150° C. under the above-mentioned gas mixture except for $NH_3$. At 150° C., $NH_3$ was added into the gas mixture and the samples were held under these conditions for 30 min. The temperature was then increased (ramped) from 150 to 500° C. at 5° C. $min^{-1}$. Results are shown in FIGS. 61 and 62. The results show that Cu—Mn.CHA and Cu—Mn.AEI both achieve similar total $NO_x$ conversions at 76%. However, Cu—Mn.AEI produces less average $N_2O$ at 14.4 ppm than Cu—Mn.CHA which produces an average $N_2O$ of 17.1 ppm.

Example 8—Medium/Large Pore Zeolites

Molecular sieves were impregnated with metals using the required amount of manganese (II) acetate and/or copper (II) acetate dissolved in de-mineralized water. The metal-impregnated samples were dried overnight at 80° C. and then calcined in air at 550° C. for 4 hours. Catalysts were prepared having the following formulations:

BEA zeolite with 3 wt % exchanged Cu, 3Cu.BEA

Figure 63:
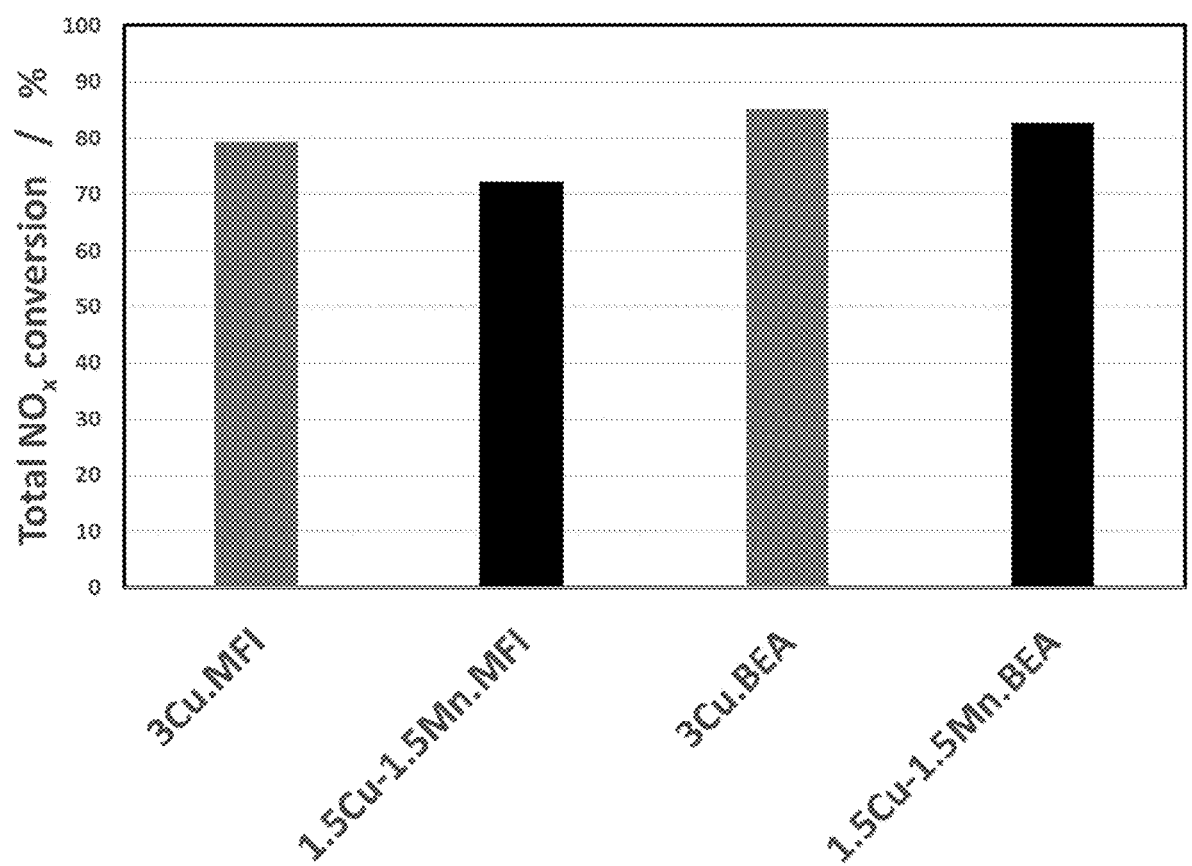
FIG. 63 shows NOx conversion under standard SCR conditions for catalysts with different medium/large-pore zeolites.
Figure 64:
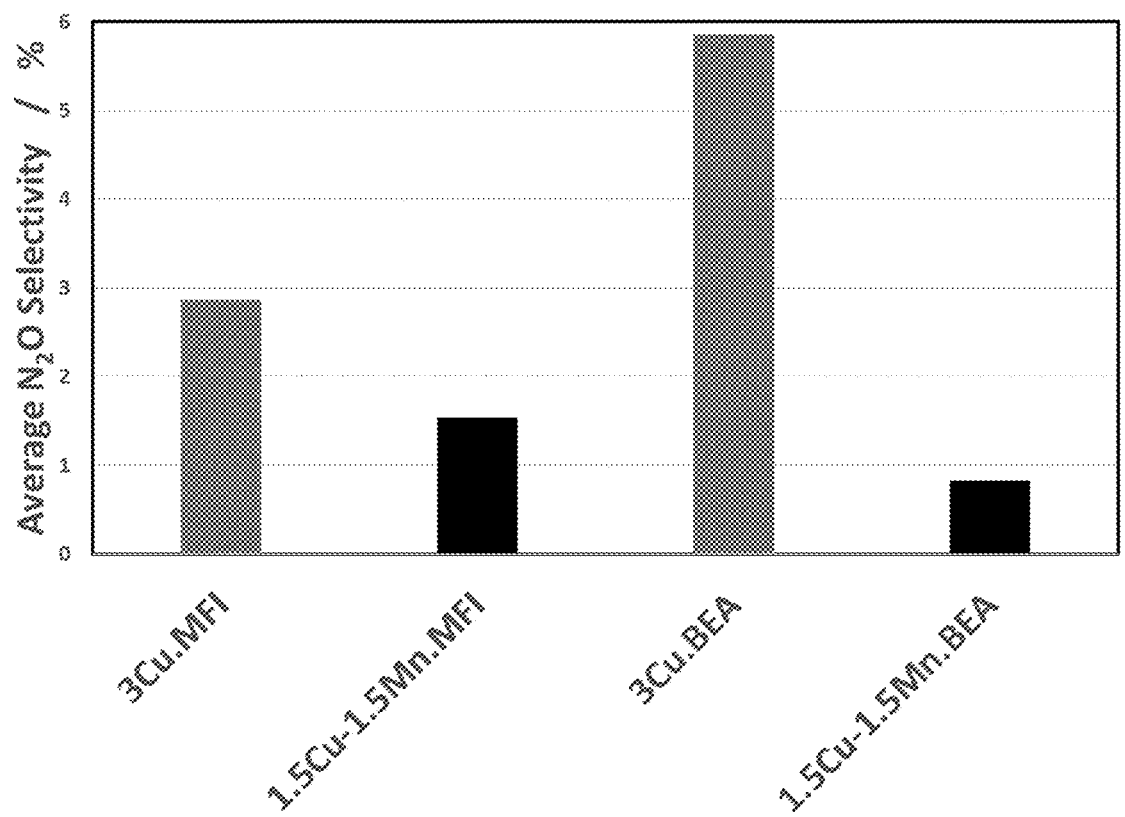
FIG. 64 shows N$_2$O ppm under standard SCR conditions for catalysts with different medium/large-pore zeolites.

BEA zeolite with 1.5 wt % exchanged Mn and 1.5 wt % exchanged Cu, 1.5Cu-1.5Mn.BEA MFI zeolite with 3 wt % exchanged Cu, 3Cu.MFI MFI zeolite with 1.5 wt % exchanged Mn and 1.5 wt % exchanged Cu, 1.5Cu-1.5Mn.MFI The catalysts were then tested for $NO_x$ conversion and $N_2O$ selectivity in the following conditions: 500 ppm $NH_3$, 500 ppm NO, 0 ppm $NO_2$, SV=90 K $h^{-1}$. Results are shown in FIGS. 63 and 64. Under standard SCR conditions, it has been found that Cu—Mn.BEA and a Cu.BEA both achieved similar total $NO_x$ conversions at 82% and 85%, respectively. However, Cu—Mn.BEA exhibited an average $N_2O$ selectivity of 0.8% while a Cu.BEA exhibited an average $N_2O$ selectivity of 5.9%. Thus, the Cu—Mn.BEA resulted in a significant reduction in $N_2O$ relative to a typical Cu-exchanged BEA. Under standard SCR conditions, it has also been found that Cu—Mn.MFI achieved a total NOx conversion of 72% and an average $N_2O$ selectivity of 1.5%. A monometallic Cu.MFI, however, was able to achieve a higher $NO_x$ conversion at 79% but exhibited a higher average $N_2O$ selectivity at 2.9%. Thus, the Cu—Mn.BEA resulted in a significant reduction in $N_2O$ relative to a typical Cu-exchanged BEA. The results show that Cu—Mn.BEA and Cu—Mn.MFI experience a significant reduction in $N_2O$ selectivity compared to Cu.BEA and Cu.MFI, respectively. Thus, the strategy of utilizing dual Cu and Mn-exchanged molecular sieves is viable for both medium and large pore zeolites, as well.

Example 9—SAR Range

Molecular sieves were impregnated with metals using the required amount of manganese (II) acetate and/or copper (II) acetate dissolved in de-mineralized water. The metal-impregnated samples were dried overnight at 80° C. and then calcined in air at 550° C. for 4 hours. Catalysts were prepared having the following formulations:

CHA zeolite at an SAR=22 with 1.5 wt % exchanged Mn and 1.5 wt % exchanged Cu, SAR 22

CHA zeolite at an SAR=13 with 1.5 wt % exchanged Mn and 1.5 wt % exchanged Cu, SAR 13

Figure 65:
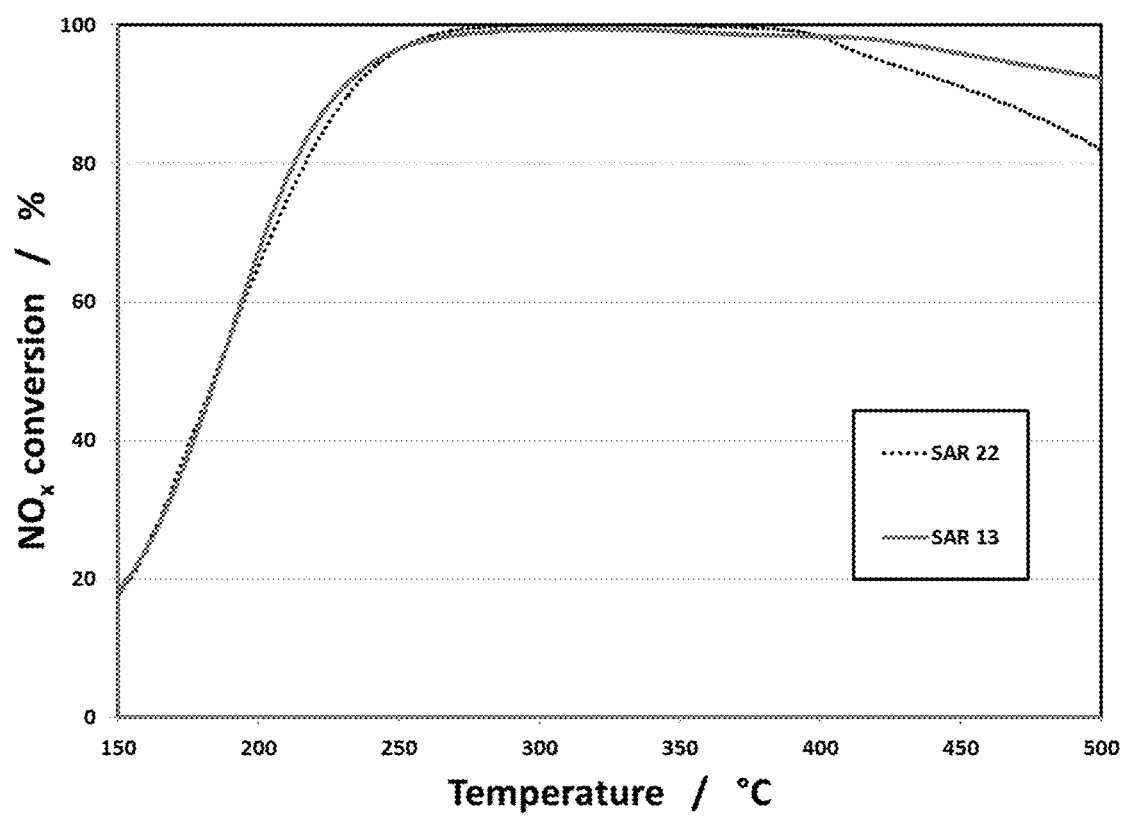
FIG. 65 shows NOx conversion under standard SCR conditions for catalysts with different SAR values.
Figure 66:
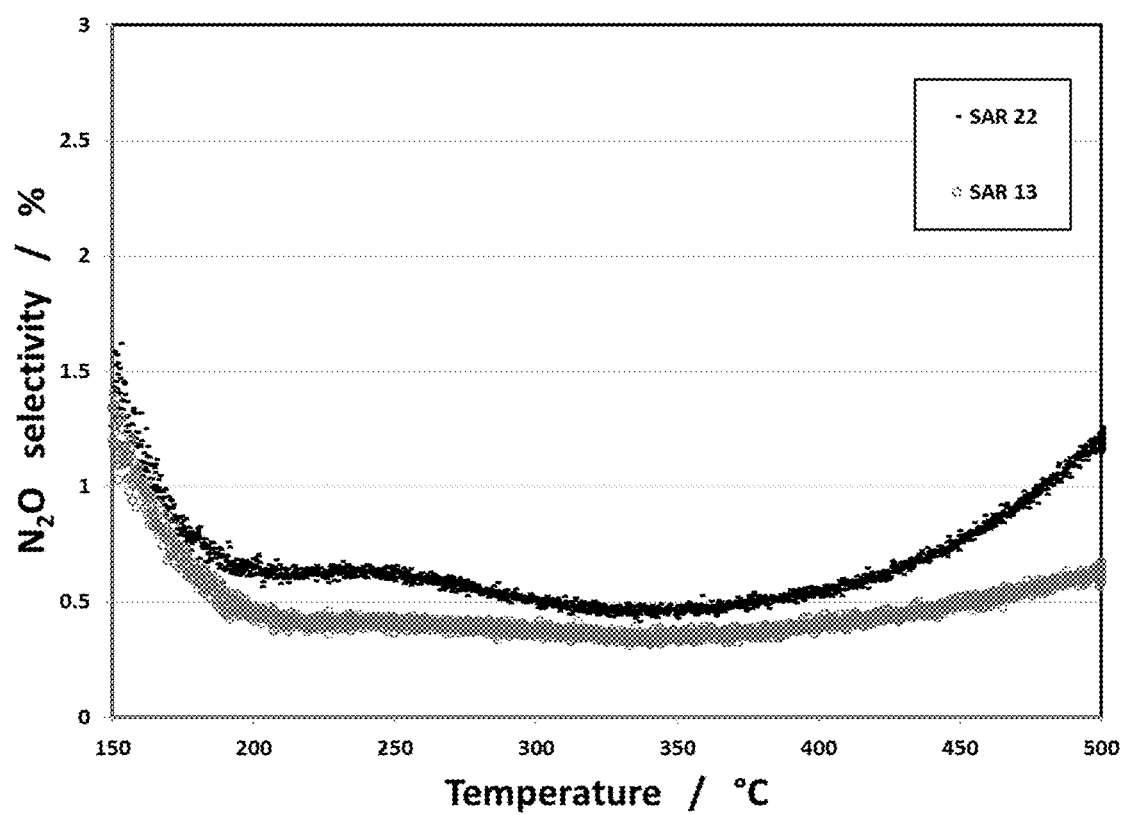
FIG. 66 shows N$_2$O selectivity under standard SCR conditions for catalysts with different SAR values.

Standard SCR: Pelletized samples of the powder catalysts were then tested for $NO_x$ conversion and $N_2O$ production in the following conditions: 500 ppm $NH_3$, 500 ppm NO, 0 ppm $NO_2$, 14% $O_2$, 4.6% $H_2O$, 5.0% $CO_2$, and a balance of $N_2$ at a space velocity of 90 K h$^{-1}$. The samples were heated from room temperature to 150° C. under the above-mentioned gas mixture except for $NH_3$. At 150° C., $NH_3$ was added into the gas mixture and the samples were held under these conditions for 30 min. The temperature was then increased (ramped) from 150 to 500° C. at 5° C. min$^{-1}$. Results are shown in FIGS. 65 and 66. The results show that Cu—Mn.CHA at SAR 13 achieved a total NOx conversion of 92% and an average $N_2O$ selectivity of 0.5% while Cu—Mn.CHA at SAR 22 achieved a total $NO_x$ conversion of 89% and an average $N_2O$ selectivity of 0.7%. These results indicate that utilization of the Cu—Mn bimetallic molecular sieve strategy works for a range of SARs. Additionally, lower SAR materials exhibit reduced $N_2O$ selectivity.

Example 10—Coated Monoliths

Molecular sieves were impregnated with metals using the required amount of manganese (II) acetate and/or copper (II) acetate dissolved in de-mineralized water. The metal-impregnated samples were dried overnight at 80° C. and then calcined in air at 550° C. for 4 hours. Catalysts were prepared having the following formulations:

AEI zeolite with 3 wt % exchanged Cu, 3Cu.AEI

AEI zeolite with 1.5 wt % exchanged Cu, 1.5Cu.AEI

AEI zeolite with 1.5 wt % exchanged Mn and 1.5 wt % exchanged Cu, 1.5Cu-1.5Mn.AEI The Cu.zeolite and Mn—Cu.zeolite catalysts were prepared by known prior art ion-exchange techniques involving copper acetate and manganese acetate solutions. A washcoat was prepared by combining the exchanged Cu.zeolite or Mn—Cu.zeolite solution with an alumina binder and a hydroxyethyl cellulose rheology modifier. The washcoat was applied to a ceramic substrate, then the washcoat was pulled down the substrate using a vacuum. The article was dried and calcined at about 500° C. for about 1 hour.

Standard SCR: Coated monoliths were then tested for $NO_x$ conversion and $N_2O$ production in the following conditions: 550 ppm $NH_3$, 500 ppm NO, 0 ppm $NO_2$, 10% $O_2$, 6.0% $H_2O$, 6.0% $CO_2$, and a balance of $N_2$ at a space velocity of 60 K h$^{-1}$. The samples were heated from room temperature to 150° C. under the above-mentioned gas mixture except for $NH_3$. At 150° C., $NH_3$ was added into the gas mixture and the samples were held under these conditions until both $NO_x$ and $NH_3$ concentrations in the outlet gas reached steady state values. The $NO_x$ and $NH_3$ streams were then turned off and the temperature was then ramped up to 450° C. and held for 10 min before being cooled to 200° C. At 200° C. the $NO_x$ and $NH_3$ streams were turned on and conditions were held until both $NO_x$ and $NH_3$ concentrations in the outlet gas reached steady state values. The entire process was then repeated for additional temperatures of 250, 350, 450, and 550° C.

TABLE 1

| Catalyst | SCR reaction | Aging | $NO_x$ conversion (%) | $N_2O$ (ppm) |
| --- | --- | --- | --- | --- |
| 3Cu.AEI | Standard | Fresh | 85 | 3.1 |
| 1.5Cu.AEI | Standard | Fresh | 78 | 1.2 |
| 1.5Cu—1.5Mn.AEI | Standard | Fresh | 82 | 1.1 |
| 3Cu.AEI | Standard | 750° C./ 10% $H_2O$ | 75 | 7.8 |
| 1.5Cu.AEI | Standard | 750° C./ 10% $H_2O$ | 50 | 3.4 |
| 1.5Cu—1.5Mn.AEI | Standard | 750° C./ 10% $H_2O$ | 69 | 2.6 |
| 3Cu.AEI | Fast | Fresh | 83 | 8.9 |
| 1.5Cu.AEI | Fast | Fresh | 86 | 4.5 |
| 1.5Cu—1.5Mn.AEI | Fast | Fresh | 88 | 4.0 |
| 3Cu.AEI | Slow | Fresh | 75 | 12.2 |
| 1.5Cu.AEI | Slow | Fresh | 72 | 7.5 |
| 1.5Cu—1.5Mn.AEI | Slow | Fresh | 81 | 7.4 |

Results are shown in Table 1. Under standard SCR conditions, it has been found that Cu—Mn.AEI and a 3 wt % Cu-exchanged molecular sieve both achieved similar total $NO_x$ conversions at 82% and 85%, respectively. However, the Cu—Mn.AEI exhibited an average $N_2O$ production of 1.1 ppm while a 3 wt % Cu-exchanged molecular sieve exhibited an average $N_2O$ production of 3.1 ppm. Thus, a catalyst of the present invention resulted in a significant reduction in $N_2O$ relative to a typical Cu-exchanged molecular sieve. Additionally, 1.5 wt % Cu-exchanged AEI exhibited a similar average $N_2O$ production value of 1.2 ppm, but could only achieve a total $NO_x$ conversion of 78%. Thus, a fully formulated monolith coated with Cu—Mn catalyst of the present invention exhibited significant advantages over monoliths containing only monometallic catalysts under standard SCR conditions.

The coated monoliths were also aged at 750° C. for 80 hours in 10% water in air. The samples were heated at a rate of 10° C. min$^{-1}$ to 250° C. in air only. The monoliths were then heated at a rate of 10° C. min$^{-1}$ in 10% $H_2O$ in air to 750° C. After being held at a temperature of 750° C. for 80 hours, the samples were cooled in the steam/air mixture until then temperature was <250° C. The samples were then cooled from 250° C. to room temperature in an air only flow. The aged monoliths were then tested for $NO_x$ conversion and $N_2O$ selectivity in the following conditions: 550 ppm $NH_3$, 500 ppm NO, 0 ppm $NO_2$, 10% $O_2$, 6.0% $H_2O$, 6.0% $CO_2$, and a balance of $N_2$ at a space velocity of 60 K h$^{-1}$.

Results are shown in Table 1. After hydrothermal aging under standard SCR conditions, it has been found that Cu—Mn.AEI could achieve a total $NO_x$ conversion of 69% and maintained a low average $N_2O$ production of 2.6 ppm. A 3 wt % Cu-exchanged molecular sieve exhibited a total $NO_x$ conversion of 75%, however, it produced a large amount of $N_2O$ at an average value of 7.8 ppm. Additionally, 1.5 wt % Cu-exchanged AEI also exhibited a higher average $N_2O$ production at 3.4 ppm and could only achieve a total $NO_x$ conversion of 50%. Thus, a catalyst of the present invention resulted in a significant reduction in $N_2O$ relative to a typical Cu-exchanged molecular sieve.

Fast SCR: Coated monoliths were then tested for $NO_x$ conversion and $N_2O$ production in the following conditions: 550 ppm $NH_3$, 250 ppm NO, 250 ppm $NO_2$, 10% $O_2$, 6.0% $H_2O$, 6.0% $CO_2$, and a balance of $N_2$ at a space velocity of 60 K h$^{-1}$. The samples were heated from room temperature to 150° C. under the above-mentioned gas mixture except for NH$_3$. At 150° C., NH$_3$ was added into the gas mixture and the samples were held under these conditions until both NO$_x$ and NH$_3$ concentrations in the outlet gas reached steady state values. The NO$_x$ and NH$_3$ streams were then turned off and the temperature was then ramped up to 450° C. and held for 10 min before being cooled to 200° C. At 200° C. the NO$_x$ and NH$_3$ streams were turned on and conditions were held until both NO$_x$ and NH$_3$ concentrations in the outlet gas reached steady state values. The entire process was then repeated for additional temperatures of 250, 350, 450, and 550° C.

Results are shown in Table 1. Under fast SCR conditions, it has been found that Cu—Mn.AEI could achieve a very high total NO$_x$ conversion of 88% and an average N$_2$O production of 4.0 ppm. However, a 3 wt % Cu-exchanged molecular sieve and a 1.5 wt % Cu-exchanged molecular sieve could only achieve total NOx conversions of 83% and 86%, respectively, and average N$_2$O productions of 8.9 ppm and 4.5 ppm, respectively. Thus, a fully formulated monolith coated with Cu—Mn catalyst of the present invention exhibited significant advantages over monoliths containing only monometallic catalysts under fast SCR conditions.

Slow SCR: Coated monoliths were then tested for NO$_x$ conversion and N$_2$O production in the following conditions: 550 ppm NH$_3$, 174 ppm NO, 325 ppm NO$_2$, 10% O$_2$, 6.0% H$_2$O, 6.0% CO$_2$, and a balance of N$_2$ at a space velocity of 60 K h$^{-1}$. The samples were heated from room temperature to 150° C. under the above-mentioned gas mixture except for NH$_3$. At 150° C., NH$_3$ was added into the gas mixture and the samples were held under these conditions until both NO$_x$ and NH$_3$ concentrations in the outlet gas reached steady state values. The NO$_x$ and NH$_3$ streams were then turned off and the temperature was then ramped up to 450° C. and held for 10 min before being cooled to 200° C. At 200° C. the NO$_x$ and NH$_3$ streams were turned on and conditions were held until both NO$_x$ and NH$_3$ concentrations in the outlet gas reached steady state values. The entire process was then repeated for additional temperatures of 250, 350, 450, and 550° C.

Results are shown in Table 1. Under slow conditions, it has been found that Cu—Mn.AEI could achieve a very high total NO$_x$ conversion of 81% and an average N$_2$O production of 7.4 ppm. However, a 3 wt % Cu-exchanged molecular sieve and a 1.5 wt % Cu-exchanged molecular sieve could only achieve total NOx conversions of 75% and 72%, respectively, and average N$_2$O productions of 12.2 ppm and 7.5 ppm, respectively. Thus, a fully formulated monolith coated with Cu—Mn catalyst of the present invention exhibited significant advantages over monoliths containing only monometallic catalysts under slow SCR conditions.

The invention claimed is:

1. A catalyst composition for treating an exhaust gas, the catalyst composition comprising a molecular sieve, the molecular sieve comprising exchanged copper and exchanged manganese, wherein the molecular sieve comprises a small-pore aluminosilicate zeolite.

2. The catalyst composition of claim 1, wherein the zeolite has a SAR of about 5 to about 200.

3. The catalyst composition of claim 1, wherein the small-pore zeolite has a crystal framework type selected from AEI, CHA, and combinations thereof.

4. The catalyst composition of claim 1, wherein the weight ratio of copper to manganese is about 0.1 to about 50.

5. The catalyst composition of claim 1, wherein the copper and manganese are present in a total amount of about 0.1 to about 10 wt %, based on the weight of the molecular sieve.

6. The catalyst composition of claim 1, wherein the copper is present in an amount of about 0.05 to about 7 wt %, based on the weight of the molecular sieve.

7. The catalyst composition of claim 1, wherein the manganese is present in an amount of about 0.05 to about 7 wt %, based on the weight of the molecular sieve.

8. The catalyst composition of claim 1, wherein the molecular sieve comprises a ratio of copper and manganese to aluminum of <1.

9. The catalyst composition of claim 1, wherein the catalyst composition is effective to promote a reaction of NH$_3$ with NOx to form nitrogen and water.

10. A catalyst article, comprising a substrate coated with the catalyst composition of claim 1.

11. The catalyst article of claim 10, further comprising one or more additional catalyst compositions.

12. The catalyst article of claim 11, wherein the one or more additional catalyst compositions comprises a Cu- or Fe-exchanged molecular sieve catalyst.

13. The catalyst article of claim 11, wherein the molecular sieve comprising exchanged copper and exchanged manganese is present upstream of the one or more additional catalyst compositions.

14. The catalyst article of claim 11, wherein the molecular sieve comprising exchanged copper and exchanged manganese is present in a top layer and the one or more additional catalyst compositions are present in a bottom layer.

15. The catalyst article of claim 10, further comprising a catalyst composition comprising a platinum group metal.

16. A method of treating an exhaust gas containing nitrogen oxides, comprising contacting the exhaust gas with a nitrogenous reductant in a presence of the catalyst composition of claim 1.

* * * * *